(12) United States Patent
Tani et al.

(10) Patent No.: US 6,190,013 B1
(45) Date of Patent: Feb. 20, 2001

(54) POLARIZED BEAM SPLITTER AND AN ILLUMINATION OPTICAL SYSTEM AND A PROJECTOR PROVIDED WITH A POLARIZED BEAM SPLITTER

(75) Inventors: Hakuzo Tani, Takatsuki; Yasumasa Sawai, Sakai, both of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/339,425

(22) Filed: Jun. 24, 1999

Related U.S. Application Data

(62) Division of application No. 09/109,892, filed on Jun. 30, 1998, now Pat. No. 5,967,635.

(30) Foreign Application Priority Data

Jul. 3, 1997 (JP) .................................................... 9-178591
Jul. 18, 1997 (JP) .................................................... 9-194161

(51) Int. Cl.[7] .................................................. G03B 21/14
(52) U.S. Cl. .............................. 353/31; 353/20; 353/38; 353/69
(58) Field of Search ..................... 353/8, 20, 31, 353/38, 34, 69, 37; 349/9, 8, 5; 359/488, 489, 490, 496, 499, 500

(56) References Cited

U.S. PATENT DOCUMENTS

| | | | |
|---|---|---|---|
| 5,231,431 | * 7/1993 | Yano et al. ............................. | 353/69 |
| 5,453,859 | 9/1995 | Sannohe et al. ....................... | 359/63 |
| 5,579,159 | 11/1996 | Ito ......................................... | 359/487 |
| 5,625,491 | 4/1997 | von Gunten et al. ................ | 359/487 |
| 5,648,870 | 7/1997 | Mistutake .............................. | 359/487 |
| 5,872,653 | 2/1999 | Schrenk et al. ....................... | 359/498 |
| 5,890,786 | * 4/1999 | Kurematsu ............................ | 353/69 |
| 5,967,635 | * 10/1999 | Tani et al. ............................. | 353/20 |

* cited by examiner

*Primary Examiner*—William Dowling
(74) *Attorney, Agent, or Firm*—Sidley & Austin

(57) ABSTRACT

A projector includes: imaging members producing primary color light images; an illumination optical system for illuminating the imaging members; an image combining optical system for combining the color light images; and a projection optical system for projecting a combined color light image onto a screen. The illumination optical system includes a beam splitter for splitting a visible light beam into two components having perpendicular polarization directions; a converter for making the polarization directions of the components coincide; and a color separator for separating light from the converter into rays of the plurality of primary colors. The beam splitter can have a first transparent base; a second transparent base; and a polarizing multilayered film placed between the first and second transparent bases. The polarizing multilayered film includes high refraction layers each having a refractive index $n_H$ and low refraction layers each having a refractive index $n_L$ lower than the refractive index $n_H$, the high refraction layers and the low refraction layers being alternately laminated to one another. A maximum efficiency incident angle for the polarization splitting film is shifted from an incident angle of a main ray from the light source in order to make an illumination nonuniformity.

10 Claims, 28 Drawing Sheets

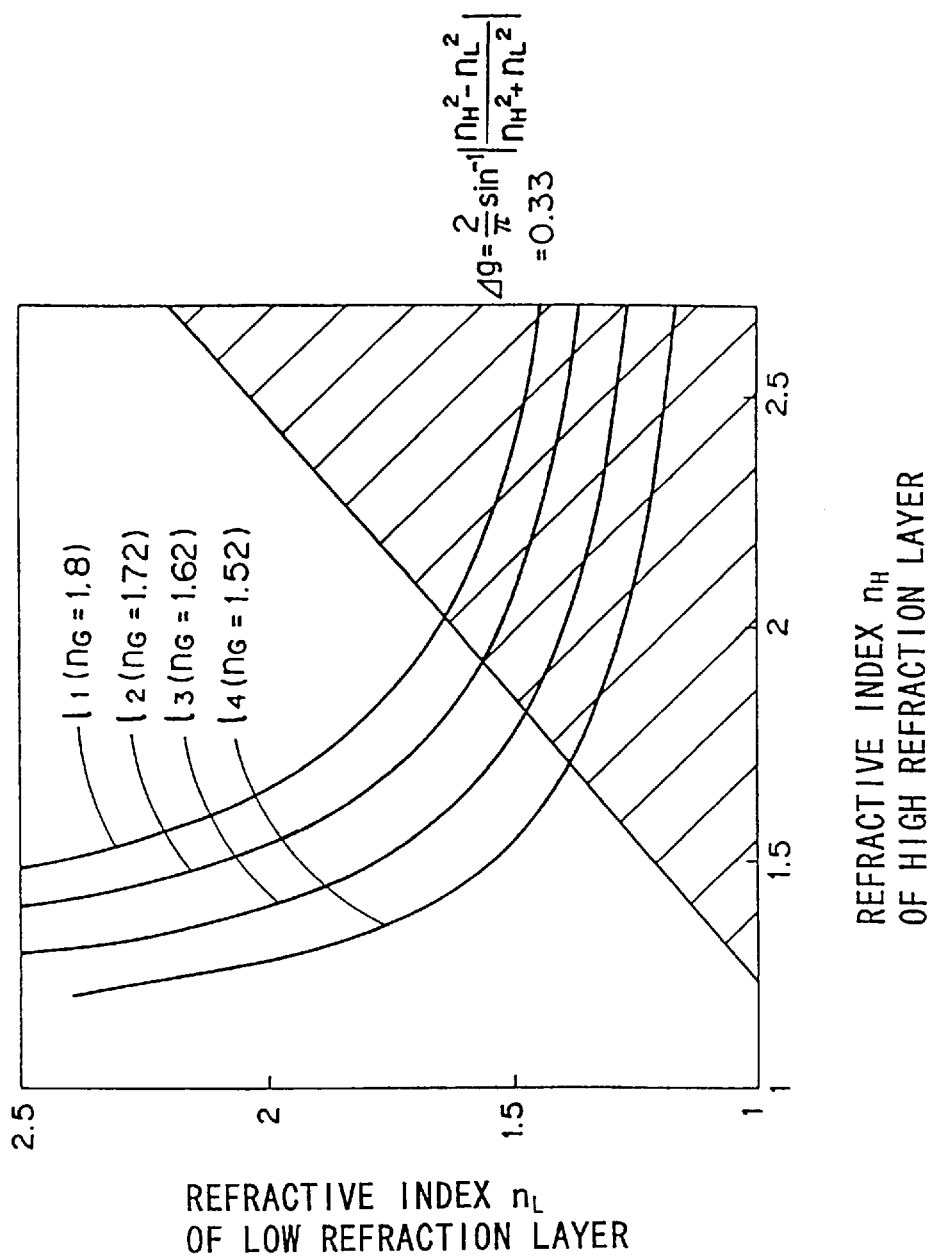

POLARIZED BEAM SPLITTER AND AN ILLUMINATION OPTICAL SYSTEM AND A PROJECTOR PROVIDED WITH A POLARIZED BEAM SPLITTER

RELATED APPLICATIONS

This application is a division of U.S. patent application Ser. No. 09/109,892, filed Jun. 30, 1998, now U.S. Pat. No. 5,967,635 which is based on Japanese patent applications No. 9-178591 and No. 9-194161, the contents of which are hereby incorporated by reference.

BACKGROUND OF THE INVENTION

This invention relates to a polarized beam splitter capable of efficiently splitting a polarized beam into S-components and P-components over an entire visible spectrum, and an illumination optical system and a projector provided with such a polarized beam splitter.

A polarized beam splitter splits a plane wave into two components: (S-component and P-component) by reflecting the S-component of the plane wave incident on a polarizing multilayered film at a specified incident angle and causing the P-component thereof to transmit. Known polarized beam splitters include a prism type, in which the polarizing multilayered film is held between a pair of prisms, and a plate type, in which an incident angle of the plane wave on the polarizing multilayered film provided on a flat base plate becomes a Brewster angle.

There have been proposed a variety of apparatuses in which a polarized beam splitter is incorporated as an element in order to utilize the aforementioned polarized light splitting characteristic, i.e. the characteristic of splitting the plane wave into the S-component and P-component, thereby displaying an excellent performance in cooperation of the polarized beam splitter. One of such proposed apparatuses is, for example, a liquid crystal projector.

The liquid crystal projector is an equipment for projecting a large image on a screen. An image, having a shape similar to that of an image desired to be projected, is formed on a liquid crystal panel; and an illumination light, aligned to a specified polarized light component by an illumination optical system, is produced and projected onto the liquid crystal panel. A light emitted from such a liquid crystal panel is introduced to the screen via a projection lens, thereby projecting an enlarged version of the image on the liquid crystal panel onto the screen. In other words, in this liquid crystal projector, the illumination optical system is constructed by a light source, the polarized beam splitter, and a half-wave plate, and the light from the light source is split into an S-component and a P-component by being incident on the polarized beam splitter at a specified incident angle. Thereafter, only one component, e.g. only the P-component is caused to transmit the half-wave plate, thereby converting it to S-component to produce a light aligned to the S-component. This light is projected to the liquid crystal panel as an illumination light.

In order to project a color image onto the screen, it is necessary to prepare liquid crystal panels for each of three primary color components (R(red)-component, G(green)-component and B(blue)-component) and to illuminate the respective liquid crystal panels with corresponding illumination lights. To this end, a white light source needs to be used as a light source and a light from the white light source needs to be split into S-component and P-component by the polarized beam splitter over the entire visible spectrum (400 nm to 700 nm). Further, this splitting efficiency, i.e. a splitting ratio, is closely related to the intensity of the illumination light to the liquid crystal panel. When the splitting ratio decreases, the intensity of the illumination light actually projected on the liquid crystal panel decreases. This darkens the image projected onto the screen, with the result that a satisfactory image cannot be obtained. Accordingly, the polarized beam splitter used in the color liquid crystal projector needs to have a polarized light splitting characteristic of efficiently splitting the incident light into S-component and P-component over the entire visible spectrum.

An incident angle θ of the light from the white light source on the polarizing multilayered film is normally set at 45°, and the illumination optical system is designed such that the splitting ratio is at maximum at this incident angle θ. However, in reality, not only the rays at incident angle θ, but also rays displaced from those rays by about ±3° are incident on the polarizing multilayered film. In the conventional polarized beam splitters, no sufficient investigation and consideration are made for such incident rays oblique to those incident at 45°. If the oblique incident rays are incident on the polarizing multilayered film, the splitting ratio is considerably reduced, causing problems similar to the above.

Further, even if the liquid crystal panel surface is uniformly illuminated, a satisfactory image may not be obtainable due to a nonuniform luminance of an optical image projected onto the screen.

SUMMARY OF THE INVENTION

It is an object of the present invention to provide a beam splitter, an illumination optical system, and a projector which have overcome the problems residing in the prior art.

It is another object of the present invention to provide a beam splitter which can efficiently split a beam into an S-component and a P-component over the entire visible spectrum.

It is still another object of the present invention to provide an illumination optical system which can illuminate a specimen brightly with a visible light having its polarization direction aligned.

It is yet another object of the present invention to provide a projector which can project a satisfactory image onto a screen.

According to an aspect of the present invention, a beam splitter comprises: a first transparent base; a second transparent base; and a polarizing multilayered film placed between the first and second transparent bases.

The polarizing multilayered film includes high refraction layers, each having a refractive index $n_H$, and low refraction layers, each having a refractive index $n_L$ lower than the refractive index $n_H$, the high refraction layers and the low refraction layers being alternately laminated to one another. The refractive index $n_H$ and the refractive index $n_L$ of the laminated layers satisfy the following equation:

$$\frac{2}{\pi}\sin^{-1}\left|\frac{n_H^2 - n_L^2}{n_H^2 + n_L^2}\right| \geq 0.33.$$

Alternatively, the polarizing multilayered film may include: a first alternately laminated film for splitting a light beam of a wavelength range having a center wavelength $\lambda_o$, and having high refraction layers, each having a refractive index $n_H$, and low refraction layers, each having a refractive index $n_L$ lower than the refractive index $n_H$, the high refraction layers and the low refraction layers being alternately laminated to one another; and a second alternately laminated film for splitting a light beam of a wavelength range having a center wavelength $\lambda_1$ greater than the center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another. The refractive index $n_H$ and the refractive index $n_L$ of the laminated layers in an aspect of the invention satisfy the following equation:

$$\frac{2}{\pi}\sin^{-1}\left|\frac{n_H^2 - n_L^2}{n_H^2 + n_L^2}\right| \geq 0.178.$$

Alternatively, further, the polarizing multilayered film may include: a first alternately laminated film for splitting a light beam of a wavelength range having a center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another; a second alternately laminated film for splitting a light beam of a wavelength range having a center wavelength $\lambda_0$, greater than the center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another; and a third alternately laminated film for splitting a light beam of a wavelength range having a center wavelength $\lambda_2$ greater than the center wavelength $\lambda_1$, and having high refraction layers, each having a refractive index $n_H$, and low refraction layers, each having a refractive index $n_L$ lower than the refractive index $n_H$, the high refraction layers and the low refraction layers being alternately laminated to one another. The refractive index $n_H$ and the refractive index $n_L$ in the this configuration satisfy the following equation:

$$\frac{2}{\pi}\sin^{-1}\left|\frac{n_H^2 - n_L^2}{n_H^2 + n_L^2}\right| \geq 0.127.$$

According to another aspect of the present invention, an illumination optical system comprises: a light source which generates light having a visible wavelength range; a beam splitter which splits a light beam from the light source into two components; and a converter which converts the polarization direction of one component to the polarization direction of the other component.

The beam splitter is provided with: a first transparent base; a second transparent base; and a polarizing multilayered film placed between the first and second transparent bases.

The polarizing multilayered film includes high refraction layers, each having a refractive index $n_H$, and low refraction layers, each having a refractive index $n_L$ lower than the refractive index $n_H$, the high refraction layers and the low refraction layers being alternately laminated to one another.

The refractive index $n_H$ and the refractive index n in the this configuration satisfy the following equation:

$$\frac{2}{\pi}\sin^{-1}\left|\frac{n_H^2 - n_L^2}{n_H^2 + n_L^2}\right| \geq 0.33.$$

Alternatively, the polarizing multilayered film may include: a first alternately laminated film for splitting a light beam of a wavelength range having a center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another; and a second alternately laminated film for splitting a light beam of a wavelength range having a center wavelength $\lambda_1$ greater than the center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another. The refractive index $n_H$ and the refractive index $n_L$ in the this configuration satisfy the following equation:

$$\frac{2}{\pi}\sin^{-1}\left|\frac{n_H^2 - n_L^2}{n_H^2 + n_L^2}\right| \geq 0.178.$$

Alternatively, further, the polarizing multilayered film may include: a first alternately laminated film for splitting a light beam of a wavelength range having a center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another; a second alternately laminated film for splitting a light beam of a wavelength range having a center wavelength $\lambda_1$ greater than the center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another; and a third alternately laminated film for splitting a light beam of a wavelength range having a center wavelength $\lambda_2$ greater than the center wavelength $\lambda_1$, and having high refraction layers, each having a refractive index $n_H$, and low refraction layers, each having a refractive index $n_L$ lower than the refractive index $n_H$, the high refraction layers and the low refraction layers being alternately laminated to one another. The refractive index $n_H$ and the refractive index $n_L$ in the this configuration satisfy the following equation:

$$\frac{2}{\pi}\sin^{-1}\left|\frac{n_H^2 - n_L^2}{n_H^2 + n_L^2}\right| \geq 0.127.$$

According to still another aspect of the present invention, a projector comprises: an illumination optical system which produces light including a visible wavelength and having an aligned polarization direction; a color separator which separates the light from the illumination optical system into rays of a plurality of primary colors; a plurality of imaging members which are operable to produce a plurality of color light images utilizing the rays of the plurality of primary colors from the color separator; and a projection optical system which introduces the plurality of color light images from the plurality of imaging members to a screen, their respective optical axes being coincided with one another.

The illumination optical system is provided with: a light source which generates light having a visible wavelength range; a beam splitter which splits a light beam from the light source into two components; and a converter which converts the polarization direction of one component to the polarization direction of the other component. The beam splitter is provided with: a first transparent base; a second transparent base; and a polarizing multilayered film placed between the first and second transparent bases.

The polarizing multilayered film includes high refraction layers, each having a refractive index $n_H$, and low refraction layers, each having a refractive index $n_L$ lower than the refractive index $n_H$, the high refraction layers and the low refraction layers being alternately laminated to one another. The refractive index $n_H$ and the refractive index $n_L$ in the this configuration satisfy the following equation:

$$\frac{2}{\pi}\sin^{-1}\left|\frac{n_H^2 - n_L^2}{n_H^2 + n_L^2}\right| \geq 0.33.$$

Alternatively, the polarizing multilayered film may include: a first alternately laminated film for splitting a light beam of a wavelength range having a center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another; and a second alternately laminated film for splitting a light beam of a wavelength range having a center wavelength $\lambda_1$ greater than the center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another. The refractive index $n_H$ and the refractive index $n_L$ in the this configuration satisfy the following equation:

$$\frac{2}{\pi}\sin^{-1}\left|\frac{n_H^2 - n_L^2}{n_H^2 + n_L^2}\right| \geq 0.178.$$

Alternatively, further, the polarizing multilayered film may include: a first alternately laminated film for splitting a light beam of a wavelength range having a center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another; a second alternately laminated film for splitting a light beam of a wavelength range having a center wavelength $\lambda_1$, greater than the center wavelength $\lambda_0$, and having high refraction layers, each having a refractive index $n_H$, and low refraction layers, each having a refractive index $n_L$ lower than the refractive index $n_H$, the high refraction layers and the low refraction layers being alternately laminated to one another; and a third alternately laminated film for splitting a light beam of a wavelength range having a center wavelength $\lambda_2$ greater than the center wavelength $\lambda_1$ and having high refraction layers, each having a refractive index $n_H$, and low refraction layers, each having a refractive index $n_L$ lower than the refractive index $n_H$, the high refraction layers and the low refraction layers being alternately laminated to one another.

The refractive index $n_H$ and the refractive index $n_L$ in this configuration satisfy the following equation:

$$\frac{2}{\pi}\sin^{-1}\left|\frac{n_H^2 - n_L^2}{n_H^2 + n_L^2}\right| \geq 0.127.$$

These and other objects, features and advantages of the present invention will become more apparent upon a reading of the following detailed description and accompanying drawings.

BRIEF DESCRIPTION OF THE DRAWINGS

FIG. 8 is a chart showing the conditions for ensuring a satisfactory polarized light splitting characteristic in the polarized beam splitter of FIG. 7A;

DETAILED DESCRIPTION OF THE PREFERRED EMBODIMENTS OF THE INVENTION

Figure 1A:
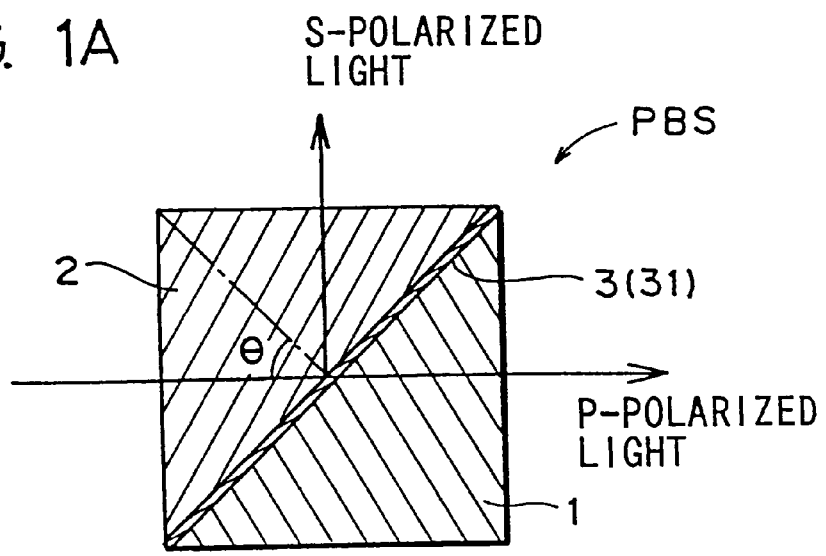
FIG. 1A is a sectional view showing a polarized beam splitter according to a first embodiment of the invention.
Figure 1B:
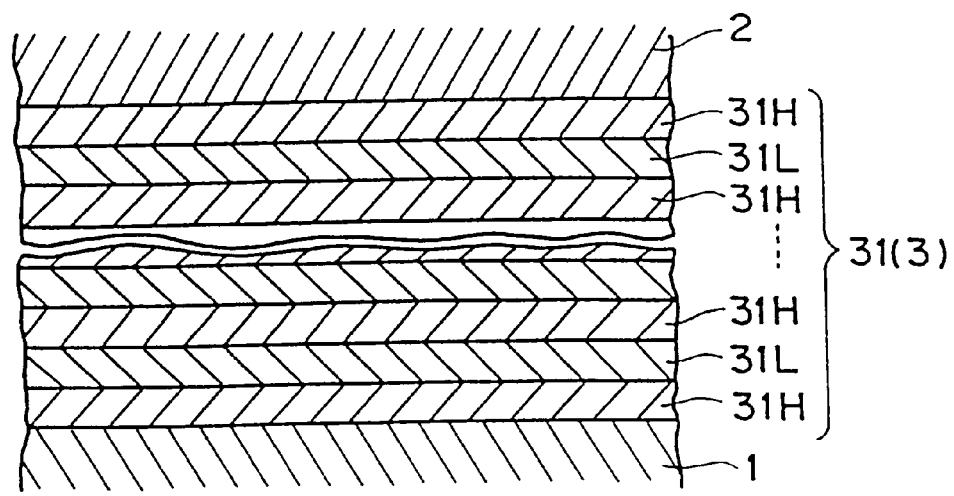
FIG. 1B is a partial enlarged sectional view of the polarized beam splitter of FIG. 1A.

FIG. 1A is a sectional view of a polarized beam splitter according to a first embodiment of the invention, and FIG. 1B is a partial enlarged sectional view of the polarized beam splitter of FIG. 1A. This polarized beam splitter PBS is constructed such that a polarizing multilayered film 3 is held between first and second transparent bases 1, 2 having a refractive index $n_G$ as shown in FIG. 1A. This polarizing multilayered film 3 is an alternately laminated film 31 formed by alternately laminating high refraction layers 31H, having a refractive index $n_H$, and low refraction layers 31L, having a refractive index $n_L$ lower than $n_H$, as shown in FIG. 1B and satisfying the following inequality:

$$\frac{2}{\pi}\sin^{-1}\left|\frac{n_H^2 - n_L^2}{n_H^2 + n_L^2}\right| \geq 0.33 \tag{1}$$

The meaning of Equation (1) will be described below.

Assuming that an incident angle of a beam on the alternately laminated film 31 is θ as shown in FIG. 1A, the beam can efficiently be split into an S-component (hereinafter, "S-polarized light") and a P-component (hereinafter, "P-polarized light") when an equality defined by Equation (2) is satisfied:

$$\sin^2\theta = \frac{n_H^2 \cdot n_L^2}{n_G^2 \cdot (n_H^2 \cdot n_L^2)} \tag{2}$$

If $\lambda_0$ denotes a center wavelength of a wavelength range where the beam can efficiently be split by the alternately laminated film 31 (hereinafter, "splittable wavelength range") and $(1+\Delta g)\cdot\lambda_0$, $(1-\Delta g)\cdot\lambda_0$ denote upper and lower limit wavelengths, respectively, Ag is defined as in Equation (3):

$$\Delta g = \frac{2}{\pi}\sin^{-1}\left|\frac{n_H^2 - n_L^2}{n_H^2 + n_L^2}\right| \tag{3}$$

Figure 2:
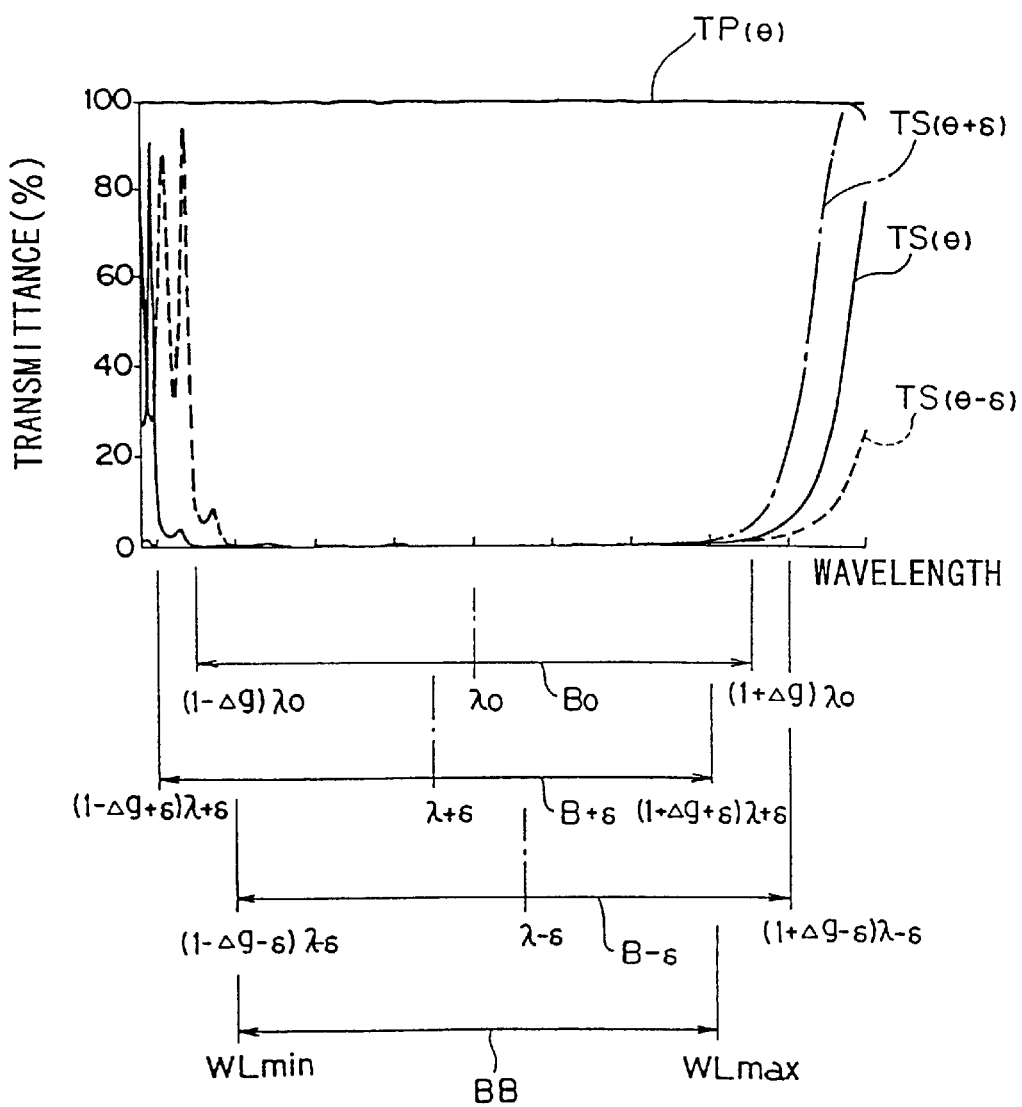
FIG. 2 is a graph showing a polarized light splitting characteristic of the polarized beam splitter of FIG. 1A.

In other words, as shown in solid line in FIG. 2, the S-polarized light transmitting through the alternately laminated film 31 is efficiently split in a wavelength range $B_0$ of $(1+\Delta g)\cdot\lambda_0$ to $(1-\Delta g)\cdot\lambda_0$ centered on the center wavelength $\lambda_0$, i.e., transmittance $T_P(\theta)$ thereof is proximate to 0%. Solid line $T_P(\theta)$ of FIG. 2 represents transmittance $T_P$ of the P-polarized light.

If a beam is incident on the alternately laminated film 31 having the above polarized light splitting characteristic at an incident angle of (θ+δ), a center wavelength $\lambda_{+\delta}$ is shifted toward a shorter wavelength side as shown in phantom line in FIG. 2 and defined as in Equation (4):

$$\lambda_{+\delta} = \frac{\cos(\theta + \delta)}{\cos\theta}\cdot\lambda_0 \tag{4}$$

Further, an upper limit wavelength $(1+\Delta g_{+\delta})\cdot\lambda_{+\delta}$ of a splittable wavelength range $B_{+\delta}$ is defined as in Equation (5).

$$(1+\Delta g_{+\delta})\cdot\lambda_{+\delta} = (1+\Delta g_{+\delta})\cdot\frac{\cos(\Theta+\delta)}{\cos\Theta}\cdot\lambda_0 \tag{5}$$

where $$\Delta g_{+\delta} = \frac{2}{\pi}\sin^{-1}\left|\frac{\alpha - \beta}{\alpha + \beta}\right|$$

$$\alpha = \sqrt{n_H^2 - \frac{n_H^2 \cdot n_L^2}{n_H^2 + n_L^2}\cdot\frac{\sin(\theta+\delta)}{\sin\theta}}$$

$$\beta = \sqrt{n_L^2 - \frac{n_H^2 \cdot n_L^2}{n_H^2 + n_L^2}\cdot\frac{\sin(\theta+\delta)}{\sin\theta}}$$

On the other hand, if a beam is incident on the alternately laminated film 31, having the above polarized light splitting characteristic at an incident angle of (θ−δ), a center wavelength $\lambda_{-\delta}$ is shifted toward a longer wavelength side as shown in broken line in FIG. 2 and defined as in Equation (6):

$$\lambda_{-\delta} = \frac{\cos(\theta - \delta)}{\cos\theta}\cdot\lambda_0. \tag{6}$$

Further, a lower limit wavelength $(1-\Delta g_{-\delta})\cdot\lambda_{-\delta}$ of the splittable wavelength range $B_{-\delta}$ is defined as in Equation (7).

$$(1+\Delta g)_{+\delta}\cdot\lambda_{+\delta} = (1+\Delta g_{+\delta})\cdot\frac{\cos(\Theta+\delta)}{\cos\Theta}\cdot\lambda_0 \tag{7}$$

where $$\Delta g_{-\delta} = \frac{2}{\pi}\sin^{-1}\left|\frac{\alpha' - \beta'}{\alpha' + \beta'}\right|$$

$$\alpha' = \sqrt{n_H^2 - \frac{n_H^2 \cdot n_L^2}{n_H^2 + n_L^2}\cdot\frac{\sin(\theta-\delta)}{\sin\theta}}$$

$$\beta' = \sqrt{n_L^2 - \frac{n_H^2 \cdot n_L^2}{n_H^2 + n_L^2}\cdot\frac{\sin(\theta-\delta)}{\sin\theta}}$$

Accordingly, an upper limit wavelength $WL_{max}$ of a wavelength range BB where the incident beam can efficiently be split into the S-polarized light and P-polarized light for all incident angles, even if the beam is incident on the polarizing multilayered film 3 in an angle range of ±δ centering θ, is defined as in Equation (8):

$$WL_{max} = (1+\Delta g_{+\delta})\cdot\frac{\cos(\theta+\delta)}{\cos\theta}, \tag{8}$$

whereas a lower limit wavelength $WL_{min}$ thereof is defined as in Equation (9):

$$WLmin = (1 - \Delta g_{-\delta}) \cdot \frac{\cos(\theta - \delta)}{\cos\theta}. \quad (8)$$

Here, the projector is set as usual such that the splitting ratio is at maximum when the incident angle θ of the visible light (400 nm to 700 nm) on the polarizing multilayered film is 45°. Accordingly, the oblique incidence of rays, shifted by about ±3°, needs to be considered. In order to efficiently split the polarized beam under the conditions:
    upper limit wavelength $WL_{max}$=700 nm
    lower limit wavelength $WL_{min}$=400 nm
    incident angle θ=45°
    angle of δ=3°,
the conditions defined by Equation (10) need to be satisfied.

$$(1 + \Delta g_{+3}) \cdot \frac{\cos(45° + 3°)}{\cos 45°} \cdot \lambda_0 \geq 700 \quad (10)$$

$$(1 - \Delta g_{-3}) \cdot \frac{\cos(45° - 3°)}{\cos 45°} \cdot \lambda_0 \leq 400$$

In view of the refractive index of the thin film material usable in the visible spectrum, a relationship between Δg and $\Delta g_{+\delta}$ can be approximated to:
    $\Delta g_{+3} = \Delta g/0.9$.
Further, a relationship between Δg and $\Delta g_{-\delta}$ can be approximated to:
    $\Delta g_{-3} = 0.9 \cdot \Delta g$.
By putting these approximated relationships into Equation (10), Equation (11) can be obtained.

$$\left(1 + \frac{\Delta g}{0.9}\right) \cdot \frac{\cos 48°}{\cos 45°} \cdot \lambda_0 \geq 700 \quad (11)$$

$$(1 - 0.9 \cdot \Delta g) \cdot \frac{\cos 42°}{\cos 45°} \cdot \lambda_0 \leq 400$$

Figure 3:
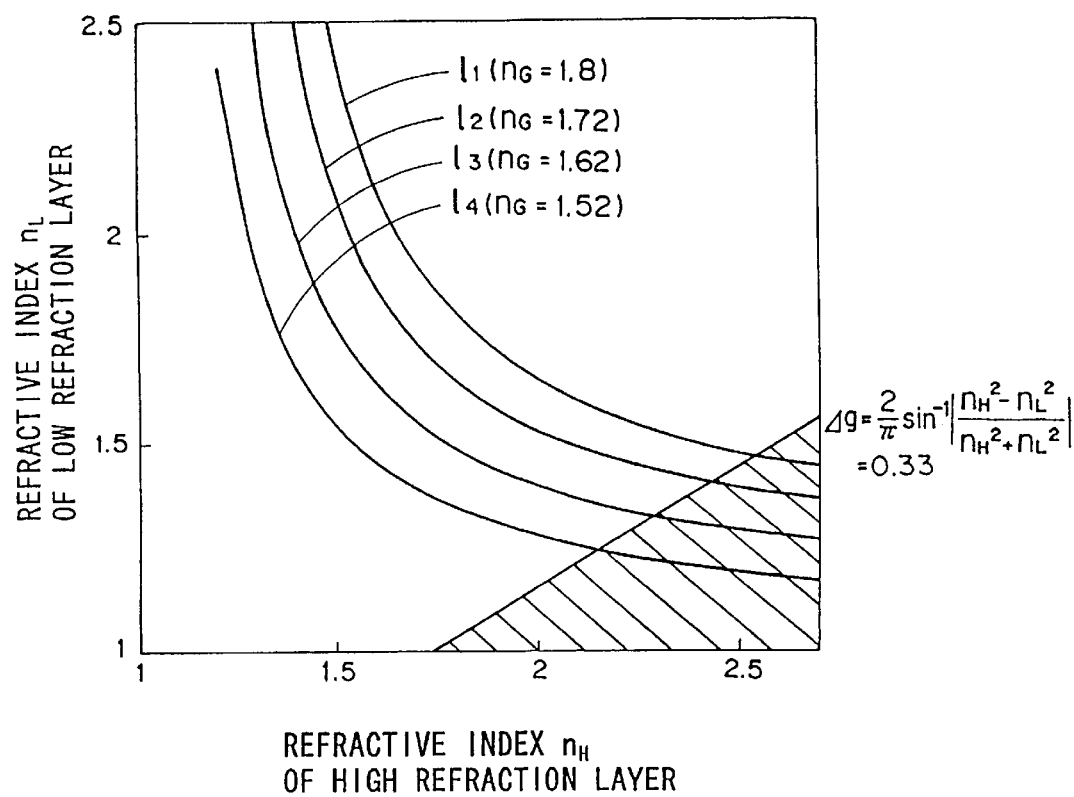
FIG. 3 is a chart showing the conditions for ensuring a satisfactory polarized light splitting characteristic in the polarized beam splitter of FIG. 1A.

By satisfying Equation (11), there can be obtained a polarized beam splitter capable of efficiently splitting the polarized beam into the S-polarized light and P-polarized light over the entire visible spectrum (400 nm to 700 nm). By solving Equation (11), the inequality defined by Equation (1) can be obtained. In other words, by constructing the polarized beam splitter so as to satisfy Equation (1), i.e. to fall within a hatched region of FIG. 3, the polarized beam can efficiently be split into the S-polarized light and P-polarized light over the entire visible spectrum (400 nm to 700 nm) even if the incident beam includes rays incident on the polarized beam splitter at an angle shifted from 45° by ±3° as well as a ray incident thereon at 45°.

By simplifying Equation (2) by substituting the incident angle θ by 45°, Equation (12) can be obtained:

$$\frac{1}{2} n_G^2 = \frac{n_H^2 \cdot n_L^2}{n_H^2 + n_L^2}. \quad (12)$$

The splitting efficiency reaches its maximum at the incident angle 45° by satisfying Equation (12). For example, by setting the refractive indices $n_G$, $n_H$, $n_L$ along the respective curves $1_1$, $1_2$, $1_3$, $1_4$ of FIG. 3, the splitting efficiency reaches its maximum at the incident angle θ and the polarized beam can efficiently be split into the S-polarized light and P-polarized light.

Figure 4A:
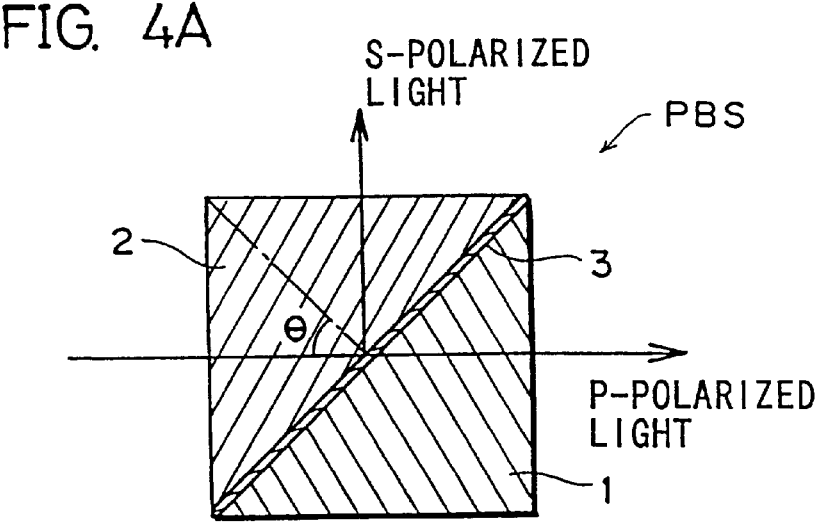
FIG. 4A is a sectional view showing a polarized beam splitter according to a second embodiment of the invention.
Figure 4B:
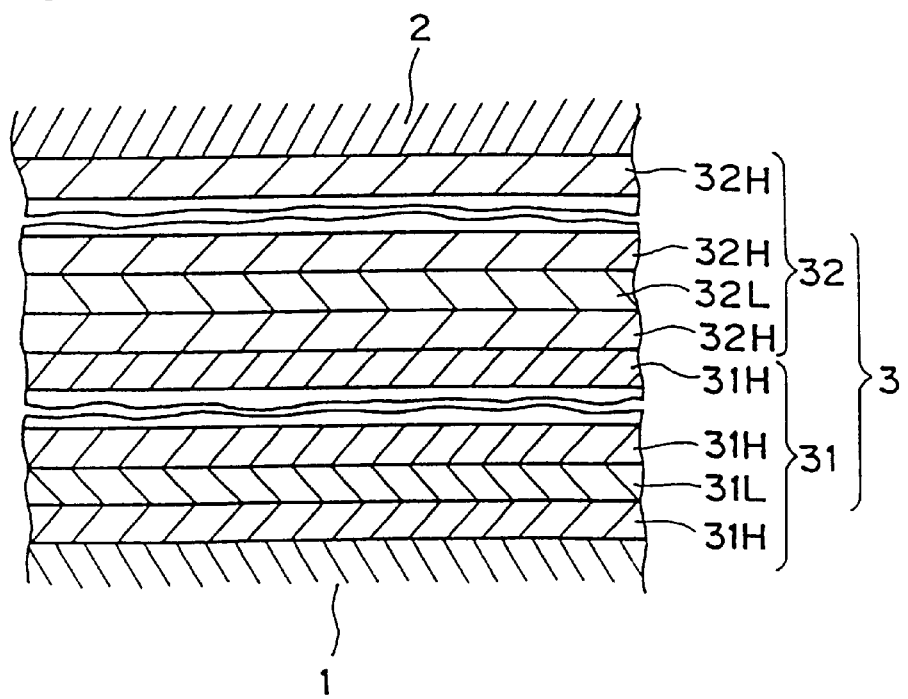
FIG. 4B is a partial enlarged sectional view of the polarized beam splitter of FIG. 4A.

FIG. 4A is a sectional view of a polarized beam splitter according to a second embodiment of the invention, and FIG. 4B is a partial enlarged sectional view of the polarized beam splitter of FIG. 4A. This polarized beam splitter PBS is constructed such that a polarizing multilayered film 3 is held between first and second transparent bases 1, 2 having a refractive index $n_G$ as shown in FIG. 4A. In the polarized beam splitter PBS according to the second embodiment, the polarizing multilayered film 3 includes two alternately laminated films 31, 32. The respective films 31, 32 are formed similar to that of the first embodiment. Specifically, the alternately laminated film 31 is formed by alternately laminating high refraction layers 31H, having a refractive index $n_H$, and low refraction layers 31L, having a refractive index $n_L$ lower than $n_H$. The alternately laminated film 32 is formed by alternately laminating high refraction layers 32H, having a refractive index $n_H$, and low refraction layers 32L.

Since the polarizing multilayered film 3 thus formed satisfies the following inequality (13):

$$\frac{2}{\pi} \sin^{-1}\left|\frac{n_H^2 - n_L^2}{n_H^2 + n_L^2}\right| \geq 0.178, \quad (13)$$

the polarized beam splitter capable of efficiently splitting the polarized beam into the S-polarized light and P-polarized light over the entire visible spectrum (400 nm to 700 nm) can be obtained.

Figure 5A:
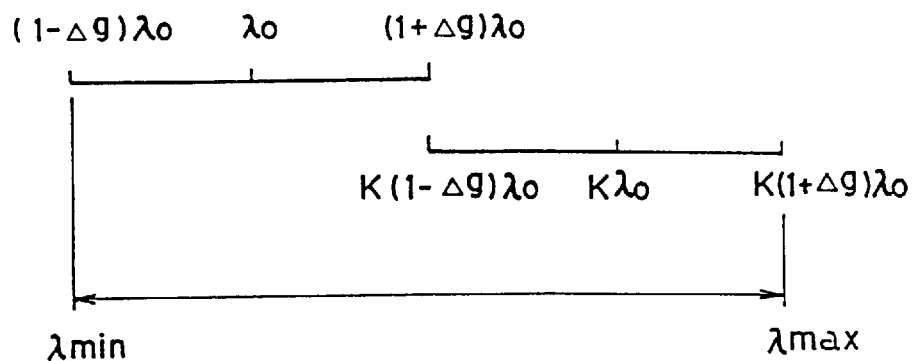
FIGS. 5A and 5B are diagrams showing why a wide splittable wavelength range is obtained in the polarized beam splitter of FIG. 4A.

The meaning of Equation (13) is described below in detail. In the polarizing multilayered film 3 of the so-called double layered structure in which two alternately laminated films 31, 32 having an identical structure are put together, the splittable wavelength range thereof can be extended by shifting the splittable wavelength ranges of the respective alternately laminated films 31, 32. Specifically, in the case that the center, upper, and lower limit wavelengths of the splittable wavelength range of the alternately laminated film 31 are $\lambda_0$, $(1+\Delta g)\cdot\lambda_0$, and $(1-\Delta g)\cdot\lambda_0$, respectively, and the center, upper, and lower wavelengths of the splittable wavelength range of the alternately laminated film 32 are $K \cdot \lambda_0$, $K \cdot (1+\Delta g) \cdot \lambda_0$, and $K \cdot (1-\Delta g) \cdot \lambda_0$, respectively, the upper limit wavelength $(1+\Delta g)\cdot\lambda_0$, of the splittable wavelength range of the alternately laminated film 31 and the lower limit wavelength $K \cdot (1-\Delta g) \cdot \lambda_0$, of the splittable wavelength range of the alternately laminated film 32 are caused to coincide with each other as shown in FIG. 5A. In other words, by satisfying Equation (14), the splittable wavelength range of the polarizing multilayered film 3 can be extended the most.

$$K = \frac{1 + \Delta g}{1 - \Delta g} \quad (14)$$

Figure 5B:
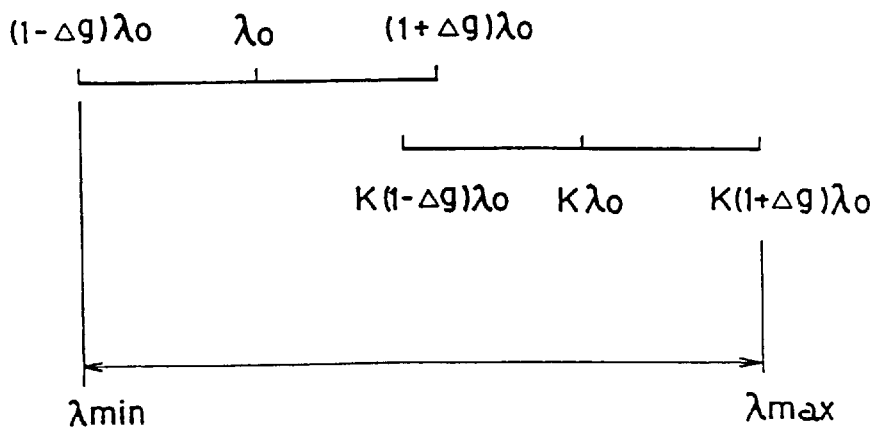

However, the splitting efficiency tends to be reduced at the junction wavelength. In order to avoid this, the number of high and low refractive layers 31H, 31L forming the polarizing multilayered film 3 needs to be set at a large number. In order to prevent a reduction in the splitting efficiency with a reasonable number of layers, it is desirable to set the value of K as defined in Equation (15), so that the splittable wavelength ranges of the alternately laminated films 31, 32 partially overlap each other as shown in FIG. 5B.

$$K \leq \frac{1 + \Delta g}{1 - \Delta g} \cdot 0.95 \quad (15)$$

Similar to the first embodiment, in order to efficiently split the polarized beam under the following conditions of the projector:

upper limit wavelength $WL_{max}=700$ nm
lower limit wavelength $WL_{min}=400$ nm
incident angle $\theta=45°$
angle of shift $\delta=3°$, the conditions defined by Equation (16) need to be satisfied.

$$\frac{1+\Delta g}{1-\Delta g} \cdot 0.95\left(1+\frac{\Delta g}{0.9}\right) \cdot \frac{\cos 48°}{\cos 45°} \cdot \lambda_0 \geq 700 \quad (16)$$

$$\frac{\cos 42°}{\cos 45°} \cdot (1-0.9 \cdot \Delta g)\lambda_0 \leq 400$$

Figure 6:
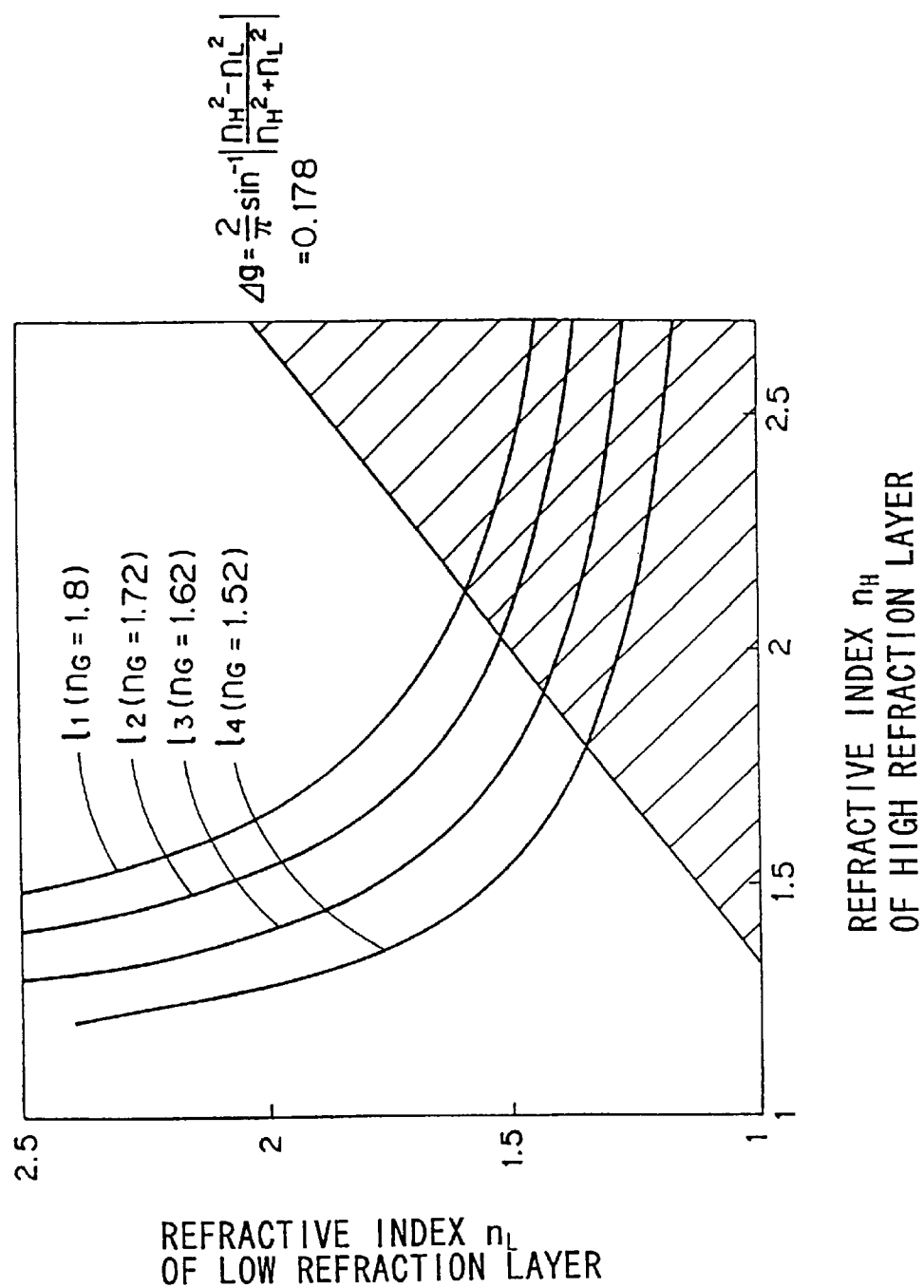
FIG. 6 is a chart showing the conditions for ensuring a satisfactory polarized light splitting characteristic in the polarized beam splitter of FIG. 4A.

By solving Equation (16), the inequality defined by Equation (13) can be obtained. In other words, by constructing the polarized beam splitter so as to satisfy Equation (13), i.e., to fall within a hatched region of FIG. 6, the polarized beam can efficiently be split into the S-polarized light and P-polarized light over the entire visible spectrum (400 nm to 700 nm) even if the incident beam includes rays incident on the polarized beam splitter at an angle shifted from 45° by ±3° as well as a ray incident thereon at 45°.

Further, the splitting efficiency reaches its maximum at the incident angle 45° by satisfying Equation (12). For example, by setting the refractive indices $n_G$, $n_H$, $n_L$ along the respective curves $1_1$, $1_2$, $1_3$, $1_4$ of FIG. 6, the splitting efficiency reaches its maximum at the incident angle $\theta$ and the polarized beam can efficiently be split into the S-polarized light and P-polarized light.

Figure 7A:
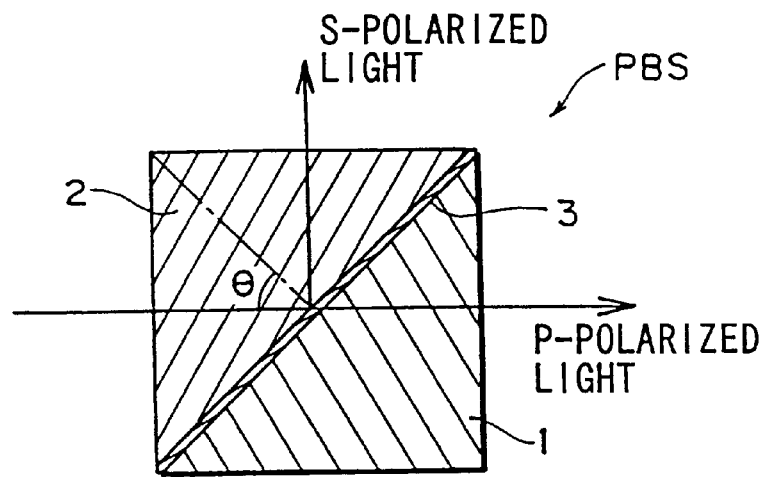
FIG. 7A is a sectional view showing a polarized beam splitter according to a third embodiment of the invention.
Figure 7B:
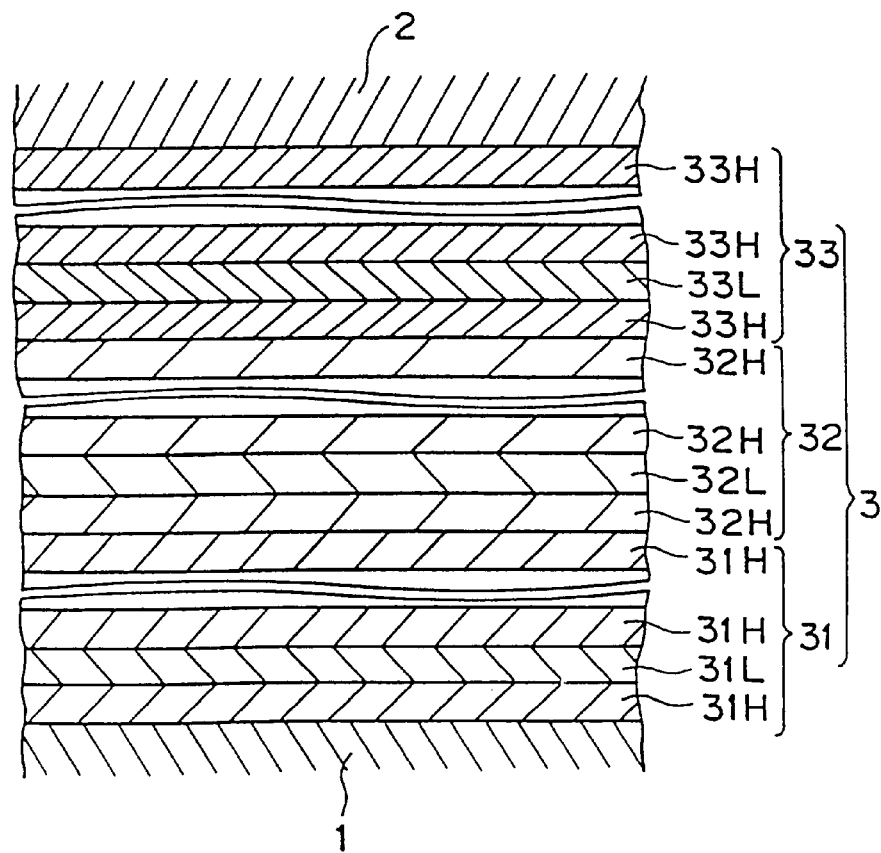
FIG. 7B is a partial enlarged sectional view of the polarized beam splitter of FIG. 7A.

FIG. 7A is a sectional view of a polarized beam splitter according to a third embodiment of the invention, and FIG. 7B is a partial enlarged sectional view of the polarized beam splitter of FIG. 7A. This polarized beam splitter PBS is constructed such that a polarizing multilayered film 3, of the so-called triple layered structure in which three alternately laminated films 31 to 33, having an identical structure, are placed one over another, is held between first and second transparent bases 1, 2 having a refractive index $n_G$ as shown in FIG. 7A. Similarly to that of the first embodiment, the respective alternately laminated films 31 to 33 are formed by alternately laminating high refraction layers 31H, 32H, 33H, having a refractive index $n_H$, and low refraction layers 31L, 32L, 33L, having a refractive index $n_L$ lower than $n_H$.

Since the polarizing multilayered film 3 thus formed satisfies the following inequality (17):

$$\frac{2}{\pi}\sin^{-1}\left|\frac{n_H^2 - n_L^2}{n_H^2 + n_L^2}\right| \geq 0.127, \quad (17)$$

the polarized beam splitter capable of efficiently splitting the polarized beam into the S-polarized light and P-polarized light over the entire visible spectrum (400 nm to 700 nm) can be obtained. Here, the meaning of Equation (17) is described in detail.

In the polarizing multilayered film 3 of triple layered structure as well, the splittable wavelength range of the polarizing multilayered film 3 can be extended by shifting the splittable wavelength ranges of the respective alternately laminated films 31 to 33 as in the case of the film of double layered structure. It is desirable to partially overlap the lower limit wavelength side of the splittable wavelength range of the alternately laminated film 32 with the splittable wavelength range of the alternately laminated film 31 and to partially overlap the upper limit wavelength slide thereof with the splittable wavelength range of the alternately laminated film 33 while suitably setting the value of K in Equation (15).

Accordingly, similar to the first embodiment, in order to efficiently split the polarized beam under the following conditions of the projector:

upper limit wavelength $WL_{max}=700$ nm
lower limit wavelength $WL_{min}=400$ nm
incident angle $\theta=45°$
angle of shift $\delta=3°$, the conditions defined by Equation (18) need to be satisfied.

$$\frac{1+\Delta g}{1-\Delta g} \cdot 0.95\left(1+\frac{\Delta g}{0.9}\right) \cdot \frac{\cos 48°}{\cos 45°} \cdot \lambda_0 \geq 700$$

$$\frac{1-\Delta g}{1+\Delta g} \cdot \frac{1}{0.95}(1+0.9 \cdot \Delta g) \cdot \frac{\cos 48°}{\cos 45°} \cdot \lambda_0 \geq 700$$

By solving Equation (18), the inequality defined by Equation (17) can be obtained. In other words, by constructing the polarized beam splitter so as to satisfy Equation (17), i.e. to fall within a hatched region of FIG. 8, the polarized beam can efficiently be split into the S-polarized light and P-polarized light over the entire visible spectrum (400 nm to 700 nm), even if the incident beam includes rays incident on the polarized beam splitter at an angle shifted from 45° by ±3° as well as a ray incident thereon at 45°.

Further, the splitting efficiency reaches its maximum at the incident angle 45° by satisfying Equation (12). For example, by setting the refractive indices $n_G$, $n_H$, $n_L$ along the respective curves $1_1$, $1_2$, $1_3$, $1_4$ of FIG. 8, the splitting efficiency reaches its maximum at the incident angle $\theta$ and the polarized beam can efficiently be split into the S-polarized light and P-polarized light.

As described above, by constructing the polarized beam splitter PBS so as to satisfy any of Equations (1), (14), (17) according to the structure of the polarizing multilayered film 3, the polarized beam can efficiently be split into the S-polarized light and the P-polarized light over the entire visible spectrum (400 nm to 700 nm).

Further, by constructing the polarized beam splitter PBS so as to additionally satisfy Equation (12), the splitting efficiency reaches its maximum at the incident angle of 45°, which is suitable for the projector.

A specific structure and splitting characteristic of the polarizing multilayered film will be described later in detail.

Figure 9:
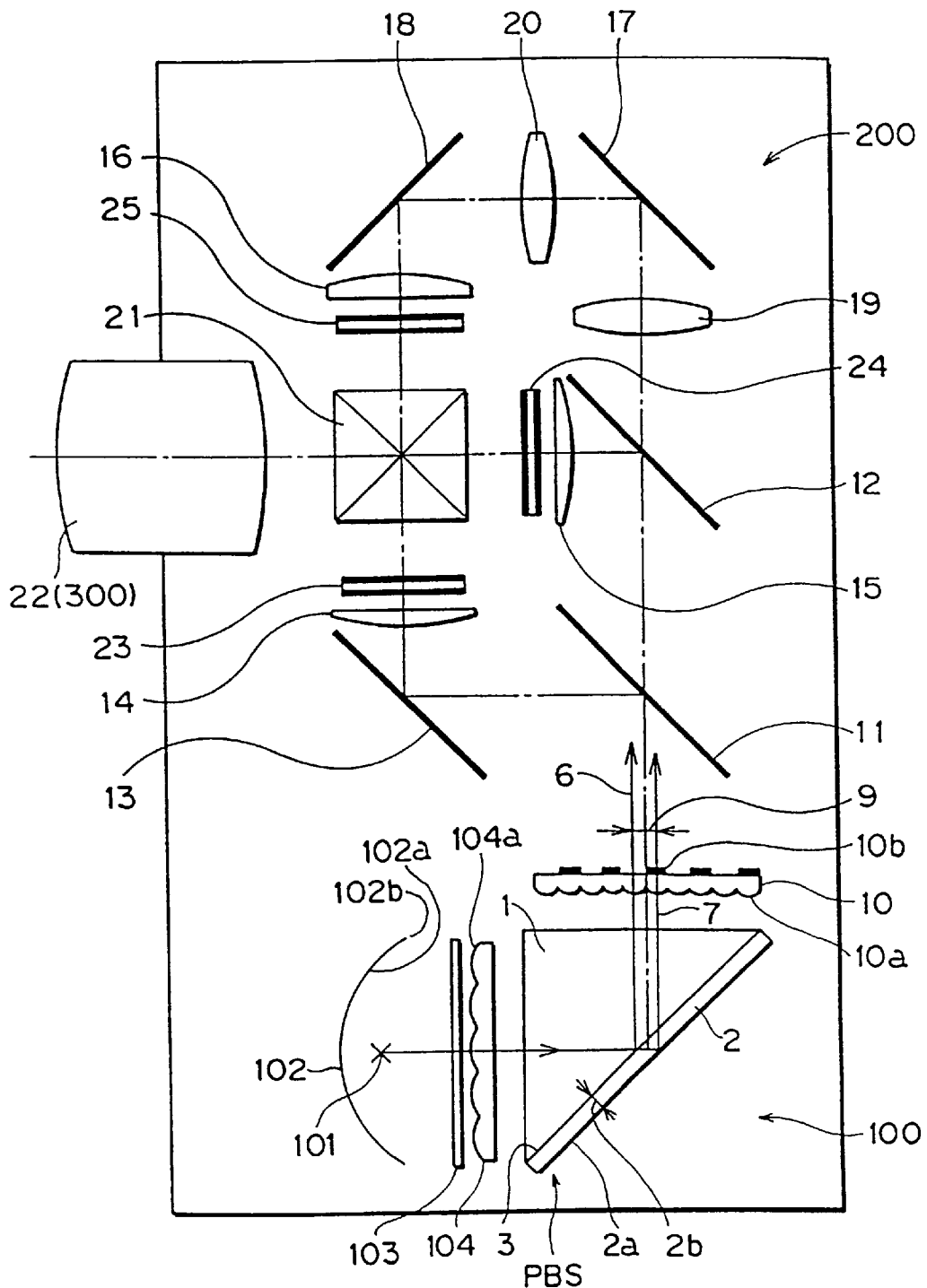
FIG. 9 is a construction diagram of a liquid crystal projector embodying the invention.

FIG. 9 is a construction diagram of a liquid crystal projector embodying the invention. This liquid crystal projector includes an illumination optical system 100, three liquid crystal panels 23 to 25, a color separation optical system 200, and a projection optical system 300. The illumination optical system 100 produces a visible light having an aligned polarization direction. The color separation optical system 200 separates the visible light from the illumination optical system 100 into rays of a plurality of primary colors and projects these rays of the respective primary colors on the corresponding liquid crystal panels 23 to 25. The projection optical system 300 introduces the rays of the respective color components to a screen while causing the optical axes thereof to coincide with each other, thereby projecting images formed on the liquid crystal panels 23 to 25 onto the screen. Respective constructions of the elements will be successively described.

The illumination optical system 100 is constructed such that visible light in a specified visible spectrum is caused to be incident on the polarized beam splitter PBS by a light source 101, a parabolic mirror 102, and an IR-UV cutoff filter 103. Specifically, the light source 101 is a metal halide lamp for irradiating a white beam of randomly polarized light. The parabolic mirror 102 has a reflection surface 102a which is a partial surface including a pole of a paraboloid of revolution and has a cross section which is symmetrical with respect to a line. The parabolic mirror 102 is adapted to reflect a light irradiated from a focus (the light source 101 is located in this focus position) to the outside (rightward in FIG. 9) of an opening 102b. An IR-UV filter 103 is arranged in the vicinity of the opening 102b and is adapted to produce a desired visible light by removing light components within wavelength ranges unnecessary for lights of the three primary colors from the direct light from the light source 101 and the light reflected by the reflection surface 102a.

The thus produced visible light is incident on the first lens array 104 constructing an optical integrator. The first lens array 104 includes a plurality of two-dimensionally arranged first lenses 104a and projects the visible light to the polarized beam splitter PBS while dividing it into a plurality of beams.

The polarized beam splitter PBS is, for example, constructed similarly to the one of the first embodiment. Specifically, the polarized beam splitter PBS is such that the polarizing multilayered film 3 is formed between a transparent glass (first transparent base) 1 in the form of a triangular prism and a glass plate (second transparent base) 2. The splitter PBS is arranged such that the polarizing multilayered film 3 and a rear surface 2a of the glass plate 2 are at 45° to the optical axis of the first lens array 104. When a plurality of beams split by the first lens array 4 are incident on the polarizing multilayered film 3, they are split into rays of first linearly polarized light components (S-polarized light) 6 and rays of second linearly polarized light components (P-polarized light) 7 whose polarization directions are mutually perpendicular. In other words, the first linearly polarized light components of the visible light incident from the first lens array 4 are reflected at right angles by the polarizing multilayered film 3 for the incident angle of 45°, and emerge as the rays (S-polarized light) 6. On the other hand, the rear surface 2a of the glass plate 2 spaced from the polarizing multilayered film 3 by a thickness 2b functions as a full reflection surface. The second linearly polarized light components of the visible light incident from the first lens array 4 and perpendicular to the first linearly polarized light components are reflected at right angles by the rear surface 2a for the incident angle of 45° and emerge as the rays (P-polarized light) 7. The thickness 2b is set based on the interval between the rays 6 and 7 (2½ times the thickness 2b) and the interval between second lenses 10a.

A second lens array 10 constructing the optical integrator includes the second lenses 10a which are arranged in a two-dimensional manner in the vicinity of a position where the plurality of rays 6, 7 split by the polarized beam splitter PBS converge and are as many as a sum of the rays 6 and 7. Specifically, the second lens array 10 has twice as many second lenses 10a as the first lenses 104a of the first lens array 104, i.e., two second lenses 10a adjacent to each other along a vertical direction of FIG. 1 correspond to one first lens 4a. On a portion of the emergent surface of the second lens array 10 where the rays 7 emerge, there are mounted half-wave plates 9 for converting the second linearly polarized light components of the rays 7 so as to have the same polarization direction as the first linearly polarized light components of the rays 6. Accordingly, the visible rays emerging from the second lens array 10 and the half-wave plates 10b have their polarization directions aligned to that of the first linearly polarized light.

The illumination optical system 100 thus constructed can efficiently split the visible beams from the lens array 104 into two linearly polarized rays (S-polarized light and P-polarized light) since the inventive polarized beam splitter is incorporated, and the split rays can efficiently be used to illuminate the liquid crystal panel 23 brightly.

The liquid crystal panel 23 is a transmission type liquid crystal panel and forms an optical image of B; the liquid crystal panel 24 is a transmission type liquid crystal panel and forms an optical image of G; and the liquid crystal panel 25 is a transmission type liquid crystal panel and forms an optical image of R.

The color separation optical system 200 for separating the rays into rays of three primary colors to illuminate the corresponding three liquid crystal panels 23 to 25 includes dichroic filters 11, 12. The dichroic filter 11 has a cutoff value of a wavelength of 510 nm and is adapted to reflect the rays in the wavelength range of B while transmitting the rays in the wavelength ranges of R and G. A full reflection mirror 13 directs the separated rays in the wavelength range of B toward the liquid crystal panel 23. A field lens 14 projects the rays in the wavelength range of B reflected by the full reflection mirror 13 onto the liquid crystal panel 23. The dichroic filter 12 has a cutoff value of a wavelength of 580 nm and is adapted to reflect the rays in the wavelength range of G of those having transmitted the dichroic filter 11 while transmitting the rays in the wavelength range of R. A field lens 15 projects the rays in the wavelength range of G separated by the dichroic filter 12 onto the liquid crystal panel 24. Lenses 19, 20 and full reflection mirrors 17, 18 construct a relay optical system for introducing the rays in the wavelength range of R having transmitted the dichroic filter 12 to the liquid crystal panel 25 while maintaining their illuminance. A field lens 16 projects the rays in the wavelength range of R introduced by the relay optical system onto the liquid crystal panel 25.

A dichroic prism 21 is formed by joining four right-angle prisms so as to have a cubic shape or a rectangular parallelepipedic shape, and dichroic mirror portions are formed on its junction surfaces. The dichroic prism 21 combines the optical images of the respective colors R, G, B formed by the three liquid crystal panels 23 to 25.

A projection lens 22 constructs a projection optical system 300 for enlargedly projecting the color optical image combined by the dichroic prism 21 onto the screen.

As described above, since the polarized beam splitter according to the invention is incorporated in the illumination optical system 100 in this liquid crystal projector, the liquid crystal panels 23 to 25 can be illuminated brightly. As a result, an amount of the lights emerging from the liquid crystal panels 23 to 25 can be increased to make the projected image on the screen brighter.

In the above description, the inventive polarized beam splitter is applied to the liquid crystal projector. However, it is not limited to the application to liquid crystal projectors, but it is also applicable to usual projectors. In such a case as well, similar effects can be obtained.

Figure 10:
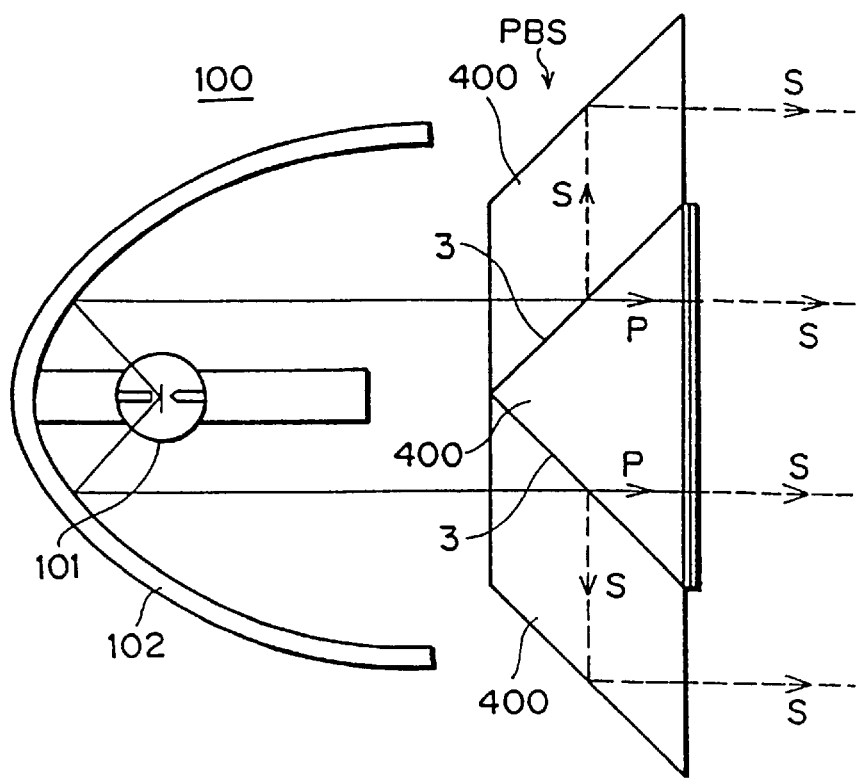
FIG. 10 is a diagram showing a modification of an illumination optical system.
Figure 11:
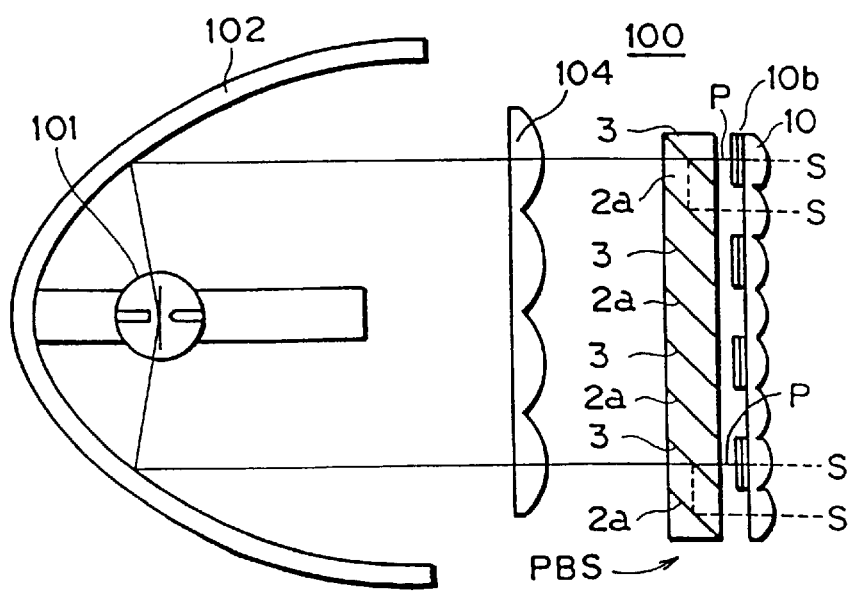
FIG. 11 is a diagram showing another modification of an illumination optical system.

Further, the illumination optical system of the projector is not limited to the one shown in FIG. 9. For example, polarizing multilayered films 3 may be held between a plurality of transparent prisms 400 as shown in FIGS. 10 and 11 so as to split the polarized beam by the respective polarizing multilayered films 3. Since the inventive polarized beam splitter PBS is adopted in either case, the visible beam from the light source 101 can efficiently be split into two linearly polarized lights (S-polarized light and P-polarized light) to efficiently illuminate a specimen brightly.

Although the illumination optical system is constructed using the inventive polarized beam splitter in the above description, the polarized beam splitter is not limited to its application to illumination optical systems. For example, in a projection type stereoscopic television receiver disclosed in Japanese Examined Patent Publication No. 5-73116, P-polarized light and S-polarized light are projected onto a screen while being overlapped so as to have the same optical axis by the polarized beam splitter. The inventive polarized beam splitter can be used as such a polarized beam splitter. By using the inventive polarized beam splitter, the P- and S-polarized lights can efficiently be introduced to the screen, thereby forming a bright image on the screen.

Figure 12:
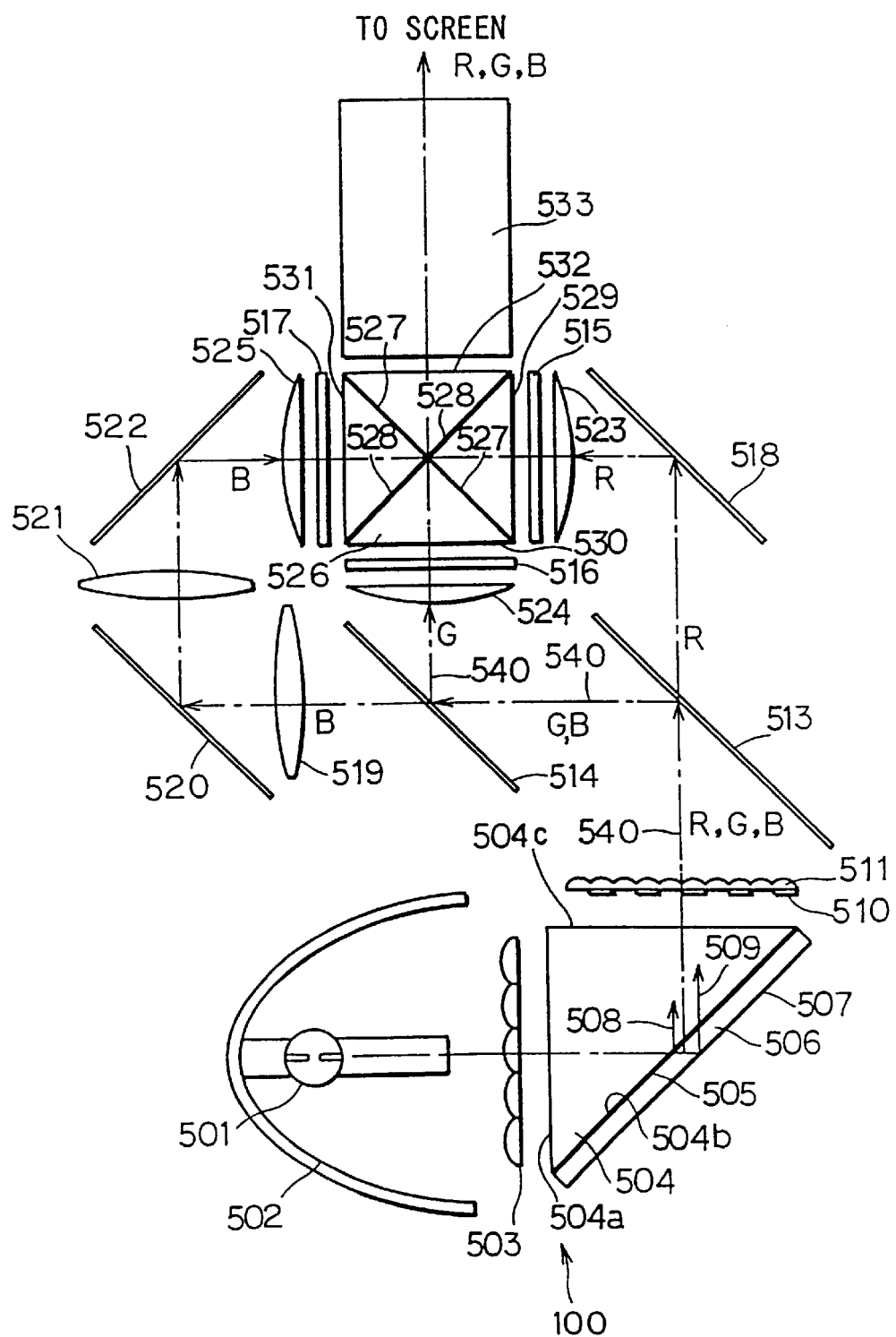
FIG. 12 is a construction diagram of another liquid crystal projector embodying the invention.

FIG. 12 is a diagram showing another embodiment of the liquid crystal projector embodying the invention. This liquid crystal projector includes three liquid crystal panels 515 to 517 for forming desired optical images to be enlargedly projected onto a screen, an illumination optical system 100, a dichroic prism (image combination optical system) 526, and a projection optical system 533. The illumination optical system 100 produces an illumination light having an aligned polarization direction and illuminates the liquid crystal panels 515 to 517 by separating the illumination light into beams of three primary colors and projecting them to the corresponding liquid crystal panels 515 to 517. The dichroic prism 526 combines the optical images on the respective liquid crystal panels 515 to 517 by causing the optical axes of the beams of the respective color components from the liquid crystal panels 515 to 517 to coincide with each other. The projection optical system 533 introduces the light from the dichroic prism 526 to the screen, thereby enlargedly projecting an image obtained by combining the images formed on the liquid crystal panels 515 to 517. Respective constructions of the elements will be successively described.

In the illumination optical system 100, a light source 501, including a metal halide lamp for emitting a white randomly polarized light, is arranged in one focal point of a parabolic mirror 502, so that the beams of light from the light source 501 are directly directed toward an opening side of the parabolic mirror 502 (to the right side of FIG. 12) and the remaining beams of light are introduced to the opening side of the parabolic mirror 502 after being reflected by a reflecting surface of the parabolic mirror 502.

At the opening side of the parabolic mirror 502 is arranged a first lens array 503 in which a plurality of lenses are arrayed in a two-dimensional manner. The randomly polarized light, emitted from the light source 501 as described above, is incident on the first lens array 503 together with the light reflected by the parabolic mirror 503. The light is incident on a polarized beam splitter after being split into a plurality of beams.

In this polarized beam splitter 504, one of the surfaces intersecting at right angles acts as an incident surface of the beams from the first lens array 503 and a polarized light splitting film 505 is formed on an oblique surface 504b. A plane-parallel plate 506 is jointed with the polarized light splitting film 505, so that a light transmitted through the polarized light splitting film 505 is fully reflected by a non-joint surface 507 of the plane-parallel plate 506, thereby being returned toward the polarized light splitting film 505. Specifically, first linearly polarized light components (S-polarized light components) of the beams perpendicularly incident on the surface 504a of the polarized beam splitter 504 are reflected by the polarized light splitting film 505 and emerge from a surface 504c as rays 508, whereas second linearly polarized light components (P-polarized light components) thereof, transmitted through the polarized light splitting film 505, are fully reflected by the surface 507 of the plane-parallel plate 506, and emerge from the surface 504c as rays 509. Accordingly, the rays 508, 509 emerge at equal intervals from the polarized beam splitter 504 by suitably setting the thickness of the plane-parallel plate 506.

As described above, the polarized beam splitter 504 splits the randomly polarized beam into S-polarized light and P-polarized light. The splitting efficiency thereof varies with an incident angle of the beam on the polarized light splitting film 505, and reaches its maximum at a specified incident angle (this incident angle is referred to as "maximum efficiency incident angle" throughout the specification). In this embodiment, in order to suppress the luminance non-uniformity in the image on the screen, an incident angle of the main ray of the beam on the polarized light splitting film 505 is slightly shifted from the maximum efficiency incident angle. The reason therefor is described in detail after the construction of the liquid crystal projector is described.

Further, a second lens array 511 constructing an optical integrator is arranged opposite from the surface 504c of the polarized beam splitter 504 constructed as above and in the vicinity of a focal point of the first lens array 503. A plurality of secondary light source images are formed in the vicinity of the individual lenses constructing the second lens array 511. The number of lenses constructing the second lens array 511 is equal to the number of the rays 508 and 509, i.e., is twice the number of the first lenses of the first lens array 503. In portions of the incident surface of the second lens array 511 where the rays 509 are incident, half-wave plates 510 are mounted to convert the second linearly polarized light components of the rays 509 into those having the same polarization direction as the first linearly polarized light components of the rays 508. Accordingly, the illumination light emerged from the second lens array 511 and the half-wave plates 510 has its polarization direction aligned to that of the first linearly polarized light components.

The rays from the secondary light source images formed in the vicinity of the second lens array 511 are split into rays in three wavelength ranges of R, G, B by a dichroic filter 513 for transmitting rays in the wavelength range of R while reflecting the rays in the wavelength ranges of G, B and a dichroic filter 514 for reflecting the rays in the wavelength range of G while transmitting the rays in the wavelength range of B, and are projected to the corresponding liquid crystal panels 515, 516, 517.

Specifically, the rays in the wavelength range of R are transmitted by the dichroic filter 513, are reflected by a full reflection mirror 518 and are projected to the liquid crystal panel 515 for red via a field lens 523 in parallel with the optical axis of the liquid crystal panel 515, thereby illuminating this liquid crystal panel 515. The rays in the wavelength range of G are reflected by both dichroic filters 513, 514 and are projected to the liquid crystal panel 516 for green via a field lens 524 in parallel with the optical axis of the liquid crystal panel 516, thereby illuminating this liquid crystal panel 516. The rays in the wavelength range of B are reflected by the dichroic filter 513, are transmitted by the dichroic filter 514, and are projected to the liquid crystal panel 517 for blue via a lens 519, a full reflection mirror 520, a lens 521, a full reflection mirror 522, and a field lens 525 in parallel with the optical axis of the liquid crystal panel 517, thereby illuminating this liquid crystal panel 516.

In this embodiment, the liquid crystal panels 515 to 517 are of the transmission type. The liquid crystal panel 515, to which the rays in the wavelength range of R are projected by the illumination optical system 100 constructed as above, forms an optical image of R. The liquid crystal panel 516, to which the rays in the wavelength range of G are projected by the illumination optical system 100 constructed as above, forms an optical image of G. The liquid crystal panel 517, to which the rays in the wavelength range of B are projected by the illumination optical system 100 constructed as above, forms an optical image of B. The rays from the respective liquid crystal panels 515 to 517 are incident on the dichroic prism 526 as an image combination optical system, with the result that the optical images on the liquid crystal panels 515 to 517 are combined.

The dichroic prism 526 is formed to have a cubic shape or a rectangular parallelepipedic shape by joining the surfaces of four right-angle prisms intersecting at right angles. On the joint surfaces are formed red reflecting dichroic mirrors 527 and blue reflecting dichroic mirrors 528 as multilayered films. The red reflecting dichroic mirrors 527 reflect the rays in the wavelength range of R while transmitting the rays in the wavelength ranges of G, B. The blue reflecting dichroic mirrors 528 reflect the rays in the wavelength range of B while transmitting the rays in the wavelength ranges of R, G.

In this dichroic prism 526, three of the four hypotenuse surfaces of the four right-angle prisms are incident surfaces 529, 530, 531 arranged opposite to the corresponding liquid crystal panels 515 to 517, and the remaining one surface is an emergent surface 532. Specifically, the liquid crystal panel 516 for green is arranged opposite to the incident surface 530, and the rays from this panel 516 reach the emergent surface 532 after being transmitted by the two dichroic mirrors 527, 528. The liquid crystal panels 515, 517 for red and blue are arranged opposite to the incident surfaces 529, 531, respectively, and the rays from these panels 515, 517 reach the emergent surface 532 after being reflected by the red and blue reflecting dichroic mirrors 527, 528, respectively. In this way, the dichroic prism 526 combines the optical images on the respective liquid crystal panels 515 to 517 while aligning the optical axes of the rays of the respective color components (R, G, B) emerging from the liquid crystal panels 515 to 517.

The thus combined optical image is enlargedly projected onto the screen by the telecentric projection lens 533 as a projection optical system which is arranged opposite to the emergent surface 532 of the dichroic prism 526.

Next, the reason why the incident angle of the main ray of the beam on the polarized light splitting film 505 is slightly shifted from the maximum efficiency incident angle in this embodiment is described in detail.

Conventionally, the liquid crystal panels 515 to 517 have been uniformly illuminated in order to enlargedly project an optical image of good quality onto the screen. However, luminance partially differs in the image actually projected onto the screen. After studying causes of such problem, the following conclusion has been reached.

Figure 13:
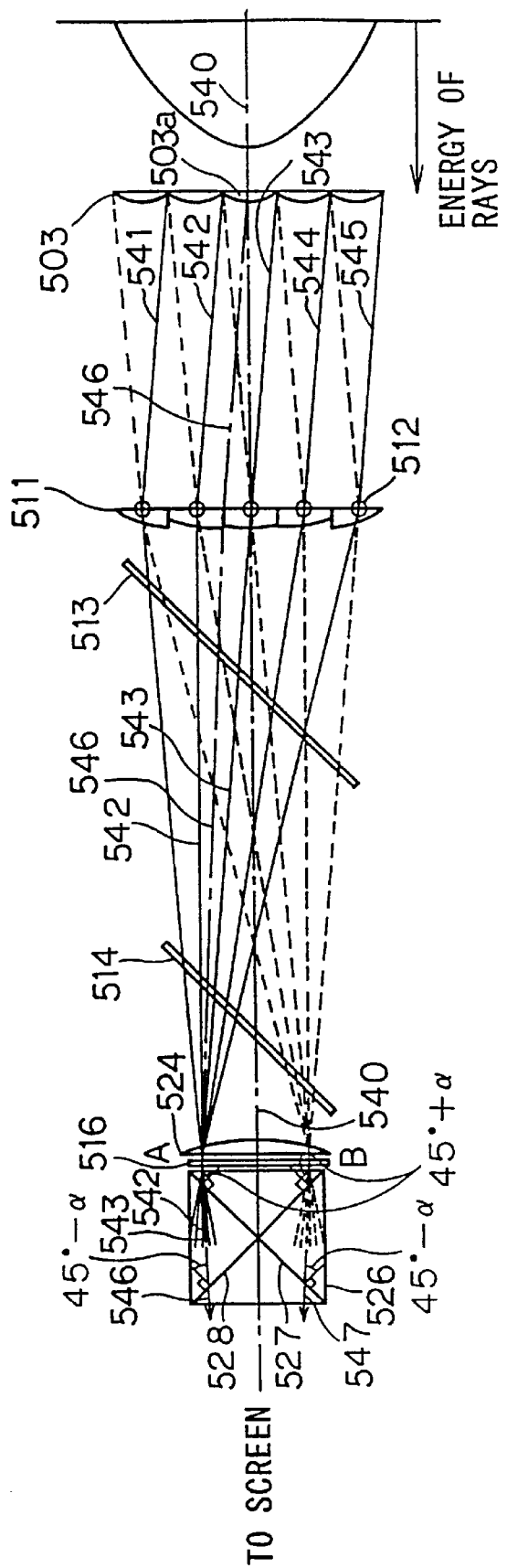
FIG. 13 is a diagram showing an optical axis of rays in a green wavelength range along one straight line.

The cause of a luminance difference in the image formed on the screen is described for the rays in the wavelength range of G having a largest influence on the luminance of the image with reference to FIG. 13. In order to simplify the description, the splitting and the polarization conversion for aligning the polarization direction by the polarized beam splitter are not to be described.

As described above, the beams from the light source divided by the respective lenses of the first lens array 503 form the secondary light source images 512 by being converged in the vicinity of the second lens array 511, and the respective second light source images 512 illuminate the entire surface of the liquid crystal panel 516. In other words, the respective lenses of the first lens array 503 are arranged in such positions as to perform a conjugated function with the liquid crystal panel 516. Accordingly, the optical paths of the rays reaching an A-side of the liquid crystal panel 516 and those reaching a B-side thereof are as shown in solid and broken lines, respectively, in FIG. 13.

On the other hand, the field lens 524, arranged in the vicinity of the incident side of the liquid crystal panel 516, telecentrically illuminates the liquid crystal panel 516 by making the rays incident thereon while spreading from the secondary light source images 512 in the vicinity of the second lens array 511 into parallel rays. Accordingly, a focal length of the field lens 524 is set equal to a distance between the second lens array 511 and the field lens 524.

The rays incident on the A-side of the liquid crystal panel 516 are considered. For example, there are rays passing along five optical paths 541 to 545. Out of these five rays, only the ray passing along the optical path 543 from the lens 503a on an optical axis 540 is made into a ray parallel to the optical axis 540 by the field lens 524 set as above.

However, since the energy of the rays influencing the luminance of the image formed on the screen has a distribution centered on the optical axis 540 (see FIG. 13), the rays passing along the optical paths 542, 543 have highest energy among the five rays incident on the A-side of the liquid crystal panel 516, and those passing along the optical paths 541, 544, 545 have successively lower energy in this order. In other words, a center 546 of an energy distribution of the rays incident on the A-side does not coincide with the optical path 543, but is located between the optical paths 542 and 543. Thus, in the case that the ray on the optical path 543 is made into a ray parallel to the optical axis 540 by the field lens 524, the center 546 of the energy distribution is tilted toward the optical axis 540. Therefore, the rays are incident on the dichroic prism 526 while being slightly converged.

For example, if the energy center 546 of the rays incident on the dichroic prism 526 from the A-side of the liquid crystal panel 516 were converged by an angle α, they would be incident on the red and blue reflecting dichroic mirror 527, 528 at 45°+α45°−α. If the same concept is applied, an energy center 547 of the rays from the B-side of the liquid crystal panel 516 would be incident on the blue and red reflecting dichroic mirrors 527, 528 at 45°+α, 45°−α in contrast with the A-side.

However, the red and blue reflecting dichroic mirrors 527, 528 of the dichroic prism 526 have generally such a characteristic that a wavelength at which transmittance becomes 50% as the incident angle increases (hereinafter, "cutoff wavelength") is shifted to a short wavelength side. Accordingly, a problem arises in that a range of wavelengths capable of transmitting the dichroic prism 526 differs between the rays from the A-side and those from the B-side.

Figure 14A:
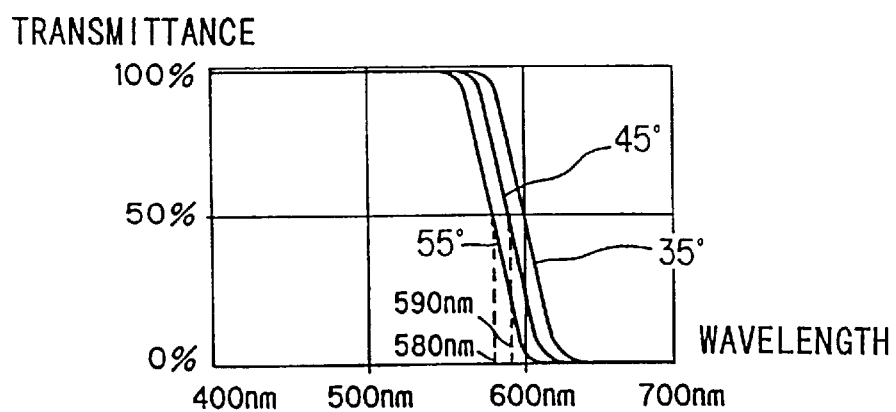
FIGS. 14A to 14C are graphs showing characteristics of dichroic mirrors and a wavelength range transmitting a dichroic prism, FIG. 14A showing an incident angle characteristics of a red reflecting dichroic mirror, FIG. 14B showing an incident angle characteristics of a blue reflecting dichroic mirror, and FIG. 14C showing a range of wavelengths capable of transmitting a dichroic prism.
Figure 14B:
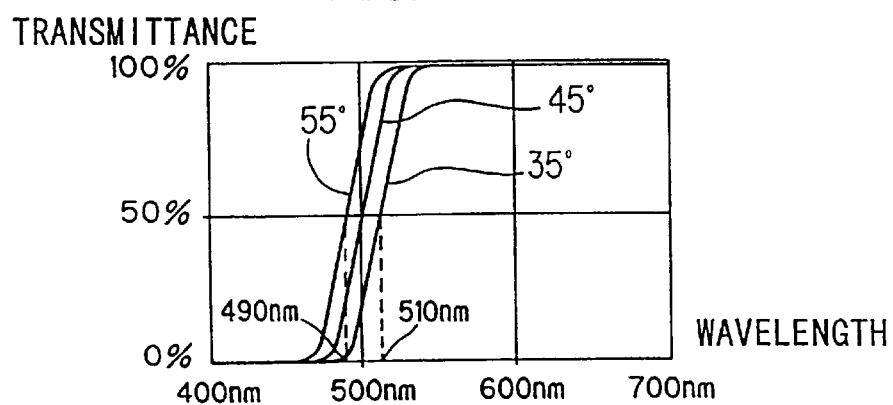
Figure 14C:
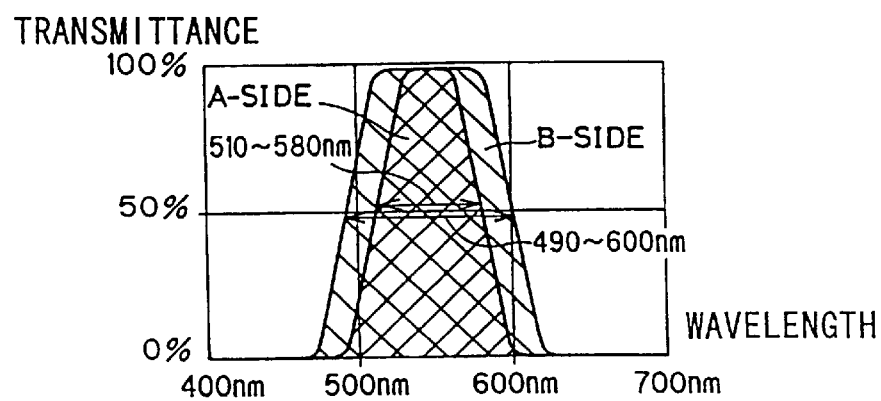

In order to specifically describe the above problem, it is assumed that the convergence angle α of the energy center of the rays incident on the dichroic prism 526 is 10° and the dichroic mirrors 527, 528 have characteristics shown in FIGS. 14A, 14B. The cutoff wavelength of the red reflecting dichroic mirror 527 shown in FIG. 14A is 590 nm at an incident angle of 45°; 580 nm at an incident angle of 55°; and 600 nm at an incident angle of 35°. Likewise, the cutoff wavelength of the blue reflecting dichroic mirror 528 shown in FIG. 14B is 500 nm at an incident angle of 45°; 490 nm at an incident angle of 55° and 510 nm at an incident angle of 35°.

Accordingly, by combining these dichroic mirrors 527, 528, the rays from the A-side of the liquid crystal panel 516 in a wavelength range of 510 to 580 nm and those from the B-side in a wavelength range of 490 to 600 nm are transmitted by the dichroic prism 526. The B-side is brighter because of a wider transmitting wavelength range. As a result, a luminance difference is caused in the image formed on the screen via the projection lens 533.

In order to solve this problem, the liquid crystal panels 515 to 517 are illuminated at different values of illuminance by slightly shifting the incident angles of the rays on the polarized light splitting film 505 from the maximum efficiency incident angle in this embodiment. This is designed to make the luminance in the image formed on the screen uniform by canceling the illuminance nonuniformity on the liquid crystal panels 515 to 517 and the influence by the dichroic mirrors 527, 528.

Figure 15:
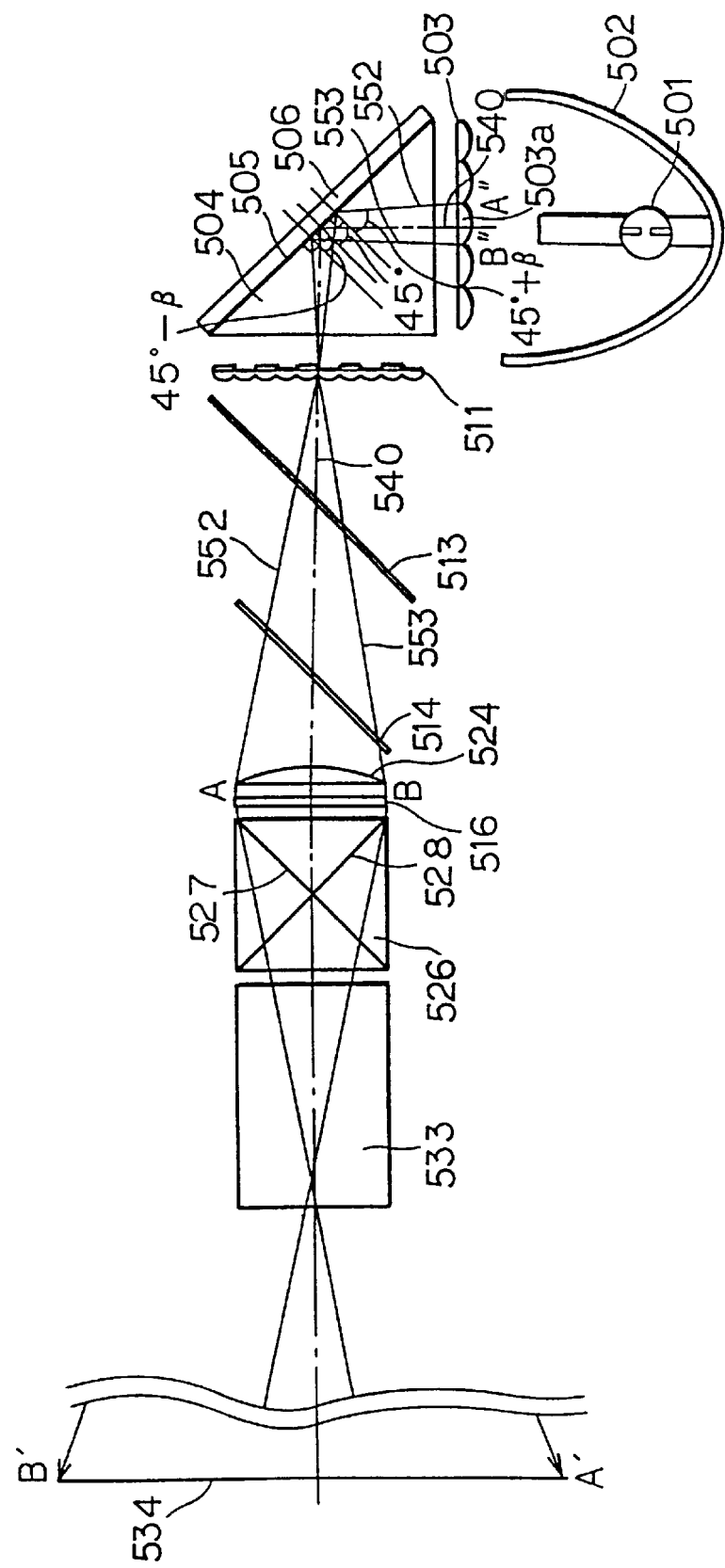
FIG. 15 is a diagram conceptually showing a conjunctive relationship between a screen, a liquid crystal panel, and lenses constructing a first lens array.

A specific structure of the polarized light splitting film 505 is described with reference to FIG. 15. FIG. 15 is a diagram conceptually showing a conjugated relationship of the screen 534, the liquid crystal panel 516 for green, and the individual lenses of the first lens array 503.

As described above, in FIG. 15 as well, an image A' of the A-side of the liquid crystal panel 516 is dark and an image of the B-side thereof is bright on the screen 534 depending upon the arrangement of the red and blue dichroic mirrors 527, 528 of the dichroic prism 526 in the case that the liquid crystal panel 516 is uniformly illuminated. Accordingly, the luminance nonuniformity of the image formed on the screen 534 can be reduced or eliminated if the A-side of the liquid crystal panel 516 is made brighter and the B-side thereof is made darker by the illumination optical system 100.

The lenses of the first lens array 503 are in conjugated relationship with the liquid crystal panel 516. If these lenses are represented by the lens 503a on the optical axis 540 and the optical path from this lens 503a to the liquid crystal panel 516 is considered, the A-side of the liquid crystal panel 516 corresponds to an A"-side of the lens 503a and the B-side thereof corresponds to a B"-side of the lens 503a.

The main ray from the lens 503a is incident on the polarized light splitting film 505 at 45°. However, the ray on the optical path 552 from A" to A and the ray on the optical path 553 from B" to B are incident on the polarized light splitting film 505 at 45°+β, 45°−β, respectively. The angle β results from the converging angle of the lens 503a (first lens array) and is common among all the lenses constituting the first lens array 503.

Figure 16:
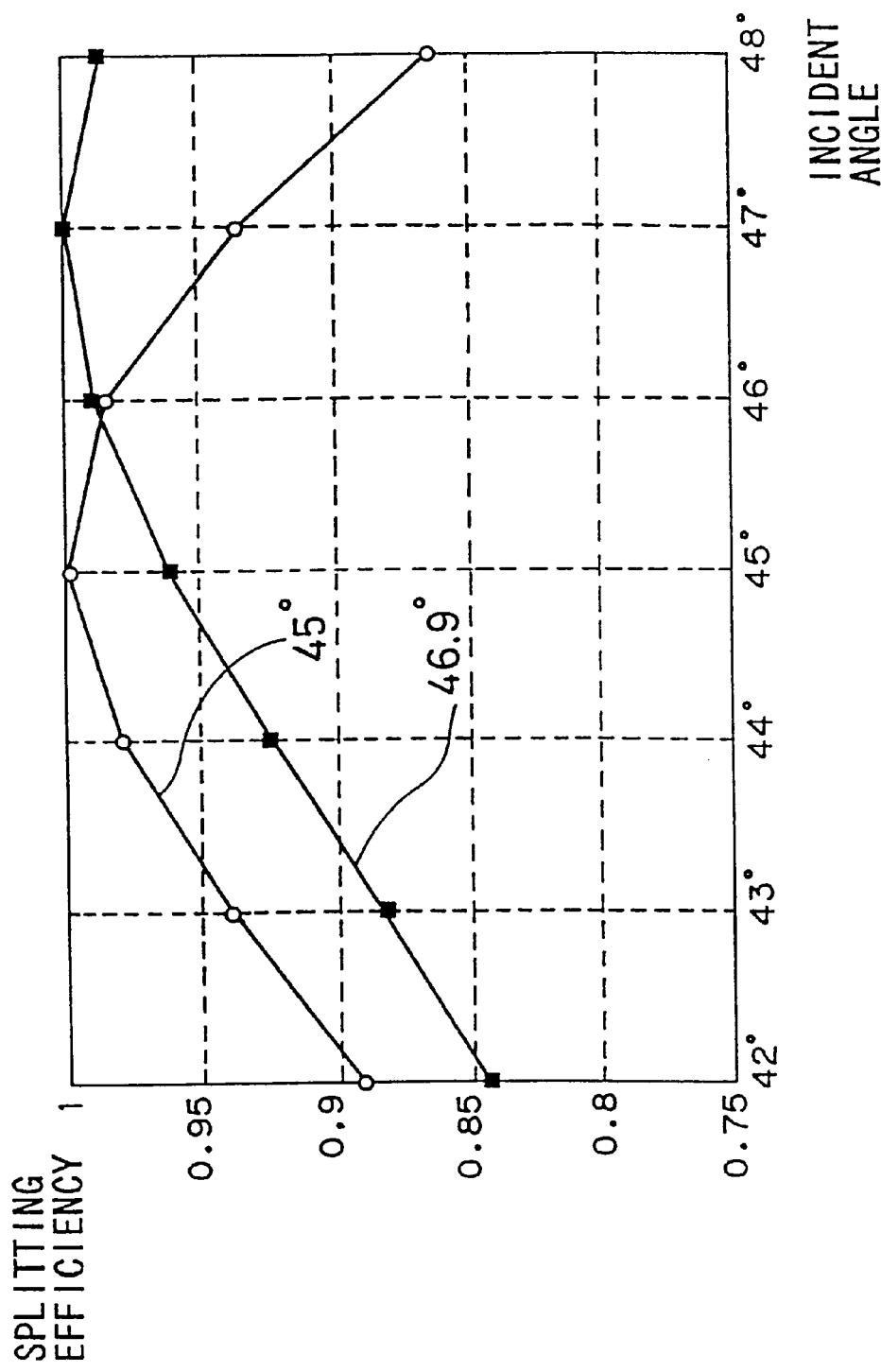
FIG. 16 is a graph showing a polarization conversion efficiency in relation to an incident angle of a beam on a polarized light splitting film.

As described above, the rays reaching the A-side of the liquid crystal panel 516 and the rays reaching the B-side of the liquid crystal panel 516 are incident on the polarized light splitting film 505 at different angles. However, the splitting efficiency of the polarized light splitting film 505 is also dependent on the incident angle similar to the dichroic mirrors 527, 528, i.e., it decreases substantially symmetrically with respect to the maximum efficiency incident angle. FIG. 16 is a graph showing a relationship between the incident angle and the splitting efficiency of the polarized light splitting films 505 constructed such that their maximum efficiency incident angles are 45° and 46.9°, respectively. Taking advantage of the incident angle dependency of the splitting efficiency, illuminance nonuniformity can be produced when the liquid crystal panel 516 is illuminated.

The polarized light splitting film 505 generally includes an alternately laminated film obtained by alternately laminating high refraction layers (refractive index $n_H$) and low refraction layers (refractive index $n_L$), and is held between glass layers (refractive index $n_G$). An incident angle θ, at which the splitting efficiency of the polarized light splitting film 505 is at maximum, is given by Equation (19):

$$\sin^2\theta = \frac{n_H^2 \cdot n_L^2}{n_G^2 \cdot (n_H^2 \cdot n_L)}. \qquad (19)$$

Accordingly, the polarized light splitting film 505 having a desired maximum efficiency incident angle can be formed by combining suitable materials.

Referring back to FIG. 15, in this embodiment, it is desired to produce such an illuminance nonuniformity as to make the A-side of the liquid crystal panel 516 brighter than the B-side thereof by increasing the luminance of the ray on the optical path 552 which is incident from A" on the polarized light splitting film 505 at 45°+β and reaches the point A on the liquid crystal panel 516 as against the luminance of the ray on the optical path 553 which is incident from B" on the polarized light splitting film 505 at 45°−β and reaches the point B on the liquid crystal panel 516.

Accordingly, in this embodiment, the polarized light splitting film 505 is formed such that the maximum efficiency incident angle is larger than the incident angle 45° of the main ray emerging from the first lens array 503.

Since a shift amount of the maximum efficiency incident angle may depend on not only the focal length of the first lens array 503, but also the dichroic prism 526 and the projection lens 533, it cannot generally be determined. As an example, the luminance of the image formed on the screen 534, in the case that the maximum efficiency incident angle of the polarized light splitting film 505 is varied in the liquid crystal projector of the first embodiment, is shown in FIG. 17.

Figure 17:
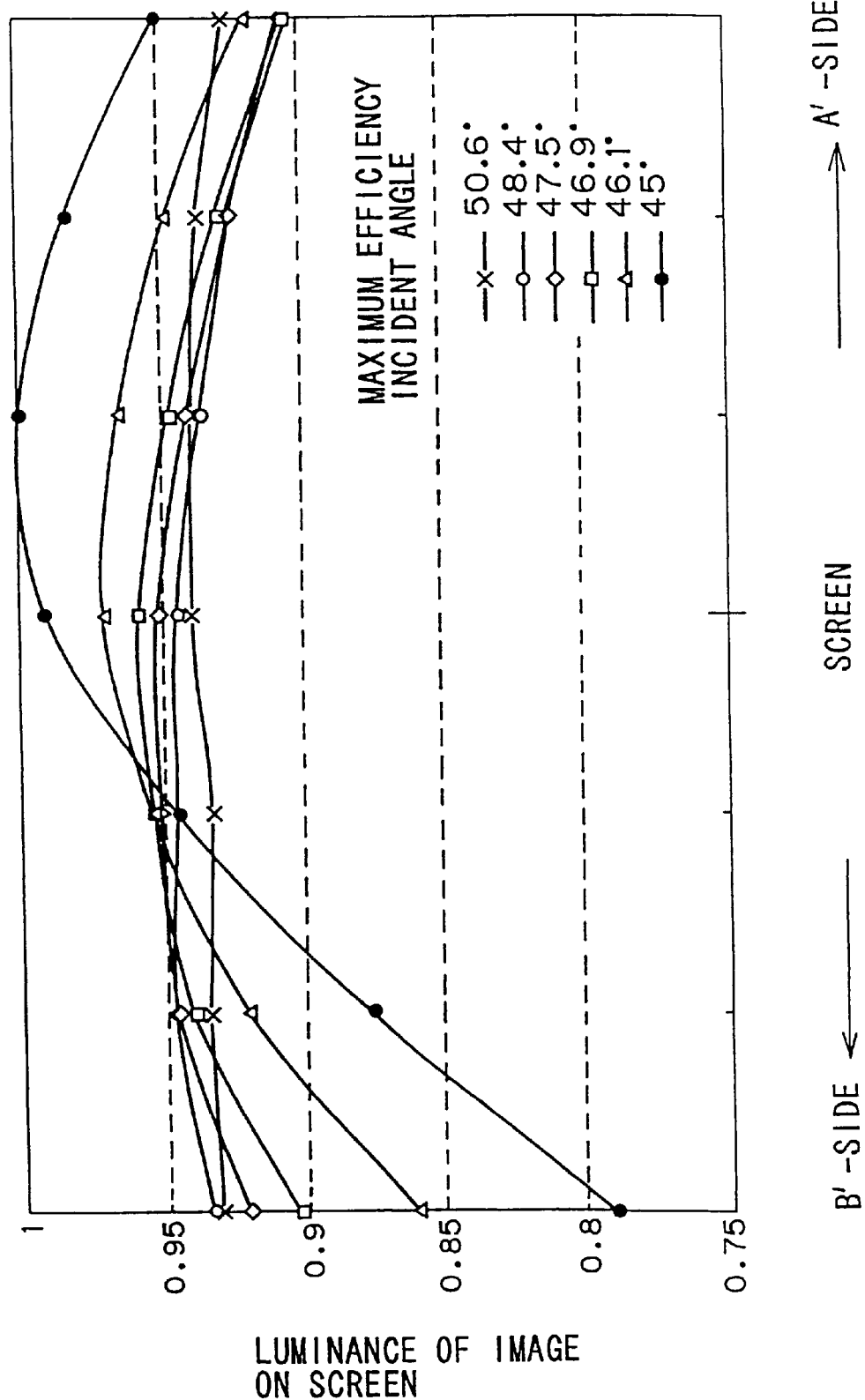
FIG. 17 is a graph showing a luminance of an image formed on the screen in the case that the incident angle of the beam at which the polarization conversion efficiency of the polarized light splitting film is at maximum is varied in the liquid crystal projector of FIG. 12.

As seen from FIG. 17, a large luminance nonuniformity caused by the dichroic prism 526 is seen at A'- and B'-sides on the screen 534 in the case that the maximum efficiency incident angle is set at the incident angle 45° of the main one of the rays from the first lens array 503. As the maximum efficiency incident angle is gradually increased from 45°, the luminance nonuniformity of the image formed on the screen 534 is reduced. When the maximum efficiency incident angle is set at 50.6°, the luminance nonuniformity is almost completely eliminated.

The illuminance nonuniformity is remarkably improved in the case where the maximum efficiency incident angle is shifted to 50.6° as compared with the case where the maximum efficiency incident angle is shifted to 46.9°. However, in this case, the luminance of the entire screen 534 is reduced. Thus, it is desirable to select a suitable value for the shift amount in view of the luminance and the luminance nonuniformity.

From the results shown in FIG. 17, it is preferable to shift the maximum efficiency incident angle within a range of about 2° to 7° in the case of the liquid crystal projector having a general construction. Particularly, in the case where the maximum efficiency incident angle is shifted by about 3° to 5°, the luminance nonuniformity is almost completely eliminated and the luminance of the entire screen 534 is not considerably reduced. Therefore, this range is particularly preferable.

Figure 18:
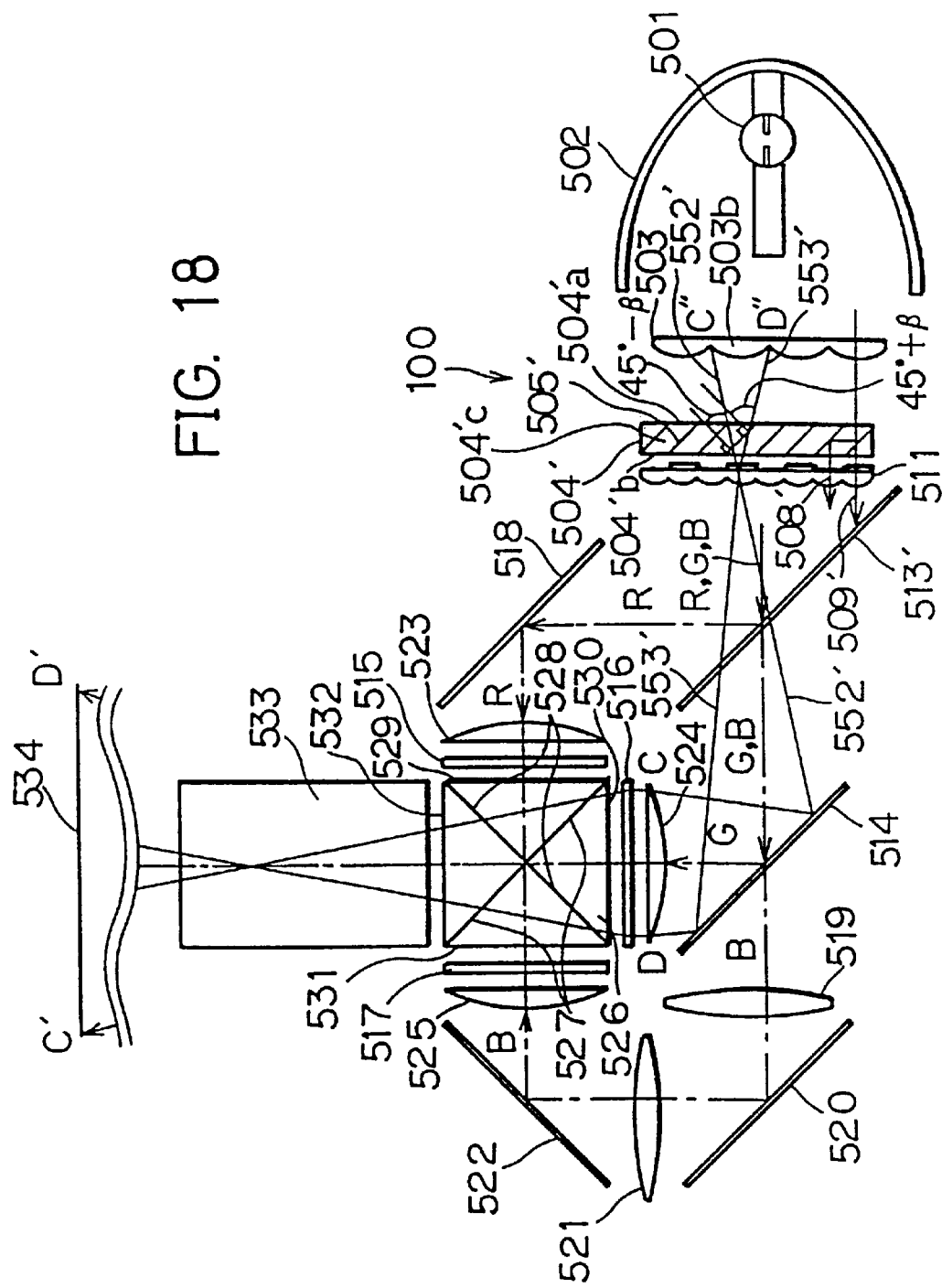
FIG. 18 is a diagram showing a construction of still another liquid crystal projector embodying the invention.

FIG. 18 is a construction diagram of still another liquid crystal projector embodying the invention. A big difference between this liquid crystal projector and the one shown in FIG. 12 is that, in the illumination optical system 100, a polarized beam splitter 504' is a flat plate; the arrangement of the parts is changed, and the characteristic of a dichroic filter as a color separation optical system is changed accordingly. A detailed description is centered on the differences of the illumination optical system 100 from the embodiment shown in FIG. 12, and no repetitive description is given on the common construction, the elements of which are identified by the same reference numerals.

In the illumination optical system 100 according to this embodiment, a parabolic mirror 502, having a light source 501 arranged in one focus position thereof, is arranged so as to open toward the left of FIG. 18, and a first lens array 503 is arranged at this open side. Randomly polarized light emitted from the light source 501 and the light reflected by the parabolic mirror 502 are incident on the first lens array 503 and then incident on the polarized beam splitter 504' in the form of a flat plate as a whole after being split into a plurality of beams.

This polarized beam splitter 504' has one surface 504'a as an incident surface of the beams from the first lens array 503 and the other surface 504'b as an emergent surface and is formed by laminating glass bases 504'c, having a specified thickness, and polarized light splitting films 505' while being inclined by 45° with respect to the incident and emergent surfaces 504'a, 504'b. Among the beams emerging from the first lens array 503 and perpendicularly incident on the incident surface 504'a, first linearly polarized light components (S-polarized light components), having a property of being reflected by the polarized light splitting films 505', are reflected at 45° by the polarized light splitting films 505' inasmuch as being incident thereon at 45° and are incident on the adjacent polarized light splitting films 505' at 45°. These light components are also reflected at 45° by the adjacent polarized light splitting films 505' and consequently emerge from the emergent surface 504'b as rays 508'. On the other hand, second linearly polarized light components (P-polarized light components), having a property of being transmitted by the polarized light splitting films 505', transit the polarized light splitting films 505' and emerge from the emergent surface 504' as rays 509'.

As described above, the polarized beam splitter 504' splits the randomly polarized light into the S-polarized light and P-polarized light, and is constructed such that the maximum efficiency incident angle of the polarized light splitting films 505', at which the splitting efficiency is at maximum, is slightly shifted from 45° which is an incident angle of a main ray 551' of the rays having emerged from the first lens array 503 and incident on the splitter 504'. This is described in detail later.

A second lens array 511 is arranged in the vicinity of the focus position of the first lens array 503 opposite to the emergent surface 504'b of the thus constructed polarized beam splitter 504', and a plurality of secondary light source images are formed in the vicinity of the individual lenses constructing the second lens array 511. On a portion of an incident surface of the second lens array 511 where the rays 509' are incident, there are mounted half-wave plates 510 so as to align the polarization direction of the illumination light emerged from the second lens array 511 to that of the first linearly polarized light (direction of the S-polarized light).

The rays from the secondary light source images formed in the vicinity of the second lens array 511 are split into rays in the wavelength range of R and rays in the wavelength ranges of G, B by a dichroic filter 513' for transmitting rays in the wavelength range of R while reflecting the rays in the wavelength ranges of G, B. Thereafter, the rays in the wavelength ranges of G, B are split by a dichroic filter 514 similar to the first embodiment. The rays separated in three wavelength ranges of R, G, B are projected to the corresponding liquid crystal panels 515, 516, 517 in parallel with their optical axes by full reflection mirrors 518, 520, 522, lenses 519, 521 and field lenses 523, 524, 525 to illuminate them.

The construction of the polarized light splitting films 505' for reducing or eliminating the luminance nonuniformity in the image formed on the screen 534 of the liquid crystal projector provided with the illumination optical system 100 constructed as above is described below for the rays in the wavelength range of G which has a largest influence on the luminance of the image.

Since this embodiment has the same construction as the one shown in FIG. 12 except the illumination optical system 100, the luminance nonuniformity in the image formed on the screen 534 caused when the liquid crystal panels 515, 516, 517 are uniformly illuminated is the same as in the embodiment shown in FIG. 12. Specifically, an image C' of a C-side of the liquid crystal panel 516 is dark and an image D' of a D-side thereof is bright on the screen 534. Accordingly, the luminance nonuniformity of the image formed on the screen 534 can be reduced or eliminated if the C-side of the liquid crystal panel 516 is made brighter and the D-side thereof is made darker by the illumination optical system 100.

If a lens 503b, as one of the lenses constructing the first lens array 503, is taken as an example and an optical path from this lens 503b to the liquid crystal panel 516 is considered, the C-side of the liquid crystal panel 516 corresponds to a C"-side of the lens 503a and the D-side thereof corresponds to a D"-side of the lens 503a. If incident angles of the rays passing on these optical paths on the polarized light splitting films 505' are considered, the ray on an optical path 552' from C" to C is incident at 45°−β, and the ray passing on an optical path 553' from D" to D is incident at 45°+β.

According to the construction of the second embodiment, the C-side of the liquid crystal panel is made brighter than the D-side thereof by making the maximum efficiency incident angle of the polarized light splitting film 505' smaller than the incident angle 45° of the main ray of the beam on the polarized light splitting film 505', thereby producing an illuminance nonuniformity. As a result, the luminance of the image formed on the screen 534 is made more uniform or absolutely even.

Figure 19:
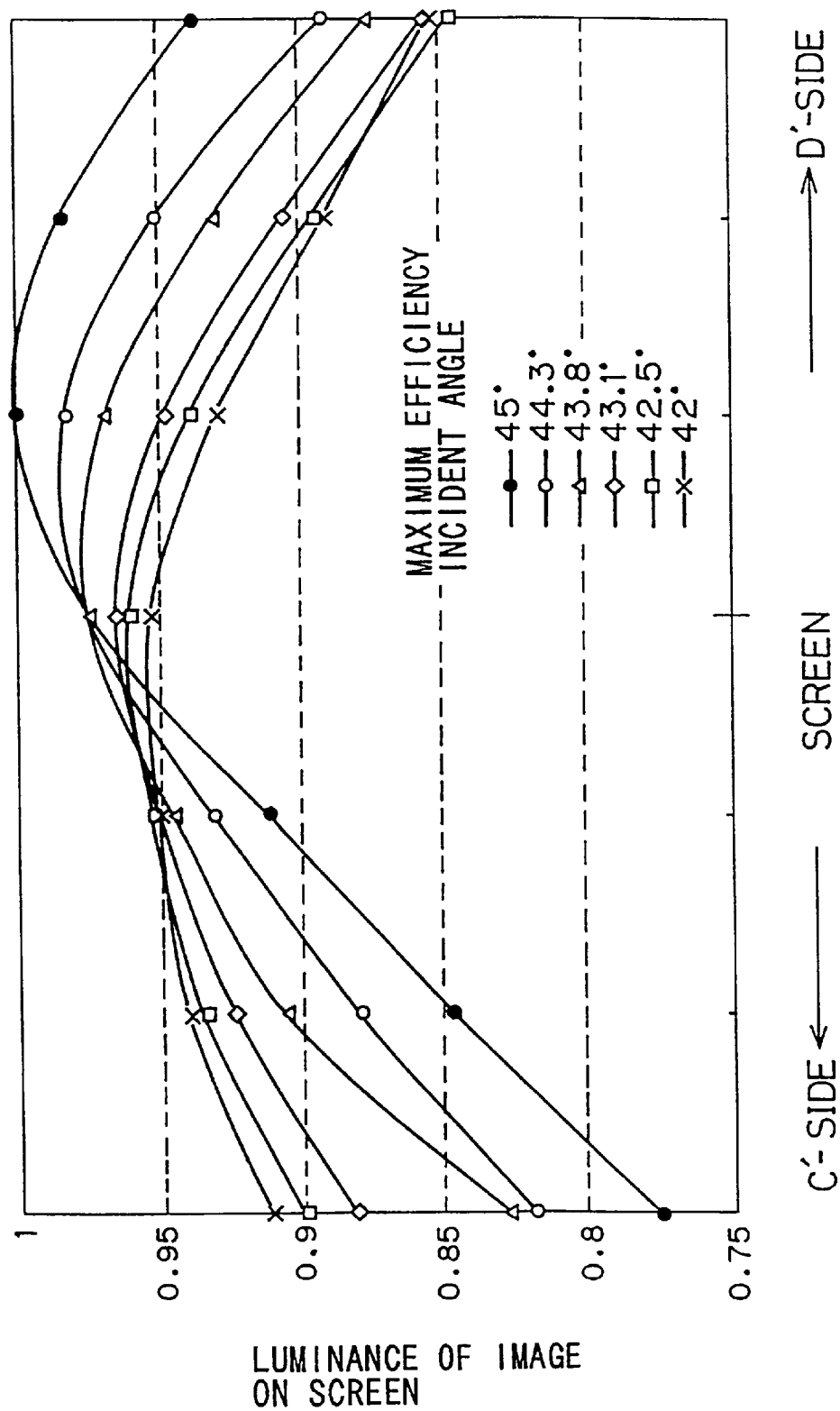
FIG. 19 is a graph showing a luminance of an image formed on the screen in the case that the incident angle of the beam at which the polarization conversion efficiency of the polarized light splitting film is at maximum is varied in the liquid crystal projector of FIG. 18.

FIG. 19 shows the luminance of the image formed on the screen 534 in the case that the maximum efficiency incident angle on the polarized light splitting film 505' is varied in the liquid crystal projector of the second embodiment. In this result as well, the luminance of the image formed on the screen 534 is made more uniform as the maximum efficiency incident angle is shifted from 45°.

Although the invention is described with respect to the foregoing embodiments, it is not limited thereto. The invention may additionally adopt the following constructions.

(1) The projection optical system is not limited to the telecentric projection lens, but may, for example, be a nontelecentric projection lens. In this case, since the focal length and the like of the projection lens have an influence on the luminance nonuniformity of the image formed on the screen, it is desirable to make the illuminance of the liquid crystal panel nonuniform in view of these factors.

(2) In the foregoing embodiments, the illuminance on the surface of the liquid crystal panel is made nonuniform by shifting the maximum efficiency incident angle on the polarized light splitting film from the incident angle of the main ray from the light source. Conversely, a relative displacement may be produced between the maximum efficiency incident angle on the polarized light splitting film and the incident angle of the main ray by shifting the incident angle of the main ray from the light source from the maximum efficiency incident angle, thereby making the illuminance on the surface of the liquid crystal panel nonuniform.

(3) Although the illuminance on the surface of the liquid crystal panel is made nonuniform by shifting the maximum efficiency incident angle on the polarized light splitting film from the incident angle of the main ray from the light source in the foregoing embodiments, the invention is not limited to such a construction. For example, the illumination optical system may be provided with a special filter for producing an illuminance nonuniformity.

(4) The incident angle of the main ray from the light source on the polarized light splitting film is not limited to 45°, and may be set according to the arrangement of parts in the liquid crystal projector.

(5) Although the illuminance nonuniformity is produced in all liquid crystal panels by handling the rays in the wavelength range of G, it may be produced in only one or two liquid crystal panels. Even with such a construction, it is desirable to form an illuminance nonuniformity on the liquid crystal panel for green.

(6) Although the light converted by the first lens array is incident on the polarized beam splitter in the foregoing embodiments, the invention is not limited to such a construction. For example, a diffused light from the light source may be incident on the polarized beam splitter directly or via a lens. Further, the aforementioned polarized beam splitters shown in FIGS. 1A, 4A, 7A may also be used.

Next, specific examples of the polarized beam splitters according to the first to third embodiments are described.

FIRST EXAMPLE

After the surface of the first transparent base, having a refractive index $n_G$ Of 1.80, was thoroughly washed, the polarizing multilayered film was formed by successively forming the 1st to 11th layers made of materials shown in TABLE 1 on this surface using a thin film forming method such as a vacuum deposition. After an adhesive layer was formed on the polarizing multilayered film, the second transparent base (having a refractive index $n_G$ Of 1.80) was adhered, thereby obtaining the polarized beam splitter according to the first embodiment.

TABLE 1

| LAYER NUMBER | FILM MATERIAL | REFRACTIVE INDEX | QWOT | FILM THICKNESS |
|---|---|---|---|---|
| 1 | $TiO_2$ | 2.53 | 0.5 | 35.57 |
| 2 | $SiO_2$ | 1.47 | 1 | 122.45 |
| 3 | $TiO_2$ | 2.53 | 1 | 71.15 |
| 4 | $SiO_2$ | 1.47 | 1 | 122.45 |
| 5 | $TiO_2$ | 2.53 | 1 | 71.15 |
| 6 | $SiO_2$ | 1.47 | 1 | 122.45 |
| 7 | $TiO_2$ | 2.53 | 1 | 71.15 |
| 8 | $SiO_2$ | 1.47 | 1 | 122.45 |
| 9 | $TiO_2$ | 2.53 | 1 | 71.15 |
| 10 | $SiO_2$ | 1.47 | 1 | 122.45 |
| 11 | $TiO_2$ | 2.53 | 0.5 | 35.57 |

In TABLE 1 (as well as TABLES described later), "QWOT"

equals to $4nd/\lambda_0$. Accordingly, in the polarizing multilayered film of the polarized beam splitter constructed as defined in TABLE 1, the film structure can be expressed by (first transparent base)

$$|(H/2 \cdot L \cdot H/2)^5|$$

(second transparent base)

if H, L denote a $\lambda_0/4$ layer having a high refractive index $n_H$ and a $\lambda_0/4$ layer having a high refractive index $n_L$.

Subsequently, beams within the visible spectrum were caused to be incident at 45° and 45°+3° on the polarizing multilayered film of the polarized beam splitter constructed as above, transmittances $T_S(\theta-\delta)$, $T_S(\theta)$, $T_S(\theta+\delta)$ of the S-polarized lights incident at the 42°, 45°, 48° and transmittances $T_P(\theta-\delta)$, $T_P(\theta)$, $T_P(\theta+\delta)$ of the S-polarized lights incident at the 42°, 45°, 48° were calculated, respectively. The calculation results are shown in a graph of FIG. 20.

Figure 20:
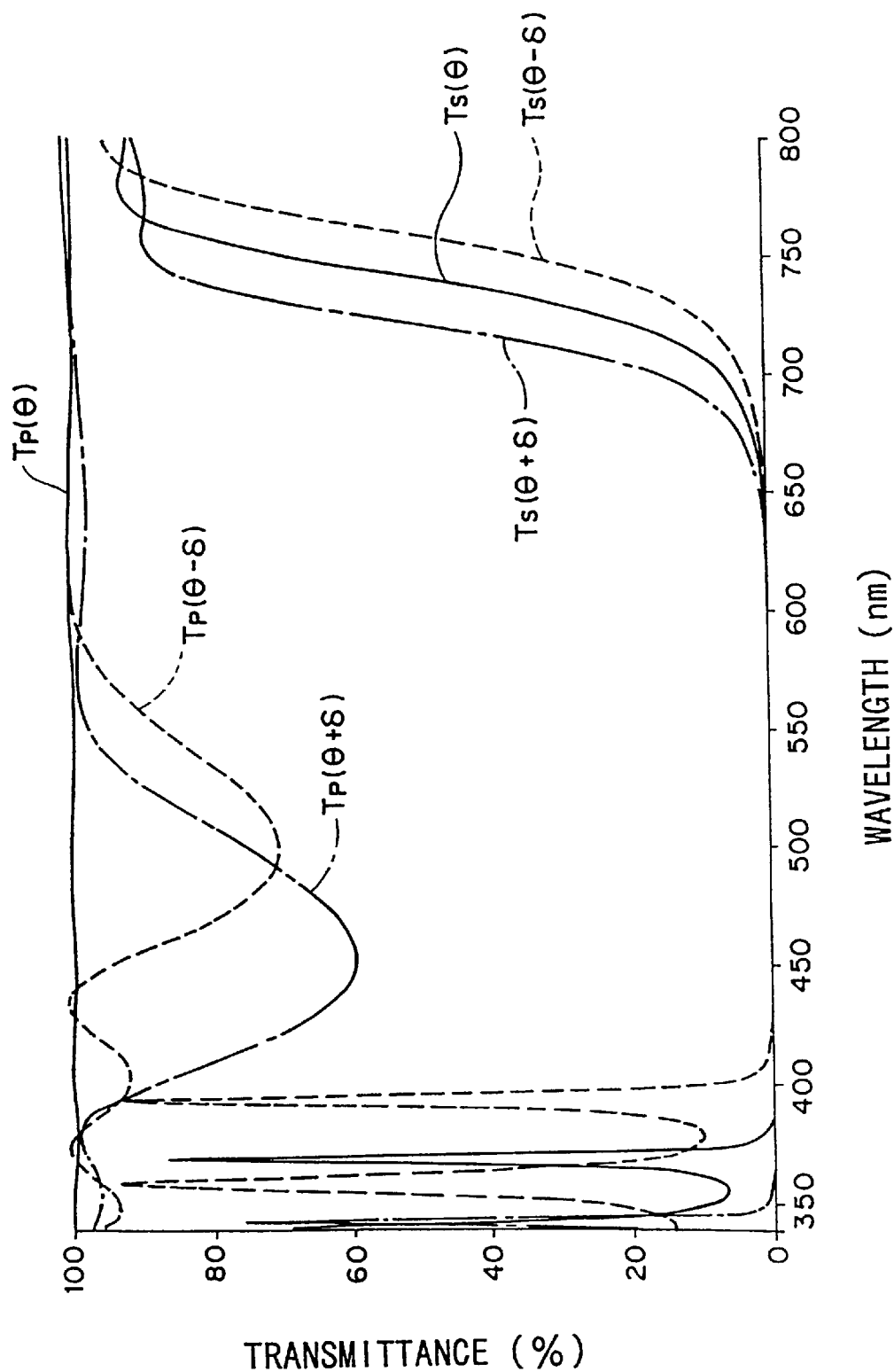
FIG. 20 is a graph showing a polarized light splitting characteristic of a polarized beam splitter of first example.

As shown in FIG. 20, the polarized beam can efficiently be split into S-polarized light and P-polarized light over the entire visible spectrum (400 nm to 700 nm) even if the incident beam includes the ray incident at 45° and rays obliquely incident with respect to the one incident at 45° in a range of ±3°. The polarized beam splitter thus constructed has an excellent polarized light splitting characteristic.

Figure 21:
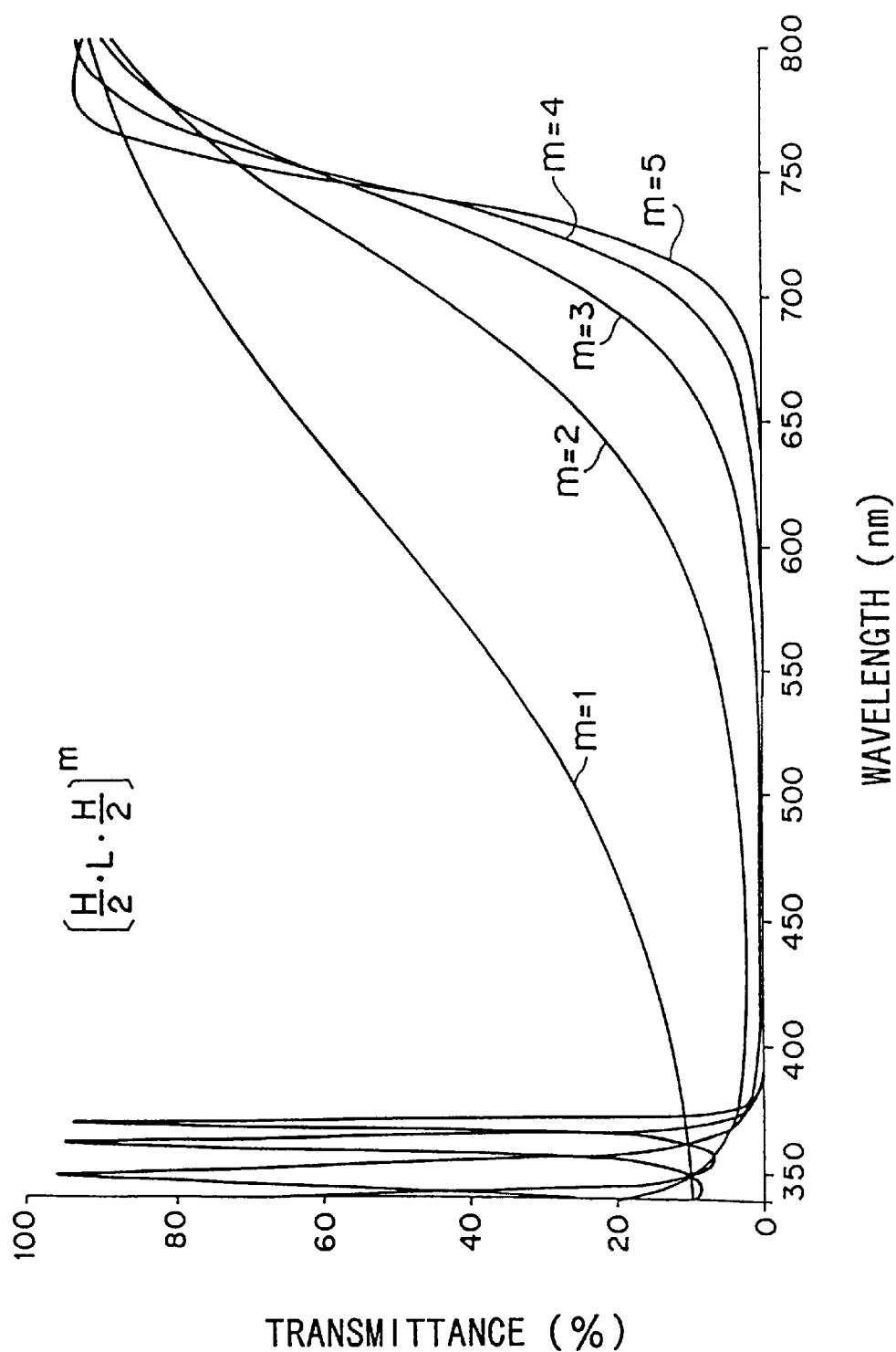
FIG. 21 is a graph showing a relationship between a repeat cycle and the polarized light splitting characteristic in the polarized beam splitter.

Although a repeat cycle at which the high refraction layers and the low refraction layers are alternately placed is 5, it is not limited to 5. Transmittances of the S-polarized light incident on the polarized splitters having different repeating cycles m at 45° were calculated, and FIG. 21 is a graph showing the calculation results. As is clear from FIG. 21, the polarized light splitting characteristic is improved as the repeat cycle m increases. Accordingly, it is desirable to set the repeat cycle m at 5 or larger. This tendency is the same as in examples described later.

The same effects could be obtained even if the polarized beam splitter has a construction:

(first transparent base)

$$|(L/2 \cdot H \cdot L/2)^m|$$

(second transparent base)

or another construction:

(first transparent base)

$$|(H/2 \cdot H/2 \cdot L \cdot H/2)^m \cdot H/2|$$

(second transparent base)

or still another construction:

(first transparent base)

$$|(L/2 \cdot (L/2 \cdot H \cdot L/2)^m \cdot L/2|$$

(second transparent base)

in which the high refraction layers and the low refraction layers are switched.

SECOND EXAMPLE

After the surface of the first transparent base, having a refractive index $n_G$ of 1.80, was thoroughly washed, the polarizing multilayered film was formed by successively forming the 1st to 26th layers made of materials shown in TABLE 2 on the surface using a thin film forming method such as a vacuum deposition. After an adhesive layer was further formed on the polarizing multilayered film, the polarized beam splitter according to the second embodiment was obtained by adhering the second transparent base (refractive index $n_G$=1.80) to the polarizing multilayered film.

TABLE 2

| LAYER NUMBER | FILM MATERIAL | REFRACTIVE INDEX | QWOT | FILM THICKNESS |
|---|---|---|---|---|
| 1 | $Ta_2O_5$ | 2.12 | 0.5 | 37.15 |
| 2 | $Al_2O_3$ | 1.59 | 1 | 99.06 |
| 3 | $Ta_2O_5$ | 2.12 | 1 | 74.29 |
| 4 | $Al_2O_3$ | 1.59 | 1 | 99.06 |
| 5 | $Ta_2O_5$ | 2.12 | 1 | 74.29 |
| 6 | $Al_2O_3$ | 1.59 | 1 | 99.06 |
| 7 | $Ta_2O_5$ | 2.12 | 1 | 74.29 |

TABLE 2-continued

| LAYER NUMBER | FILM MATERIAL | REFRACTIVE INDEX | QWOT | FILM THICKNESS |
|---|---|---|---|---|
| 8 | $Al_2O_3$ | 1.59 | 1 | 99.06 |
| 9 | $Ta_2O_5$ | 2.12 | 1 | 74.29 |
| 10 | $Al_2O_3$ | 1.59 | 1 | 99.06. |
| 11 | $Ta_2O_5$ | 2.12 | 1 | 74.29 |
| 12 | $Al_2O_3$ | 1.59 | 1 | 99.06 |
| 13 | $Ta_2O_5$ | 2.12 | 0.5 | 37.15 |
| 14 | $Ta_2O_5$ | 2.12 | 0.68 (=1.36*0.5) | 50.52 |
| 15 | $Al_2O_3$ | 1.59 | 1.36 (=1.36*1) | 134.74 |
| 16 | $Ta_2O_5$ | 2.12 | 1.36 (=1.36*1) | 101.04 |
| 17 | $Al_2O_3$ | 1.59 | 1.36 (=1.36*1) | 134.74 |
| 18 | $Ta_2O_5$ | 2.12 | 1.36 (=1.36*1) | 101.04 |
| 19 | $Al_2O_3$ | 1.59 | 1.36 (=1.36*1) | 134.74 |
| 20 | $Ta_2O_5$ | 2.12 | 1.36 (=1.36*1) | 101.04 |
| 21 | $Al_2O_3$ | 1.59 | 1.36 (=1.36*1) | 134.74 |
| 22 | $Ta_2O_5$ | 2.12 | 1.36 (=1.36*1) | 101.04 |
| 23 | $Al_2O_3$ | 1.59 | 1.36 (=1.36*1) | 134.74 |
| 24 | $Ta_2O_5$ | 2.12 | 1.36 (=1.36*1) | 101.04 |
| 25 | $Al_2O_3$ | 1.59 | 1.36 (=1.36*1) | 134.74 |
| 26 | $Ta_2O_5$ | 2.12 | 0.68 (=1.36*0.5) | 50.52 |

In the polarizing multilayered film of the polarized beam splitter structured as defined in TABLE 2, the film structure can be expressed by (first transparent base)

$$|(H/2 \cdot L \cdot H/2)^6 \cdot 1.36(H/2 \cdot L \cdot H/2)^6|$$

(second transparent base)

if H, L denote a $\lambda_0/4$ layer having a high refractive index $n_H$ and a $\lambda_0/4$ layer having a low refractive index $n_L$.

Figure 22:
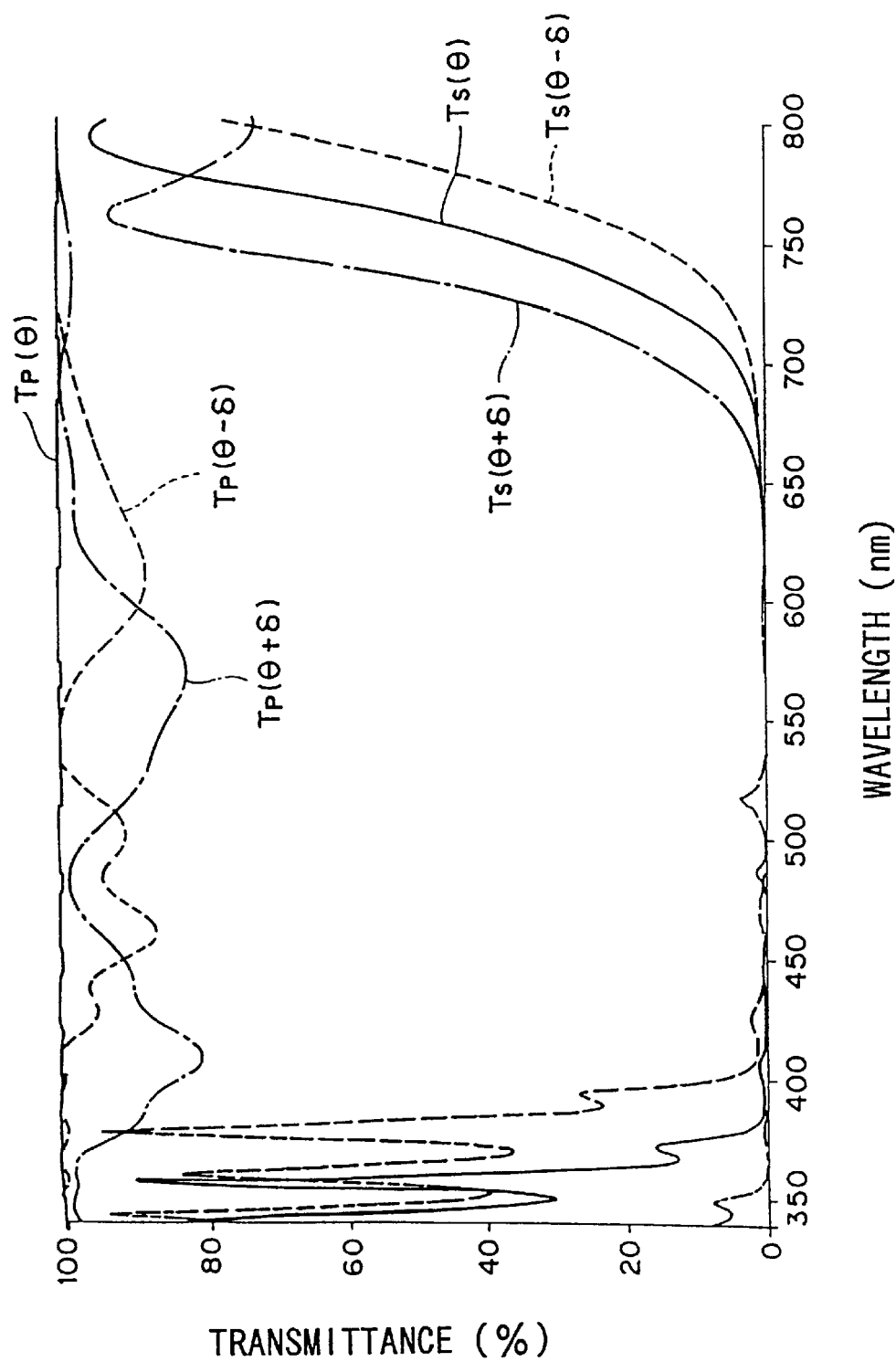
FIGS. 22 to 29 are graphs showing polarized light splitting characteristics of polarized beam splitters of second to ninth examples, respectively.

Next, rays of light within the visible spectrum were caused to be incident on the polarizing multilayered film of the polarized beam splitter structured as above at 45° and 45°±3° Transmittances $T_S(\theta-\delta)$, $T_S(\theta)$, $T_S(\theta+\delta)$ of the S-polarized lights at the incident angles of 42°, 45°, 48° were calculated, and transmittances $T_P(\theta-\delta)$, $T_P(\theta)$, $T_P(\theta+\delta)$ of the P-polarized lights at the incident angles of 42°, 45°, 48° were calculated. FIG. 22 is a graph showing the calculation results.

As shown in the graph of FIG. 22, even if the incident beam includes the ray incident at 45° as well as the rays obliquely incident by ±3° with respect to the one incident at 45°, it can efficiently be split into the S-polarized lights and P-polarized lights over the entire visible spectrum (400 nm to 700 nm). The polarized beam splitter thus constructed has an excellent polarized light splitting characteristic.

THIRD EXAMPLE

After the surface of the first transparent base, having a refractive index $n_G$ of 1.62, was thoroughly washed, the polarizing multilayered film was formed by successively forming the 1st to 26th layers made of materials shown in TABLE 3 on the surface using a thin film forming method such as a vacuum deposition. After an adhesive layer was further formed on the polarizing multilayered film, the polarized beam splitter according to the second embodiment was obtained by adhering the second transparent base (refractive index $n_G$=1.62) to the polarizing multilayered film.

TABLE 3

| LAYER NUMBER | FILM MATERIAL | REFRACTIVE INDEX | QWOT | FILM THICKNESS |
|---|---|---|---|---|
| 1 | $HfO_2$ | 1.91 | 0.5 | 40.9 |
| 2 | $SiO_2$ | 1.43 | 1 | 109.27 |
| 3 | $HfO_2$ | 1.91 | 1 | 81.81 |
| 4 | $SiO_2$ | 1.43 | 1 | 109.27 |
| 5 | $HfO_2$ | 1.91 | 1 | 81.81 |
| 6 | $SiO_2$ | 1.43 | 1 | 109.27 |
| 7 | $HfO_2$ | 1.91 | 1 | 81.81 |
| 8 | $SiO_2$ | 1.43 | 1 | 109.27 |
| 9 | $HfO_2$ | 1.91 | 1 | 81.81 |
| 10 | $SiO_2$ | 1.43 | 1 | 109.27 |
| 11 | $HfO_2$ | 1.91 | 1 | 81.81 |
| 12 | $SiO_2$ | 1.43 | 1 | 109.27 |
| 13 | $HfO_2$ | 1.91 | 0.5 | 40.9 |
| 14 | $HfO_2$ | 1.91 | 0.68 (=1.36*0.5) | 55.63 |
| 15 | $SiO_2$ | 1.43 | 1.36 (=1.36*1) | 148.6 |
| 16 | $HfO_2$ | 1.91 | 1.36 (=1.36*1) | 111.26 |
| 17 | $SiO_2$ | 1.43 | 1.36 (=1.36*1) | 148.6 |
| 18 | $HfO_2$ | 1.91 | 1.36 (=1.36*1) | 111.26 |
| 19 | $SiO_2$ | 1.43 | 1.36 (=1.36*1) | 148.6 |
| 20 | $HfO_2$ | 1.91 | 1.36 (=1.36*1) | 111.26 |
| 21 | $SiO_2$ | 1.43 | 1.36 (=1.36*1) | 148.6 |
| 22 | $HfO_2$ | 1.91 | 1.36 (=1.36*1) | 111.26 |
| 23 | $SiO_2$ | 1.43 | 1.36 (=1.36*1) | 148.6 |
| 24 | $HfO_2$ | 1.91 | 1.36 (=1.36*1) | 111.26 |
| 25 | $SiO_2$ | 1.43 | 1.36 (=1.36*1) | 148.6 |
| 26 | $HfO_2$ | 1.91 | 0.68 (=1.36*0.5) | 55.63 |

In the polarizing multilayered film of the polarized beam splitter structured as defined in TABLE 3, the film structure can be expressed by (first transparent base)

$$|(H/2 \cdot L \cdot H/2)^6 \cdot 1.36(H/2 \cdot L \cdot H/2)^6|$$

(second transparent base)

if H, L denote a $\lambda_0/4$ layer having a high refractive index $n_H$ and a $\lambda_0/4$ layer having a low refractive index $n_L$.

Figure 23:
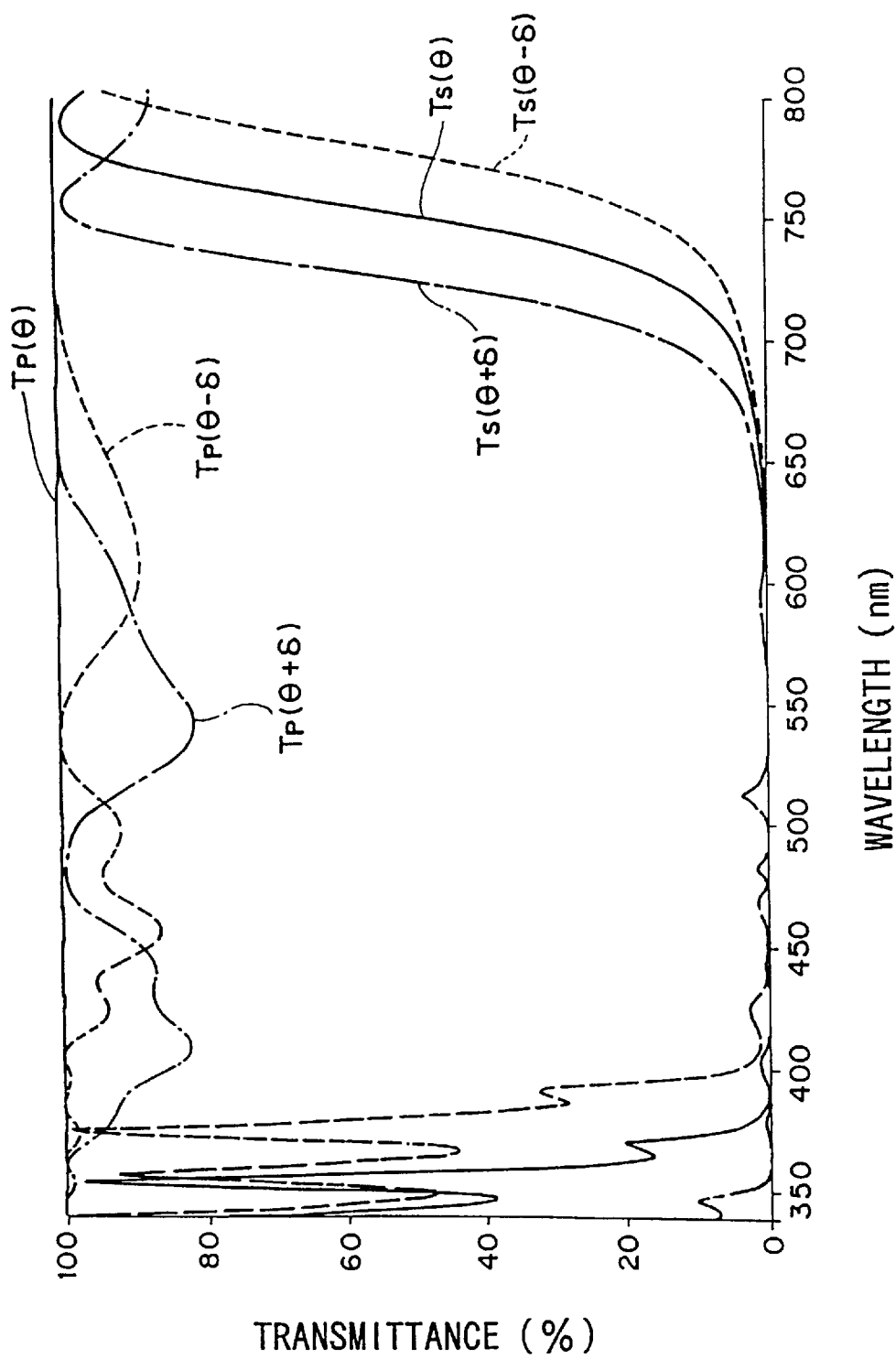

Next, rays of light within the visible spectrum were caused to be incident on the polarizing multilayered film of the polarized beam splitter structured as above at 45° and 45°±3°. Transmittances $T_S(\theta-\delta)$, $T_S(\theta)$, $T_S(\theta+\delta)$ of the S-polarized lights at the incident angles of 42°, 45°, 48° were calculated, and transmittances $T_P(\theta-\delta)$, $T_P(\theta)$, $T_S(\theta+\delta)$ of the P-polarized lights at the incident angles of 42°, 45°, 48° were calculated. FIG. 23 is a graph showing the calculation results.

As shown in the graph of FIG. 23, even if the incident beam includes the ray incident at 45° as well as the rays obliquely incident by ±3° with respect to the one incident at 45°, it can efficiently be split into the S-polarized lights and P-polarized lights over the entire visible spectrum (400 nm to 700 nm). The polarized beam splitter thus constructed has an excellent polarized light splitting characteristic.

FOURTH EXAMPLE

After the surface of the first transparent base, having a refractive index $n_G$ of 1.80, was thoroughly washed, the polarizing multilayered film was formed by successively forming the 1st to 26th layers made of materials shown in TABLE 4 on the surface using a thin film forming method such as a vacuum deposition. After an adhesive layer was further formed on the polarizing multilayered film, the polarized beam splitter according to the second embodiment was obtained by adhering the second transparent base (refractive index $n_G$=1.80) to the polarizing multilayered film.

TABLE 4

| LAYER NUMBER | FILM MATERIAL | REFRACTIVE INDEX | QWOT | FILM THICKNESS |
|---|---|---|---|---|
| 1 | $Ta_2O_5$ | 2.12 | 1 | 74.29 |
| 2 | $Al_2O_3$ | 1.59 | 1 | 99.06 |
| 3 | $Ta_2O_5$ | 2.12 | 1 | 74.29 |
| 4 | $Al_2O_3$ | 1.59 | 1 | 99.06 |
| 5 | $Ta_2O_5$ | 2.12 | 1 | 74.29 |
| 6 | $Al_2O_3$ | 1.59 | 1 | 99.06 |
| 7 | $Ta_2O_5$ | 2.12 | 1 | 74.29 |
| 8 | $Al_2O_3$ | 1.59 | 1 | 99.06 |
| 9 | $Ta_2O_5$ | 2.12 | 1 | 74.29 |
| 10 | $Al_2O_3$ | 1.59 | 1 | 99.06 |
| 11 | $Ta_2O_5$ | 2.12 | 1 | 74.29 |
| 12 | $Al_2O_3$ | 1.59 | 1 | 99.06 |
| 13 | $Ta_2O_5$ | 2.12 | 0.5 | 37.15 |
| 14 | $Ta_2O_5$ | 2.12 | 0.68 (=1.36*0.5) | 50.52 |
| 15 | $Al_2O_3$ | 1.59 | 1.36 (=1.36*1) | 134.74 |
| 16 | $Ta_2O_5$ | 2.12 | 1.36 (=1.36*1) | 101.04 |
| 17 | $Al_2O_3$ | 1.59 | 1.36 (=1.36*1) | 134.74 |
| 18 | $Ta_2O_5$ | 2.12 | 1.36 (=1.36*1) | 101.04 |
| 19 | $Al_2O_3$ | 1.59 | 1.36 (=1.36*1) | 134.74 |
| 20 | $Ta_2O_5$ | 2.12 | 1.36 (=1.36*1) | 101.04 |
| 21 | $Al_2O_3$ | 1.59 | 1.36 (=1.36*1) | 134.74 |
| 22 | $Ta_2O_5$ | 2.12 | 1.36 (=1.36*1) | 101.04 |
| 23 | $Al_2O_3$ | 1.59 | 1.36 (=1.36*1) | 134.74 |
| 24 | $Ta_2O_5$ | 2.12 | 1.36 (=1.36*1) | 101.04 |
| 25 | $Al_2O_3$ | 1.59 | 1.36 (=1.36*1) | 134.74 |
| 26 | $Ta_2O_5$ | 2.12 | 1.36 (=1.36*1) | 101.04 |

TABLE 5

| LAYER NUMBER | FILM MATERIAL | REFRACTIVE INDEX | QWOT | FILM THICKNESS |
|---|---|---|---|---|
| 1 | $HfO_2$ | 1.91 | 1 | 81.81 |
| 2 | $SiO_2$ | 1.43 | 1 | 109.27 |
| 3 | $HfO_2$ | 1.91 | 1 | 81.81 |
| 4 | $SiO_2$ | 1.43 | 1 | 109.27 |
| 5 | $HfO_2$ | 1.91 | 1 | 81.81 |
| 6 | $SiO_2$ | 1.43 | 1 | 109.27 |
| 7 | $HfO_2$ | 1.91 | 1 | 81.81 |
| 8 | $SiO_2$ | 1.43 | 1 | 109.27 |
| 9 | $HfO_2$ | 1.91 | 1 | 81.81 |
| 10 | $SiO_2$ | 1.43 | 1 | 109.27 |
| 11 | $HfO_2$ | 1.91 | 1 | 81.81 |
| 12 | $SiO_2$ | 1.43 | 1 | 109.27 |
| 13 | $HfO_2$ | 1.91 | 0.5 | 40.9 |
| 14 | $HfO_2$ | 1.91 | 0.68 (=1.36*0.5) | 55.63 |
| 15 | $SiO_2$ | 1.43 | 1.36 (=1.36*1) | 148.6 |
| 16 | $HfO_2$ | 1.91 | 1.36 (=1.36*1) | 111.26 |
| 17 | $SiO_2$ | 1.43 | 1.36 (=1.36*1) | 148.6 |
| 18 | $HfO_2$ | 1.91 | 1.36 (=1.36*1) | 111.26 |
| 19 | $SiO_2$ | 1.43 | 1.36 (=1.36*1) | 148.6 |
| 20 | $HfO_2$ | 1.91 | 1.36 (=1.36*1) | 111.26 |
| 21 | $SiO_2$ | 1.43 | 1.36 (=1.36*1) | 148.6 |
| 22 | $HfO_2$ | 1.91 | 1.36 (=1.36*1) | 111.26 |
| 23 | $SiO_2$ | 1.43 | 1.36 (=1.36*1) | 148.6 |
| 24 | $HfO_2$ | 1.91 | 1.36 (=1.36*1) | 111.26 |
| 25 | $SiO_2$ | 1.43 | 1.36 (=1.36*1) | 148.6 |
| 26 | $HfO_2$ | 1.91 | 1.36 (=1.36*1) | 111.26 |

In the polarizing multilayered film of the polarized beam splitter structured as defined in TABLE 4, the film structure can be expressed by (first transparent base)

$$|[H/2 \cdot H/2 \cdot L \cdot H/2)^6] \cdot 1.36[(H/2 \cdot L \cdot H/2)^6 \cdot H/2]|$$

(second transparent base)
if H, L denote a $\lambda_0/4$ layer having a high refractive index $n_H$ and a $\lambda_0/4$ layer having a low refractive index $n_L$.

Figure 24:
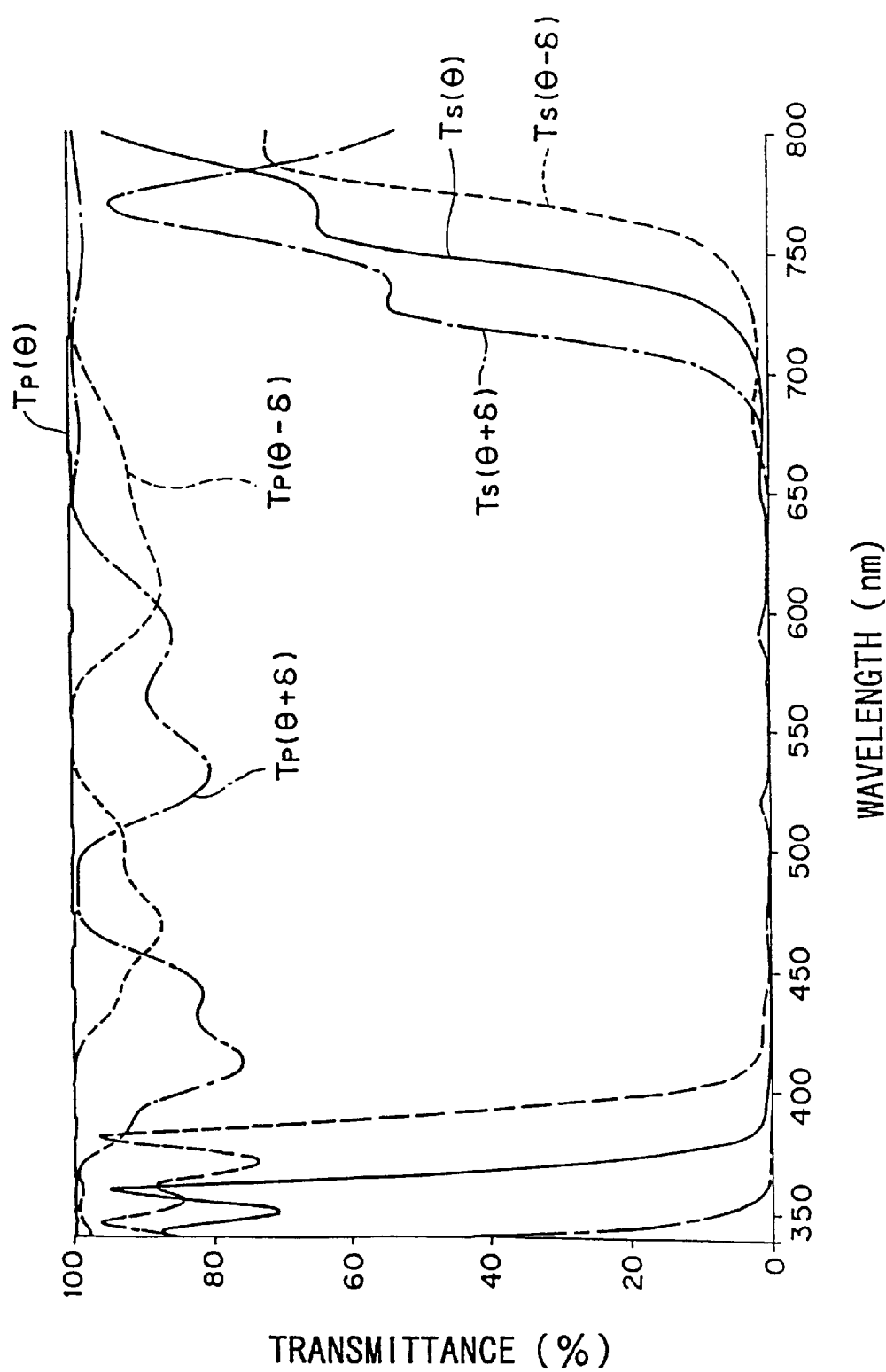

Next, rays of light within the visible spectrum were caused to be incident on the polarizing multilayered film of the polarized beam splitter structured as above at 45° and 45°±3°. Transmittances $T_S(\theta-\delta)$, $T_S(\theta)$, $T_S(\theta+\delta)$ of the S-polarized lights at the incident angles of 42°, 45°, 48° were calculated, and transmittances $T_P(\theta-\delta)$, $T_P(\theta)$, $T_P(\theta+\delta)$ of the P-polarized lights at the incident angles of 42°, 45°, 48° were calculated. FIG. 24 is a graph showing the calculation results.

As shown in the graph of FIG. 24, even if the incident beam includes the ray incident at 45° as well as the rays obliquely incident by ±3° with respect to the one incident at 45°, it can efficiently be split into the S-polarized lights and P-polarized lights over the entire visible spectrum (400 nm to 700 nm). The polarized beam splitter thus constructed has an excellent polarized light splitting characteristic.

FIFTH EXAMPLE

After the surface of the first transparent base, having a refractive index $n_G$ Of 1.62, was thoroughly washed, the polarizing multilayered film was formed by successively forming the 1st to 26th layers made of materials shown in TABLE 5 on the surface using a thin film forming method such as a vacuum deposition. After an adhesive layer was further formed on the polarizing multilayered film, the polarized beam splitter according to the second embodiment was obtained by adhering the second transparent base (refractive index $n_G$=1.62) to the polarizing multilayered film.

In the polarizing multilayered film of the polarized beam splitter structured as defined in TABLE 5, the film structure can be expressed by (first transparent base)

$$|[H/2 \cdot (H/2 \cdot L \cdot H/2)^6] \cdot 1.36[(H/2 \cdot L \cdot H/2)^6 \cdot H/2]|$$

(second transparent base)
if H, L denote a $\lambda_0/4$ layer having a high refractive index $n_H$ and a $\lambda_0/4$ layer having a low refractive index $n_L$.

Figure 25:
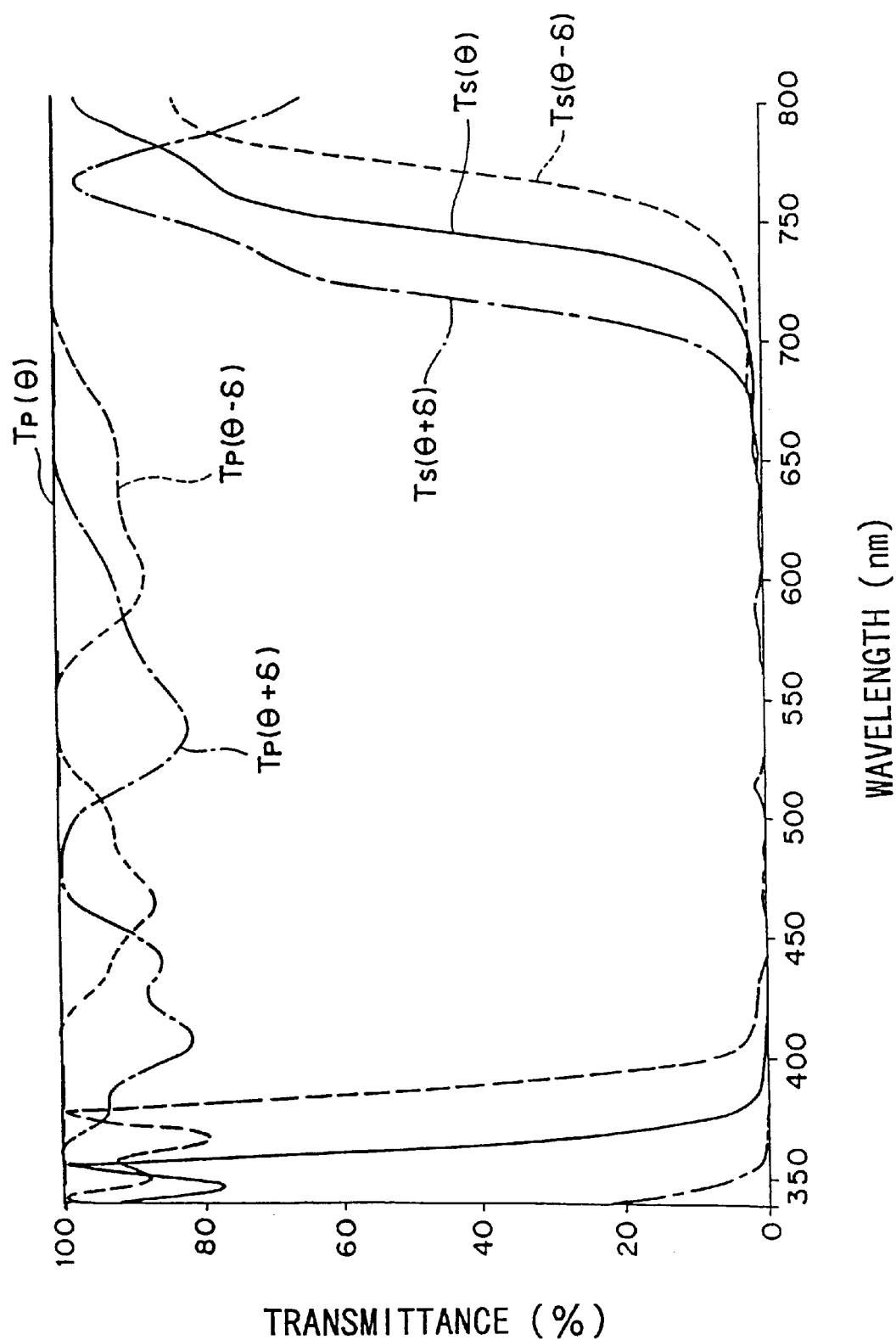

Next, rays of light within the visible spectrum were caused to be incident on the polarizing multilayered film of the polarized beam splitter structured as above at 45° and 45°±3° Transmittances $T_S(\theta-\delta)$, $T_S(\theta)$, $T_S(\theta+\delta)$ of the S-polarized lights at the incident angles of 42°, 45°, 48° were calculated, and transmittances $T_P(\theta-\delta)$, $T_P(\theta)$, $T_P(\theta+\delta)$ of the P-polarized lights at the incident angles of 42°, 45°, 48° were calculated. FIG. 25 is a graph showing the calculation results.

As shown in the graph of FIG. 25, even if the incident beam includes the ray incident at 45° as well as the rays obliquely incident by ±3° with respect to the one incident at 45°, it can efficiently be split into the S-polarized lights and P-polarized lights over the entire visible spectrum (400 nm to 700 nm). The polarized beam splitter thus constructed has an excellent polarized light splitting characteristic.

It should be noted that the same effects could be obtained even if the polarized beam splitter has a construction:

(first transparent base)

$$|[L/2 \cdot (L/2 \cdot H \cdot L/2)^m] \cdot A[(L/2 \cdot H \cdot L/2)^n \cdot L/2]|$$

(second transparent base)
or another construction:

(first transparent base)

$$|(L/2 \cdot H \cdot L/2)^m \cdot A(L/2 \cdot H \cdot L/2)^n|$$

(second transparent base)
in which the high refraction layers and the low refraction layers are switched.

The value of A in the second to fifth examples is not limited to "1.36". As a result of various experiments, the same effects as the above examples can be obtained by setting the value of A in a range of $1 \leq A \leq 1.38$.

SIXTH EXAMPLE

After the surface of the first transparent base, having a refractive index $n_G$ Of 1.52, was thoroughly washed, the polarizing multilayered film was formed by successively forming the 1st to 57th layers made of materials shown in TABLE 6 on the surface using a thin film forming method such as a vacuum deposition. After an adhesive layer was further formed on the polarizing multilayered film, the polarized beam splitter according to the third embodiment was obtained by adhering the third transparent base (refractive index $n_G$=1.52) to the polarizing multilayered film.

TABLE 6

| LAYER NUMBER | FILM MATERIAL | REFRACTIVE INDEX | QWOT | FILM THICKNESS |
|---|---|---|---|---|
| 1 | MgO | 1.7 | 0.5 | 44.49 |
| 2 | MgF$_2$ | 1.39 | 1 | 108.81 |
| 3 | MgO | 1.7 | 1 | 88.97 |
| 4 | MgF$_2$ | 1.39 | 1 | 108.81 |
| 5 | MgO | 1.7 | 1 | 88.97 |
| 6 | MgF$_2$ | 1.39 | 1 | 108.81 |
| 7 | MgO | 1.7 | 1 | 88.97 |
| 8 | MgF$_2$ | 1.39 | 1 | 108.81 |
| 9 | MgO | 1.7 | 1 | 88.97 |
| 10 | MgF$_2$ | 1.39 | 1 | 108.81 |
| 11 | MgO | 1.7 | 1 | 88.97 |
| 12 | MgF$_2$ | 1.39 | 1 | 108.81 |
| 13 | MgO | 1.7 | 1 | 88.97 |
| 14 | MgF$_2$ | 1.39 | 1 | 108.81 |
| 15 | MgO | 1.7 | 1 | 88.97 |
| 16 | MgF$_2$ | 1.39 | 1 | 108.81 |
| 17 | MgO | 1.7 | 1 | 88.97 |
| 18 | MgF$_2$ | 1.39 | 1 | 108.81 |
| 19 | MgO | 1.7 | 0.5 | 44.49 |
| 20 | MgO | 1.7 | 0.61 (=1.22*0.5) | 54.27 |
| 21 | MgF$_2$ | 1.39 | 1.22 (=1.22*1) | 132.75 |
| 22 | MgO | 1.7 | 1.22 (=1.22*1) | 108.54 |
| 23 | MgF$_2$ | 1.39 | 1.22 (=1.22*1) | 132.75 |
| 24 | MgO | 1.7 | 1.22 (=1.22*1) | 108.54 |
| 25 | MgF$_2$ | 1.39 | 1.22 (=1.22*1) | 132.75 |
| 26 | MgO | 1.7 | 1.22 (=1.22*1) | 108.54 |
| 27 | MgF$_2$ | 1.39 | 1.22 (=1.22*1) | 132.75 |
| 28 | MgO | 1.7 | 1.22 (=1.22*1) | 108.54 |
| 29 | MgF$_2$ | 1.39 | 1.22 (=1.22*1) | 132.75 |
| 30 | MgO | 1.7 | 1.22 (=1.22*1) | 108.54 |
| 31 | MgF$_2$ | 1.39 | 1.22 (=1.22*1) | 132.75 |
| 32 | MgO | 1.7 | 1.22 (=1.22*1) | 108.54 |
| 33 | MgF$_2$ | 1.39 | 1.22 (=1.22*1) | 132.75 |
| 34 | MgO | 1.7 | 1.22 (=1.22*1) | 108.54 |
| 35 | MgF$_2$ | 1.39 | 1.22 (=1.22*1) | 132.75 |
| 36 | MgO | 1.7 | 1.22 (=1.22*1) | 108.54 |
| 37 | MgF$_2$ | 1.39 | 1.22 (=1.22*1) | 132.75 |
| 38 | MgO | 1.7 | 0.61 (=1.22*0.5) | 54.27 |
| 39 | MgO | 1.7 | 0.74 (=1.48*0.5) | 65.84 |
| 40 | MgF$_2$ | 1.39 | 1.48 (=1.48*1) | 161.04 |
| 41 | Mgo | 1.7 | 1.48 (=1.48*1) | 131.68 |
| 42 | MgF$_2$ | 1.39 | 1.48 (=1.48*1) | 161.04 |
| 43 | MgO | 1.7 | 1.48 (=1.48*1) | 131.68 |
| 44 | MgF$_2$ | 1.39 | 1.48 (=1.48*1) | 161.04 |
| 45 | MgO | 1.7 | 1.48 (=1.48*1) | 131.68 |
| 46 | MgF$_2$ | 1.39 | 1.48 (=1.48*1) | 161.04 |
| 47 | MgO | 1.7 | 1.48 (=1.48*1) | 131.68 |
| 48 | MgF$_2$ | 1.39 | 1.48 (=1.48*1) | 161.04 |
| 49 | MgO | 1.7 | 1.48 (=1.48*1) | 131.68 |
| 50 | MgF$_2$ | 1.39 | 1.48 (=1.48*1) | 161.04 |
| 51 | MgO | 1.7 | 1.48 (=1.48*1) | 131.68 |
| 52 | MgF$_2$ | 1.39 | 1.48 (=1.48*1) | 161.04 |
| 53 | MgO | 1.7 | 1.48 (=1.48*1) | 131.68 |
| 54 | MgF$_2$ | 1.39 | 1.48 (=1.48*1) | 161.04 |
| 55 | MgO | 1.7 | 1.48 (=1.48*1) | 131.68 |
| 56 | MgF$_2$ | 1.39 | 1.48 (=1.48*1) | 161.04 |
| 57 | MgO | 1.7 | 0.74 (=1.48*0.5) | 65.84 |

In the polarizing multilayered film of the polarized beam splitter structured as defined in TABLE 6, the film structure can be expressed by (first transparent base)

$$|(H/1 \cdot L \cdot H/2)^9 \cdot 1.22(H/2 \cdot L \cdot /2)^9 \cdot 1.48(H/2 \cdot L \cdot H/2)^9|$$

(second transparent base)
if H, L denote a $\lambda_0/4$ layer having a high refractive index $n_H$ and a $\lambda_0/4$ layer having a low refractive index $n_L$.

Figure 26:
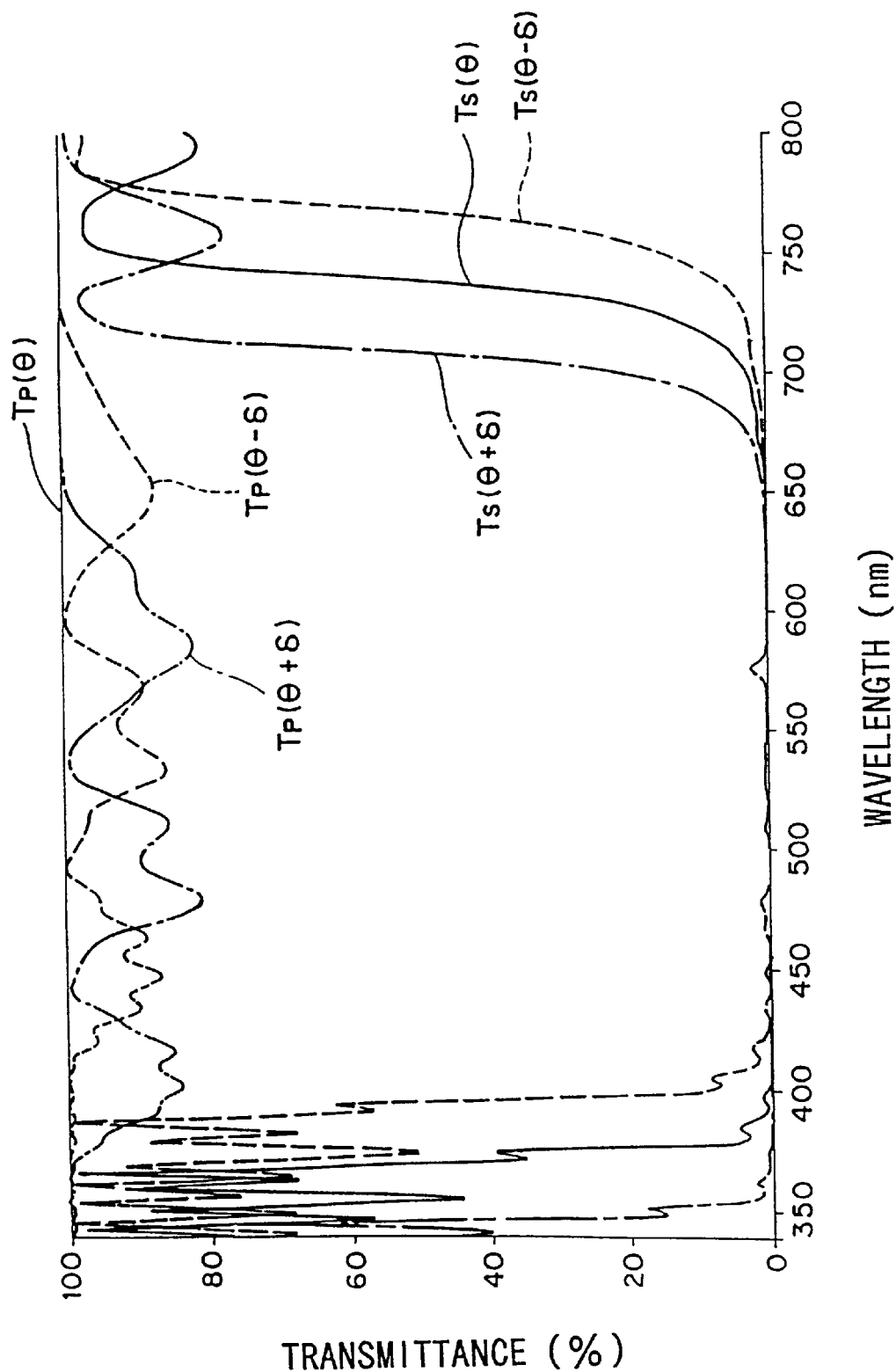

Next, rays of light within the visible spectrum were caused to be incident on the polarizing multilayered film of the polarized beam splitter structure d as above at 45° and 45°±3°. Transmittances $T_S(\theta-\delta)$, $T_S(\theta)$, $T_S(\theta+\delta)$ of the S-polarized lights at the incident angles of 42°, 45°, 48° were calculated, and transmittances $T_P(\theta-\delta)$, $T_P(\theta)$, $T_P(\theta+\delta)$ of the P-polarized lights at the incident angles of 42°, 45°, 48° were calculated. FIG. 26 is a graph showing the calculation results.

As shown in the graph of FIG. 26, even if the incident beam includes the ray incident at 45° as well as the rays obliquely incident by ±3° with respect to the one incident at 45°, it can efficiently be split into the S-polarized lights and P-polarized lights over the entire visible spectrum (400 nm to 700 nm). The polarized beam splitter thus constructed has an excellent polarized light splitting characteristic.

SEVENTH EXAMPLE

After the surface of the first transparent base, having a refractive index $n_G$ of 1.80, was thoroughly washed, the polarizing multilayered film was formed by successively forming the 1st to 57th layers made of materials shown in TABLE 7 on the surface using a thin film forming method such as a vacuum deposition. After an adhesive layer was further formed on the polarizing multilayered film, the polarized beam splitter according to the third embodiment was obtained by adhering the third transparent base (refractive index $n_G$=1.80) to the polarizing multilayered film.

TABLE 7

| LAYER NUMBER | FILM MATERIAL | REFRACTIVE INDEX | QWOT | FILM THICKNESS |
|---|---|---|---|---|
| 1 | ZrTiO$_4$ | 2.01 | 0.5 | 37.94 |
| 2 | Al$_2$O$_3$ | 1.64 | 1 | 92.99 |
| 3 | ZrTiO$_4$ | 2.01 | 1 | 75.87 |
| 4 | Al$_2$O$_3$ | 1.64 | 1 | 92.99 |
| 5 | ZrTiO$_4$ | 2.01 | 1 | 75.87 |
| 6 | Al$_2$O$_3$ | 1.64 | 1 | 92.99 |
| 7 | ZrTiO$_4$ | 2.01 | 1 | 75.87 |
| 8 | Al$_2$O$_3$ | 1.64 | 1 | 92.99 |

TABLE 7-continued

| LAYER NUMBER | FILM MATERIAL | REFRACTIVE INDEX | QWOT | FILM THICKNESS |
|---|---|---|---|---|
| 9 | ZrTiO$_4$ | 2.01 | 1 | 75.87 |
| 10 | Al$_2$O$_3$ | 1.64 | 1 | 92.99 |
| 11 | ZrTiO$_4$ | 2.01 | 1 | 75.87 |
| 12 | Al$_2$O$_3$ | 1.64 | 1 | 92.99 |
| 13 | ZrTiO$_4$ | 2.01 | 1 | 75.87 |
| 14 | Al$_2$O$_3$ | 1.64 | 1 | 92.99 |
| 15 | ZrTiO$_4$ | 2.01 | 1 | 75.87 |
| 16 | Al$_2$O$_3$ | 1.64 | 1 | 92.99 |
| 17 | ZrTiO$_4$ | 2.01 | 1 | 75.87 |
| 18 | Al$_2$O$_3$ | 1.64 | 1 | 92.99 |
| 19 | ZrTiO$_4$ | 2.01 | 0.5 | 37.94 |
| 20 | ZrTiO$_4$ | 2.01 | 0.61 (=1.22*0.5) | 46.28 |
| 21 | Al$_2$O$_3$ | 1.64 | 1.22 (=1.22*1) | 113.45 |
| 22 | ZrTiO$_4$ | 2.01 | 1.22 (=1.22*1) | 92.56 |
| 23 | Al$_2$O$_3$ | 1.64 | 1.22 (=1.22*1) | 113.45 |
| 24 | ZrTiO$_4$ | 2.01 | 1.22 (=1.22*1) | 92.56 |
| 25 | Al$_2$O$_3$ | 1.64 | 1.22 (=1.22*1) | 113.45 |
| 26 | ZrTiO$_4$ | 2.01 | 1.22 (=1.22*1) | 92.56 |
| 27 | Al$_2$O$_3$ | 1.64 | 1.22 (=1.22*1) | 113.45 |
| 28 | ZrTiO$_4$ | 2.01 | 1.22 (=1.22*1) | 92.56 |
| 29 | Al$_2$O$_3$ | 1.64 | 1.22 (=1.22*1) | 113.45 |
| 30 | ZrTiO$_4$ | 2.01 | 1.22 (=1.22*1) | 92.56 |
| 31 | Al$_2$O$_3$ | 1.64 | 1.22 (=1.22*1) | 113.45 |
| 32 | ZrTiO$_4$ | 2.01 | 1.22 (=1.22*1) | 92.56 |
| 33 | Al$_2$O$_3$ | 1.64 | 1.22 (=1.22*1) | 113.45 |
| 34 | ZrTiO$_4$ | 2.01 | 1.22 (=1.22*1) | 92.56 |
| 35 | Al$_2$O$_3$ | 1.64 | 1.22 (=1.22*1) | 113.45 |
| 36 | ZrTiO$_4$ | 2.01 | 1.22 (=1.22*1) | 92.56 |
| 37 | Al$_2$O$_3$ | 1.64 | 1.22 (=1.22*1) | 113.45 |
| 38 | ZrTiO$_4$ | 2.01 | 0.61 (=1.22*0.5) | 46.28 |
| 39 | ZrTiO$_4$ | 2.01 | 0.74 (=1.48*0.5) | 56.14 |
| 40 | Al$_2$O$_3$ | 1.64 | 1.48 (=1.48*1) | 137.62 |
| 41 | ZrTiO$_4$ | 2.01 | 1.48 (=1.48*1) | 112.29 |
| 42 | Al$_2$O$_3$ | 1.64 | 1.48 (=1.48*1) | 137.62 |
| 43 | ZrTiO$_4$ | 2.01 | 1.48 (=1.48*1) | 112.29 |
| 44 | Al$_2$O$_3$ | 1.64 | 1.48 (=1.48*1) | 137.62 |
| 45 | ZrTiO$_4$ | 2.01 | 1.48 (=1.48*1) | 112.29 |
| 46 | Al$_2$O$_3$ | 1.64 | 1.48 (=1.48*1) | 137.62 |
| 47 | ZrTiO$_4$ | 2.01 | 1.48 (=1.48*1) | 112.29 |
| 48 | Al$_2$O$_3$ | 1.64 | 1.48 (=1.48*1) | 137.62 |
| 49 | ZrTiO$_4$ | 2.01 | 1.48 (=1.48*1) | 112.29 |
| 50 | Al$_2$O$_3$ | 1.64 | 1.48 (=1.48*1) | 137.62 |
| 51 | ZrTiO$_4$ | 2.01 | 1.48 (=1.48*1) | 112.29 |
| 52 | Al$_2$O$_3$ | 1.64 | 1.48 (=1.48*1) | 137.62 |
| 53 | ZrTiO$_4$ | 2.01 | 1.48 (=1.48*1) | 112.29 |
| 54 | Al$_2$O$_3$ | 1.64 | 1.48 (=1.48*1) | 137.62 |
| 55 | ZrTiO$_4$ | 2.01 | 1.48 (=1.48*1) | 112.29 |
| 56 | Al$_2$O$_3$ | 1.64 | 1.48 (=1.48*1) | 137.62 |
| 57 | ZrTiO$_4$ | 2.01 | 0.74 (=1.48*0.5) | 56.14 |

In the polarizing multilayered film of the polarized beam splitter structured as defined in TABLE 7, the film structure can be expressed by (first transparent base)

$$|(H/2 \cdot L \cdot H/2)^9 \cdot 1.22(H/2 \cdot L \cdot H/2)^9 \cdot 1.48(H/2 \cdot L \cdot H/2)^9|$$

(second transparent base)

if H, L denote a $\lambda_0/4$ layer having a high refractive index $n_H$ and a $\lambda_0/4$ layer having a low refractive index $n_L$.

Figure 27:
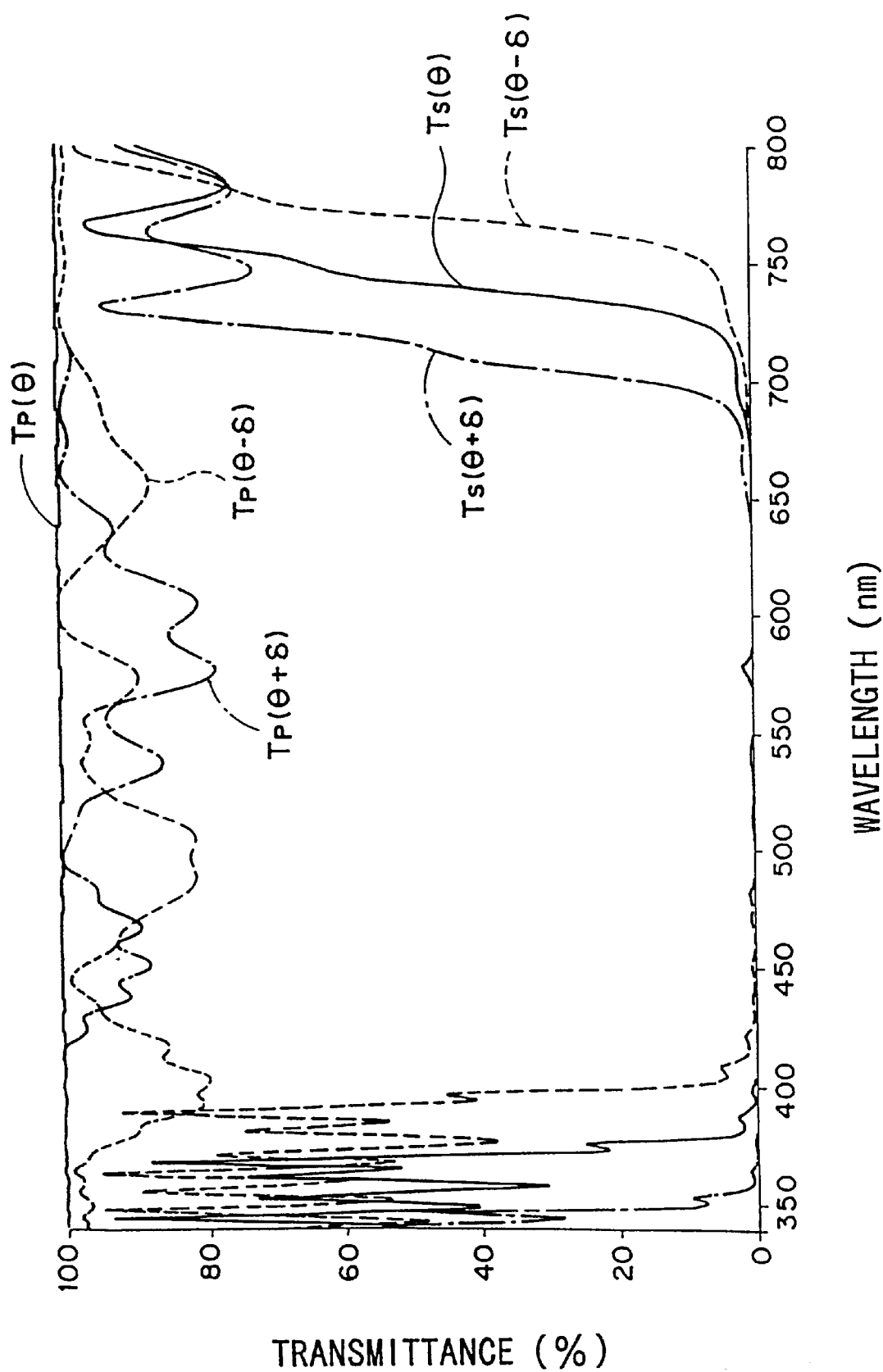

Next, rays of light within the visible spectrum were caused to be incident on the polarizing multilayered film of the polarized beam splitter structured as above at 45° and 45°±3°. Transmittances $T_S(\theta-\delta)$, $T_S(\theta)$, $T_S(\theta+\delta)$ of the S-polarized lights at the incident angles of 42°, 45°, 48° were calculated, and transmittances $T_P(\theta-\delta)$, $T_P(\theta)$, $T_P(\theta+\delta)$ of the P-polarized lights at the incident angles of 42°, 45°, 48° were calculated. FIG. 27 is a graph showing the calculation results.

As shown in the graph of FIG. 27, even if the incident beam includes the ray incident at 45° as well as the rays obliquely incident by ±3° with respect to the one incident at 45°, it can efficiently be split into the S-polarized lights and P-polarized lights over the entire visible spectrum (400 nm to 700 nm). The polarized beam splitter thus constructed has an excellent polarized light splitting characteristic.

EIGHTH EXAMPLE

After the surface of the first transparent base, having a refractive index $n_G$ Of 1.52, was thoroughly washed, the polarizing multilayered film was formed by successively forming the 1st to 57th layers made of materials shown in TABLE 8 on the surface using a thin film forming method such as a vacuum deposition. After an adhesive layer was further formed on the polarizing multilayered film, the polarized beam splitter according to the third embodiment was obtained by adhering the third transparent base (refractive index $n_G$=1.52) to the polarizing multilayered film.

TABLE 8

| LAYER NUMBER | FILM MATERIAL | REFRACTIVE INDEX | QWOT | FILM THICKNESS |
|---|---|---|---|---|
| 1 | MgO | 1.7 | 1 | 88.97 |
| 2 | MgF$_2$ | 1.39 | 1 | 108.81 |
| 3 | MgO | 1.7 | 1 | 88.97 |
| 4 | MgF$_2$ | 1.39 | 1 | 108.81 |
| 5 | MgO | 1.7 | 1 | 88.97 |
| 6 | MgF$_2$ | 1.39 | 1 | 108.81 |
| 7 | MgO | 1.7 | 1 | 88.97 |
| 8 | MgF$_2$ | 1.39 | 1 | 108.81 |
| 9 | MgO | 1.7 | 1 | 88.97 |
| 10 | MgF$_2$ | 1.39 | 1 | 108.81 |
| 11 | MgO | 1.7 | 1 | 88.97 |
| 12 | MgF$_2$ | 1.39 | 1 | 108.81 |
| 13 | MgO | 1.7 | 1 | 88.97 |
| 14 | MgF$_2$ | 1.39 | 1 | 108.81 |
| 15 | MgO | 1.7 | 1 | 88.97 |
| 16 | MgF$_2$ | 1.39 | 1 | 108.81 |
| 17 | MgO | 1.7 | 1 | 88.97 |
| 18 | MgF$_2$ | 1.39 | 1 | 108.81 |
| 19 | MgO | 1.7 | 0.5 | 44.49 |
| 20 | MgO | 1.7 | 0.61 (=1.22*0.5) | 54.27 |
| 21 | MgF$_2$ | 1.39 | 1.22 (=1.22*1) | 132.75 |
| 22 | MgO | 1.7 | 1.22 (=1.22*1) | 108.54 |
| 23 | MgF$_2$ | 1.39 | 1.22 (=1.22*1) | 132.75 |
| 24 | MgO | 1.7 | 1.22 (=1.22*1) | 108.54 |
| 25 | MgF$_2$ | 1.39 | 1.22 (=1.22*1) | 132.75 |
| 26 | MgO | 1.7. | 1.22 (=1.22*1) | 108.54 |
| 27 | MgF$_2$ | 1.39 | 1.22 (=1.22*1) | 132.75 |
| 28 | MgO | 1.7 | 1.22 (=1.22*1) | 108.54 |
| 29 | MgF$_2$ | 1.39 | 1.22 (=1.22*1) | 132.75 |
| 30 | MgO | 1.7 | 1.22 (=1.22*1) | 108.54 |
| 31 | MgF$_2$ | 1.39 | 1.22 (=1.22*1) | 132.75 |
| 32 | MgO | 1.7 | 1.22 (=1.22*1) | 108.54 |
| 33 | MgF$_2$ | 1.39 | 1.22 (=1.22*1) | 132.75 |
| 34 | MgO | 1.7 | 1.22 (=1.22*1) | 108.54 |
| 35 | MgF$_2$ | 1.39 | 1.22 (=1.22*1) | 132.75 |
| 36 | MgO | 1.7 | 1.22 (=1.22*1) | 108.54 |
| 37 | MgF$_2$ | 1.39 | 1.22 (=1.22*1) | 132.75 |
| 38 | MgO | 1.7 | 0.61 (=1.22*0.5) | 54.27 |
| 39 | MgO | 1.7 | 0.74 (=1.48*0.5) | 65.84 |
| 40 | MgF$_2$ | 1.39 | 1.48 (=1.48*1) | 161.04 |
| 41 | MgO | 1.7 | 1.48 (=1.48*1) | 131.68 |
| 42 | MgF$_2$ | 1.39 | 1.48 (=1.48*1) | 161.04 |
| 43 | MgO | 1.7 | 1.48 (=1.48*1) | 131.68 |
| 44 | MgF$_2$ | 1.39 | 1.48 (=1.48*1) | 161.04 |
| 45 | MgO | 1.7 | 1.48 (=1.48*1) | 131.68 |
| 46 | MgF$_2$ | 1.39 | 1.48 (=1.48*1) | 161.04 |
| 47 | MgO | 1.7 | 1.48 (=1.48*1) | 131.68 |
| 48 | MgF$_2$ | 1.39 | 1.48 (=1.48*1) | 161.04 |
| 49 | MgO | 1.7 | 1.48 (=1.48*1) | 131.68 |
| 50 | MgF$_2$ | 1.39 | 1.48 (=1.48*1) | 161.04 |
| 51 | MgO | 1.7 | 1.48 (=1.48*1) | 131.68 |

TABLE 8-continued

| LAYER NUMBER | FILM MATERIAL | REFRACTIVE INDEX | QWOT | FILM THICKNESS |
|---|---|---|---|---|
| 52 | MgF$_2$ | 1.39 | 1.48 (=1.48*1) | 161.04 |
| 53 | MgO | 1.7 | 1.48 (=1.48*1) | 131.68 |
| 54 | MgF$_2$ | 1.39 | 1.48 (=1.48*1) | 161.04 |
| 55 | MgO | 1.7 | 1.48 (=1.48*1) | 131.68 |
| 56 | MgF$_2$ | 1.39 | 1.48 (=1.48*1) | 161.04 |
| 57 | MgO | 1.7 | 0.74 (=1.48*0.5) | 65.84 |

In the polarizing multilayered film of the polarized beam splitter structured as defined in TABLE 8, the film structure can be expressed by (first transparent base)

$$\|[H/2 \cdot (H/2 \cdot L \cdot H/2)^9] \cdot 1.22(H/2 \cdot L \cdot H/2)^9 \cdot 1.48[(H/2 \cdot L \cdot H/2)^9 \cdot H/2]\|$$

(second transparent base)
if H, L denote a $\lambda_0/4$ layer having a high refractive index $n_H$ and a $\lambda_0/4$ layer having a low refractive index $n_L$.

Figure 28:
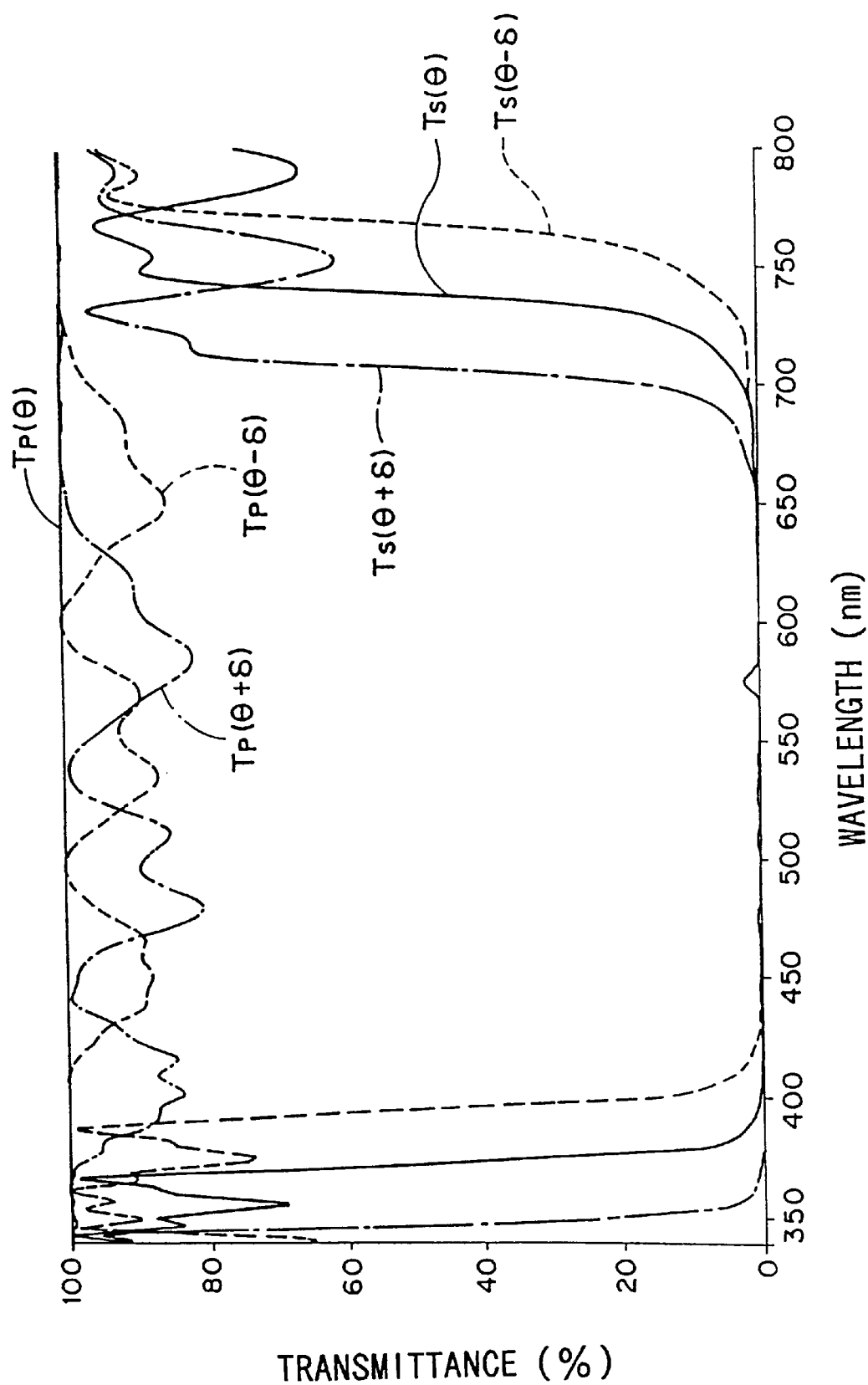

Next, rays of light within the visible spectrum were caused to be incident on the polarizing multilayered film of the polarized beam splitter structured as above at 45° and 45°±3°. Transmittances $T_S(\theta-\delta)$, $T_S(\theta)$, $T_S(\theta+\delta)$ of the S-polarized lights at the incident angles of 42°, 45°, 48° were calculated, and transmittances $T_P(\theta-\delta)$, $T_P(\theta)$, $T_P(\theta+\delta)$ of the P-polarized lights at the incident angles of 42°, 45°, 48° were calculated. FIG. 28 is a graph showing the calculation results.

As shown in the graph of FIG. 28, even if the incident beam includes the ray incident at 45° as well as the rays obliquely incident by ±3° with respect to the one incident at 45°, it can efficiently be split into the S-polarized lights and P-polarized lights over the entire visible spectrum (400 nm to 700 nm). The polarized beam splitter thus constructed has an excellent polarized light splitting characteristic.

NINTH EXAMPLE

After the surface of the first transparent base, having a refractive index $n_G$ of 1.80, was thoroughly washed, the polarizing multilayered film was formed by successively forming the 1st to 57th layers made of materials shown in TABLE 9 on the surface using a thin film forming method such as a vacuum deposition. After an adhesive layer was further formed on the polarizing multilayered film, the polarized beam splitter according to the third embodiment was obtained by adhering the third transparent base (refractive index $n_G$=1.80) to the polarizing multilayered film.

TABLE 9

| LAYER NUMBER | FILM MATERIAL | REFRACTIVE INDEX | QWOT | FILM THICKNESS |
|---|---|---|---|---|
| 1 | ZrTiO$_4$ | 2.01 | 1 | 75.87 |
| 2 | Al$_2$O$_3$ | 1.64 | 1 | 92.99 |
| 3 | ZrTiO$_4$ | 2.01 | 1 | 75.87 |
| 4 | Al$_2$O$_3$ | 1.64 | 1 | 92.99 |
| 5 | ZrTiO$_4$ | 2.01 | 1 | 75.87 |
| 6 | Al$_2$O$_3$ | 1.64 | 1 | 92.99 |
| 7 | ZrTiO$_4$ | 2.01 | 1 | 75.87 |
| 8 | Al$_2$O$_3$ | 1.64 | 1 | 92.99 |
| 9 | ZrTiO$_4$ | 2.01 | 1 | 75.87 |
| 10 | Al$_2$O$_3$ | 1.64 | 1 | 92.99 |
| 11 | ZrTiO$_4$ | 2.01 | 1 | 75.87 |
| 12 | Al$_2$O$_3$ | 1.64 | 1 | 92.99 |
| 13 | ZrTiO$_4$ | 2.01 | 1 | 75.87 |
| 14 | Al$_2$O$_3$ | 1.64 | 1 | 92.99 |
| 15 | ZrTiO$_4$ | 2.01 | 1 | 75.87 |
| 16 | Al$_2$O$_3$ | 1.64 | 1 | 92.99 |
| 17 | ZrTiO$_4$ | 2.01 | 1 | 75.87 |
| 18 | Al$_2$O$_3$ | 1.64 | 1 | 92.99 |
| 19 | ZrTiO$_4$ | 2.01 | 0.5 | 37.94 |
| 20 | ZrTiO$_4$ | 2.01 | 0.61 (=1.22*0.5) | 46.28 |
| 21 | Al$_2$O$_3$ | 1.64 | 1.22 (=1.22*1) | 113.45 |
| 22 | ZrTiO$_4$ | 2.01 | 1.22 (=1.22*1) | 92.56 |
| 23 | Al$_2$O$_3$ | 1.64 | 1.22 (=1.22*1) | 113.45 |
| 24 | ZrTiO$_4$ | 2.01 | 1.22 (=1.22*1) | 92.56 |
| 25 | Al$_2$O$_3$ | 1.64 | 1.22 (=1.22*1) | 113.45 |
| 26 | ZrTiO$_4$ | 2.01 | 1.22 (=1.22*1) | 92.56 |
| 27 | Al$_2$O$_3$ | 1.64 | 1.22 (=1.22*1) | 113.45 |
| 28 | ZrTiO$_4$ | 2.01 | 1.22 (=1.22*1) | 92.56 |
| 29 | Al$_2$O$_3$ | 1.64 | 1.22 (=1.22*1) | 113.45 |
| 30 | ZrTiO$_4$ | 2.01 | 1.22 (=1.22*1) | 92.56 |
| 31 | Al$_2$O$_3$ | 1.64 | 1.22 (=1.22*1) | 113.45 |
| 32 | ZrTiO$_4$ | 2.01 | 1.22 (=1.22*1) | 92.56 |
| 33 | Al$_2$O$_3$ | 1.64 | 1.22 (=1.22*1) | 113.45 |
| 34 | ZrTiO$_4$ | 2.01 | 1.22 (=1.22*1) | 92.56 |
| 35 | Al$_2$O$_3$ | 1.64 | 1.22 (=1.22*1) | 113.45 |
| 36 | ZrTiO$_4$ | 2.01 | 1.22 (=1.22*1) | 92.56 |
| 37 | Al$_2$O$_3$ | 1.64 | 1.22 (=1.22*1) | 113.45 |
| 38 | ZrTiO$_4$ | 2.01 | 0.61 (=1.22*0.5) | 46.28 |
| 39 | ZrTiO$_4$ | 2.01 | 0.74 (=1.48*0.5) | 56.14 |
| 40 | Al$_2$O$_3$ | 1.64 | 1.48 (=1.48*1) | 137.62 |
| 41 | ZrTiO$_4$ | 2.01 | 1.48 (=1.48*1) | 112.29 |
| 42 | Al$_2$O$_3$ | 1.64 | 1.48 (=1.48*1) | 137.62 |
| 43 | ZrTiO$_4$ | 2.01 | 1.48 (=1.48*1) | 112.29 |
| 44 | Al$_2$O$_3$ | 1.64 | 1.48 (=1.48*1) | 137.62 |
| 45 | ZrTiO$_4$ | 2.01 | 1.48 (=1.48*1) | 112.29 |
| 46 | Al$_2$O$_3$ | 1.64 | 1.48 (=1.48*1) | 137.62 |
| 47 | ZrTiO$_4$ | 2.01 | 1.48 (=1.48*1) | 112.29 |
| 48 | Al$_2$O$_3$ | 1.64 | 1.48 (=1.48*1) | 137.62 |
| 49 | ZrTiO$_4$ | 2.01 | 1.48 (=1.48*1) | 112.29 |
| 50 | Al$_2$O$_3$ | 1.64 | 1.48 (=1.48*1) | 137.62 |
| 51 | ZrTiO$_4$ | 2.01 | 1.48 (=1.48*1) | 112.29 |
| 52 | Al$_2$O$_3$ | 1.64 | 1.48 (=1.48*1) | 137.62 |
| 53 | ZrTiO$_4$ | 2.01 | 1.48 (=1.48*1) | 112.29 |
| 54 | Al$_2$O$_3$ | 1.64 | 1.48 (=1.48*1) | 137.62 |
| 55 | ZrTiO$_4$ | 2.01 | 1.48 (=1.48*1) | 112.29 |
| 56 | Al$_2$O$_3$ | 1.64 | 1.48 (=1.48*1) | 137.62 |
| 57 | ZrTiO$_4$ | 2.01 | 1.48 (=1.48*1) | 112.29 |

In the polarizing multilayered film of the polarized transmitter structured as defined in TABLE 9, the film structure can be expressed by (first transparent base)

$$\|[H/2 \cdot (H/2 \cdot L \cdot H/2)^9] \cdot 1.22(H/2 \cdot L \cdot H/2)^9 \cdot 1.48[(H/2 \cdot L \cdot H/2)^9 \cdot H/2]\|$$

(second transparent base)
if H, L denote a $\lambda_0/4$ layer having a high refractive index $n_H$ and a $\lambda_0/4$ layer having a low refractive index $n_L$.

Figure 29:
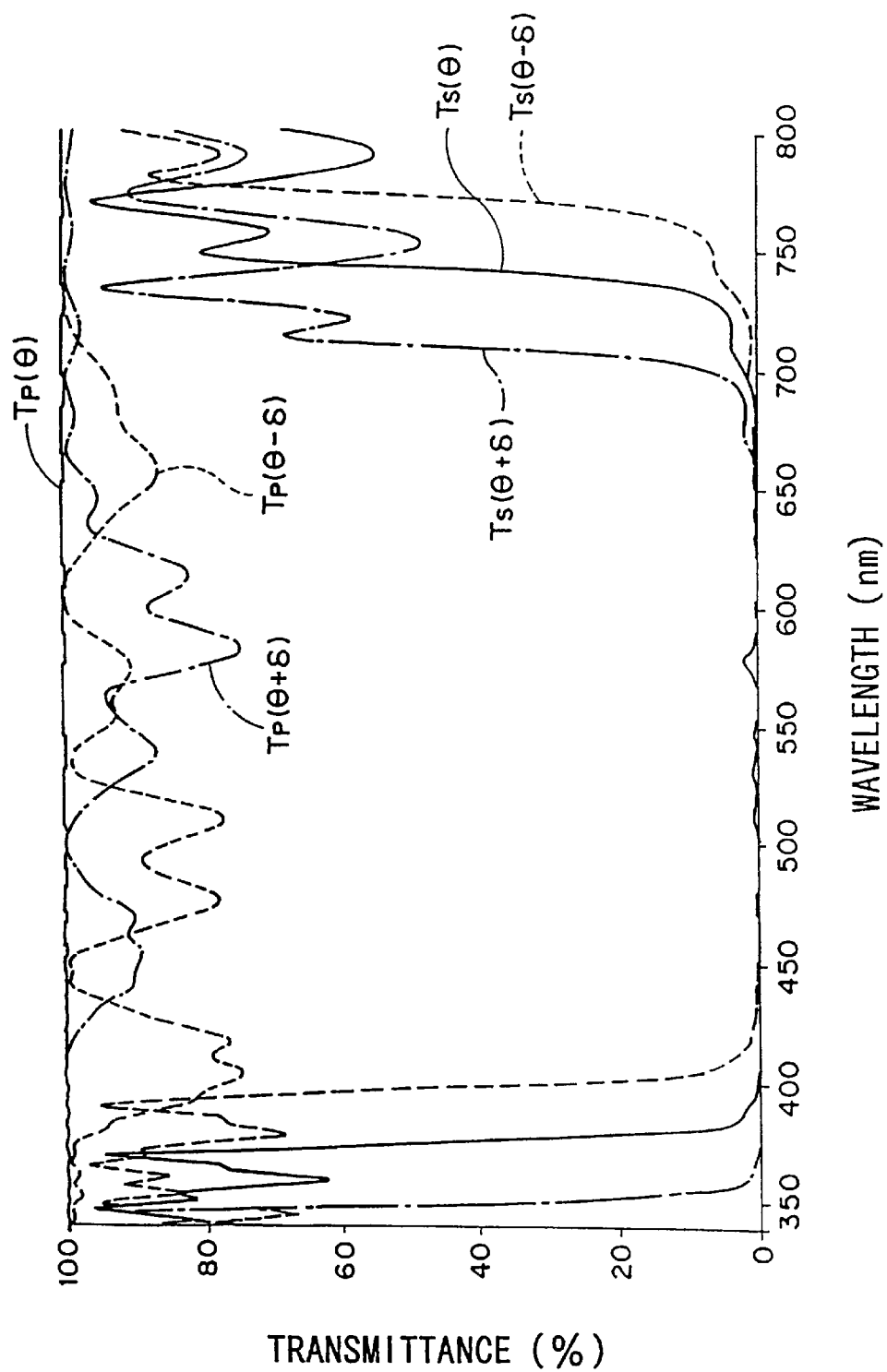

Next, rays of light within the visible spectrum were caused to be incident on the polarizing multilayered film of the polarized beam splitter structured as above at 45° and 45°±3°. Transmittances $T_S(\theta-\delta)$, $T_S(\theta)$, $T_S(\theta+\delta)$ of the S-polarized lights at the incident angles of 42°, 45°, 48° were calculated, and transmittances $T_P(\theta-\delta)$, $T_P(\theta)$, $T_P(\theta+\delta)$ of the P-polarized lights at the incident angles of 42°, 45°, 48° were calculated. FIG. 29 is a graph showing the calculation results.

As shown in the graph of FIG. 29, even if the incident beam includes the ray incident at 45° as well as the rays obliquely incident by ±3° with respect to the one incident at 45°, it can efficiently be split into the S-polarized lights and P-polarized lights over the entire visible spectrum (400 nm to 700 nm). The polarized beam splitter thus constructed has an excellent polarized light splitting characteristic.

It should be noted that the same effects could be obtained even if the polarized beam splitter has a construction:

(first transparent base)

$$|[L/2 \cdot (L/2 \cdot H \cdot L/2)^m] \cdot A(L/2 \cdot H \cdot L/2)^n \cdot B[(L/2 \cdot H \cdot L/2)^p \cdot L/2]|$$

(second transparent base)
or another construction:
(first transparent base)

$$|(L/2 \cdot H \cdot L/2)^m \cdot A(L/2 \cdot H \cdot L/2)^n \cdot B(L/2 \cdot H \cdot L/2)^p \cdot L/2|$$

(second transparent base)
in which the high refraction layers and the low refraction layers are switched.

Further, the values of A, B in the sixth to ninth examples are not limited to "1.22", "1.48". As a result of various experiments, the same effects as the above examples can be obtained by setting the values of A, B in a range of $1 < A \leq 1.22$ and in a range of $1.21 < B < 1.49$.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A projector comprising:
    a plurality of imaging members which are operable to produce a plurality of color light images utilizing light rays of a plurality of primary colors;
    an illumination optical system for illuminating the plurality of imaging members with the light rays of the plurality of primary colors for production of the plurality of color light images;
    an image combining optical system which includes at least one of (a) a dichroic filter and (b) a dichroic mirror, and which combines the plurality of color light images from the plurality of imaging members; and
    a projection optical system which projects a combined color light image from the image combining optical system onto a screen;
    wherein the illumination optical system comprises a means for producing a luminance nonuniformity of the light rays so as to make an illuminance nonuniformity on at least one of the plurality of imaging members in order to compensate for a luminance nonuniformity of the combined color light image on the screen.

2. A projector in accordance with claim 1, wherein the illumination optical system further comprises a light source for generating light having a visible wavelength range, wherein the means for producing a luminance nonuniformity of the light rays comprises:
    a polarization splitting film for splitting a light beam from the light source into a first component and second component, the first component having a polarization direction which is perpendicular to a polarization direction of the second component, whereby a maximum efficiency incident angle for the polarization splitting film is shifted from an incident angle of a main ray from the light source in order to make the illuminance nonuniformity; and
    wherein the illumination optical system further comprises:
        a converter which converts the polarization direction of the first component so as to coincide with the polarization direction of the second component; and
        a color separator for separating a light beam from the converter into rays of the plurality of primary colors for production of the plurality of color light images.

3. A projector in accordance with claim 2, wherein the incident angle of the main ray of the light source is shifted from the maximum efficiency incident angle by an amount in a range of 2° to 7°.

4. A projector in accordance with claim 2, wherein the incident angle of the main ray of the light source is shifted from the maximum efficiency incident angle by an amount in a range of 3° to 5°.

5. A projector in accordance with claim 2, wherein the imaging members correspond to first, second, and third primary colors, respectively.

6. A projector in accordance with claim 2, wherein one of said plurality of imaging members includes a liquid crystal display device.

7. A projector in accordance with claim 2, wherein the projection optical system includes a lens telecentric to the plurality of imaging members.

8. A projector in accordance with claim 2, wherein the illumination optical system includes two optical integrators.

9. A method for projecting a color light image to a screen, said method comprising the steps of:
    illuminating a plurality of imaging members with light rays of a plurality of primary colors so that the plurality of imaging members produce a plurality of color light images;
    producing a luminance nonuniformity of the light rays to make an illuminance nonuniformity on at least one of the plurality of imaging members in order to compensate for a luminance nonuniformity of the combined color light image on the screen;
    combining the plurality of color light images into a single combined color light image; and
    projecting the combined color light image onto the screen.

10. A method in accordance with claim 9, wherein the step of illuminating includes the steps of:
    splitting a light beam from a light source into two components by a polarization splitting film, a polarization direction of one of the two components perpendicularly intersecting that of the other of the two components;
    converting the polarization direction of said one of the two components so as to coincide with that of the other of the two components in order to provide a coincided light beam; and
    separating the coincided light beam into rays of the plurality of primary colors;
    wherein the step of producing a luminance nonuniformity comprises the step of shifting an incident angle of a main ray from the light source from a maximum efficiency incident angle for the polarization splitting film in order to make the illumination nonuniformity.

* * * * *